US010463212B2

(12) United States Patent
Nam et al.

(10) Patent No.: US 10,463,212 B2
(45) Date of Patent: Nov. 5, 2019

(54) AUTONOMOUS CLEANER

(71) Applicant: LG ELECTRONICS INC., Seoul (KR)

(72) Inventors: Bohyun Nam, Seoul (KR); Inbo Shim, Seoul (KR); Jihoon Sung, Seoul (KR); Sojin Park, Seoul (KR); Seunghyun Song, Seoul (KR); Sangkyu Lee, Seoul (KR); Woochan Jun, Seoul (KR); Changhwa Sun, Seoul (KR); Hyungkyu Youk, Seoul (KR); Sangjo Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 186 days.

(21) Appl. No.: 15/599,829

(22) Filed: May 19, 2017

(65) Prior Publication Data
US 2017/0332857 A1    Nov. 23, 2017

(30) Foreign Application Priority Data

May 20, 2016  (KR) .................. 10-2016-0062415
Jun. 10, 2016  (KR) .................. 10-2016-0072690
(Continued)

(51) Int. Cl.
*A47L 9/00*      (2006.01)
*A47L 5/22*      (2006.01)
(Continued)

(52) U.S. Cl.
CPC .............. *A47L 9/009* (2013.01); *A47L 5/22* (2013.01); *A47L 9/0477* (2013.01); *A47L 9/122* (2013.01);
(Continued)

(58) Field of Classification Search
CPC .. A47L 11/40; A47L 2201/00; A47L 2201/04; G05D 1/0011
(Continued)

(56) References Cited

U.S. PATENT DOCUMENTS 2,308,382 A    1/1943   McDermott
4,596,412 A    6/1986   Everett et al.
(Continued)

FOREIGN PATENT DOCUMENTS

CA        2946142 A1 * 10/2015   ............... A47L 9/00
CN        201759501           3/2011
(Continued)

OTHER PUBLICATIONS

CA-2946142-A1 translation, Espacenet website (Year: 2018).*
(Continued)

*Primary Examiner* — Joseph J Hail
*Assistant Examiner* — Timothy Brian Brady
(74) *Attorney, Agent, or Firm* — Ked & Associates, LLP

(57) ABSTRACT

A robot cleaner comprising: a first housing including a controller and a driving wheel of which driving is controlled by the controller; a second housing provided at one side of the first housing, the second housing having a brush module or mop module mounted thereto; a front bumper provided at a front portion of the second housing, the front bumper configured to be movable to the inside of the second housing when the front bumper is in contact with an obstacle; at least one sensing means provided at the inside of the front bumper to sense a movement of the front bumper to the inside of the second housing; side bumpers respectively provided at left and right side portions of the second housing, the side bumpers each being configured to movable to the inside of the second housing when the side bumper is in contact with an obstacle; and a link member provided at the inside of the
(Continued)

side bumper to allow the side bumper and the front bumper to interlock with each other such that, when the side bumper is moved to the inside of the second housing, at least one portion of the front bumper is moved together with the side bumper to the inside of the second housing.

15 Claims, 51 Drawing Sheets

(30) Foreign Application Priority Data

| Aug. 26, 2016 | (KR) | ......................... 10-2016-0109318 |
|---|---|---|
| Oct. 27, 2016 | (KR) | ......................... 10-2016-0141106 |
| Dec. 30, 2016 | (KR) | ......................... 10-2016-0184439 |
| Dec. 30, 2016 | (KR) | ......................... 10-2016-0184442 |
| Dec. 30, 2016 | (KR) | ......................... 10-2016-0184446 |

(51) Int. Cl.

| A47L 9/04 | (2006.01) |
|---|---|
| A47L 9/12 | (2006.01) |
| A47L 9/16 | (2006.01) |
| A47L 9/28 | (2006.01) |
| A47L 9/30 | (2006.01) |
| G05D 1/00 | (2006.01) |
| G05D 1/02 | (2006.01) |

(52) U.S. Cl.
CPC ............ *A47L 9/1608* (2013.01); *A47L 9/1633* (2013.01); *A47L 9/1641* (2013.01); *A47L 9/1683* (2013.01); *A47L 9/1691* (2013.01); *A47L 9/2826* (2013.01); *A47L 9/2852* (2013.01); *A47L 9/2857* (2013.01); *A47L 9/2894* (2013.01); *A47L 9/30* (2013.01); *G05D 1/0011* (2013.01); *G05D 1/0088* (2013.01); *G05D 1/0227* (2013.01); *G05D 1/0248* (2013.01); *G05D 1/0274* (2013.01); *A47L 2201/04* (2013.01); *G05D 2201/0215* (2013.01)

(58) Field of Classification Search
USPC ....... 15/325, 339, 347, DIG. 10; 701/23, 28, 701/301; 700/255
See application file for complete search history.

(56) References Cited

U.S. PATENT DOCUMENTS

| 4,954,962 | A | 9/1990 | Evans, Jr. et al. |
|---|---|---|---|
| 4,996,468 | A | 2/1991 | Field et al. |
| 5,233,914 | A | 8/1993 | English |
| 6,286,972 | B1 | 9/2001 | Shepherd et al. |
| 6,829,805 | B2 | 12/2004 | Yang |
| 6,836,931 | B2 | 1/2005 | Bone |
| 8,689,401 | B2 | 4/2014 | Makarov et al. |
| 8,776,311 | B2 | 7/2014 | Genn et al. |
| 8,874,268 | B2 | 10/2014 | Kim et al. |
| 9,265,396 | B1 * | 2/2016 | Lu ........................ A47L 11/4083 |
| 9,427,123 | B2 | 8/2016 | Vanderstegen-Drake et al. |
| 9,511,494 | B2 | 12/2016 | Noh |
| 9,930,429 | B2 | 3/2018 | Kekäläinen |
| 2004/0250374 | A1 | 12/2004 | Park et al. |
| 2006/0196003 | A1 | 9/2006 | Song et al. |
| 2006/0230726 | A1 | 10/2006 | Oh et al. |
| 2006/0254226 | A1 | 11/2006 | Jeon |
| 2007/0113373 | A1 * | 5/2007 | Hato ........................ A47L 5/30 15/354 |
| 2008/0115315 | A1 | 5/2008 | White |
| 2008/0281470 | A1 | 11/2008 | Gilbert, Jr. et al. |
| 2010/0132319 | A1 | 6/2010 | Ashbee et al. |
| 2010/0235000 | A1 * | 9/2010 | Hsu ........................ B25J 13/081 700/275 |
| 2011/0278082 | A1 | 11/2011 | Chung et al. |
| 2012/0095597 | A1 | 4/2012 | Kim et al. |
| 2012/0180249 | A1 | 7/2012 | Tso et al. |
| 2013/0061417 | A1 | 3/2013 | Vanderstegen-Drake et al. |
| 2013/0061420 | A1 | 3/2013 | Vanderstegen-Drake et al. |
| 2013/0204483 | A1 | 8/2013 | Sung et al. |
| 2013/0263889 | A1 | 10/2013 | Yoon et al. |
| 2013/0305483 | A1 | 11/2013 | Dyson et al. |
| 2013/0305484 | A1 | 11/2013 | Dyson et al. |
| 2013/0338831 | A1 | 12/2013 | Noh et al. |
| 2014/0182627 | A1 | 7/2014 | Williams et al. |
| 2015/0108244 | A1 | 4/2015 | Pruiett et al. |
| 2015/0115876 | A1 | 4/2015 | Noh et al. |
| 2015/0168954 | A1 | 6/2015 | Hickerson et al. |
| 2015/0185322 | A1 | 7/2015 | Haegermarck |
| 2015/0245754 | A1 | 9/2015 | Jang |
| 2016/0058261 | A1 | 3/2016 | Dyson |
| 2016/0095487 | A1 | 4/2016 | Koura et al. |
| 2016/0100733 | A1 * | 4/2016 | Kim ........................ A61L 9/00 15/319 |
| 2016/0274579 | A1 | 9/2016 | So et al. |
| 2016/0274580 | A1 | 9/2016 | Jung et al. |
| 2016/0302637 | A1 | 10/2016 | Wennerstrom |
| 2016/0302639 | A1 | 10/2016 | Lindhé et al. |
| 2017/0055797 | A1 | 3/2017 | Kim |
| 2017/0156560 | A1 * | 6/2017 | Jung ........................ A47L 9/16 |
| 2017/0231447 | A1 * | 8/2017 | Izawa ...................... A47L 9/28 15/319 |
| 2017/0273531 | A1 * | 9/2017 | Watanabe .................. A47L 9/28 |
| 2017/0319033 | A1 | 11/2017 | Hyun et al. |
| 2017/0332864 | A1 | 11/2017 | Nam |
| 2017/0344019 | A1 | 11/2017 | Haegermarck et al. |
| 2018/0255997 | A1 | 9/2018 | So et al. |

FOREIGN PATENT DOCUMENTS

| CN | 101744579 | 8/2012 |
|---|---|---|
| CN | 102987989 | 3/2013 |
| CN | 103190864 | 7/2013 |
| CN | 103417162 | 12/2013 |
| CN | 203506608 | 4/2014 |
| CN | 204105903 | 1/2015 |
| CN | 204246066 | 4/2015 |
| CN | 104597902 | 5/2015 |
| CN | 205094325 | 3/2016 |
| DE | 10 2005 024 750 | 9/2006 |
| EP | 1 237 459 | 6/2004 |
| EP | 2 882 328 | 6/2016 |
| FR | 2 940 902 | 7/2010 |
| JP | 07-049381 | 2/1995 |
| JP | 2002-360480 | 12/2002 |
| JP | 2003-323214 | 11/2003 |
| JP | 2003-336553 | 11/2003 |
| JP | 2004-254970 | 9/2004 |
| JP | 2006-155274 | 6/2006 |
| JP | 2007-097984 | 4/2007 |
| JP | 2007-282710 | 11/2007 |
| JP | 2008-067930 | 3/2008 |
| JP | 2009-504310 | 2/2009 |
| JP | 4996976 | 8/2012 |
| JP | 2013-144029 | 7/2013 |
| JP | 2014-048842 | 3/2014 |
| JP | 2016-047221 | 4/2016 |
| JP | 2016-049127 | 4/2016 |
| JP | 2016-052506 | 4/2016 |
| JP | 5928656 | 6/2016 |
| KR | 20-2000-0008646 | 5/2000 |
| KR | 10-2004-0003444 | 1/2004 |
| KR | 10-0500829 | 7/2005 |
| KR | 10-2007-0045855 | 5/2007 |
| KR | 10-0767122 | 10/2007 |
| KR | 10-0778125 | 11/2007 |
| KR | 10-0842706 | 7/2008 |
| KR | 10-2009-0063346 | 6/2009 |
| KR | 10-2009-0131098 | 12/2009 |
| KR | 10-2010-0116999 | 11/2010 |
| KR | 10-2011-0026414 | 3/2011 |

(56) References Cited

FOREIGN PATENT DOCUMENTS

| | | |
|---|---|---|
| KR | 10-1026065 | 4/2011 |
| KR | 10-2012-0066013 | 6/2012 |
| KR | 10-2013-0027355 | 3/2013 |
| KR | 10-2013-0030932 | 3/2013 |
| KR | 10-1231932 | 3/2013 |
| KR | 10-2013-0097623 | 9/2013 |
| KR | 10-1330735 | 11/2013 |
| KR | 10-2013-0141979 | 12/2013 |
| KR | 10-1352272 | 1/2014 |
| KR | 10-1362373 | 2/2014 |
| KR | 10-2014-0061490 | 5/2014 |
| KR | 10-1408723 | 7/2014 |
| KR | 10-1411685 | 7/2014 |
| KR | 10-2014-0096610 | 8/2014 |
| KR | 10-2014-0107991 | 9/2014 |
| KR | 10-2014-0120437 | 10/2014 |
| KR | 10-2015-0008910 | 1/2015 |
| KR | 10-2015-0065972 | 6/2015 |
| KR | 10-2015-0102365 | 9/2015 |
| KR | 10-2016-0048750 | 5/2016 |
| RU | 2267975 | 1/2006 |
| RU | 2318652 | 3/2008 |
| RU | 2357644 | 6/2009 |
| TW | 1388956 | 3/2013 |
| WO | WO 2011/074716 | 6/2011 |
| WO | WO 2013/105431 | 7/2013 |
| WO | WO 2015/060672 | 4/2015 |
| WO | WO 2015/090399 | 6/2015 |

OTHER PUBLICATIONS

Taiwanese Office Action dated Jun. 20, 2018 issued in Application No. 106116759.
Taiwanese Office Action dated Jun. 21, 2018 issued in Application No. 106116755.
Taiwanese Office Action dated Jun. 21, 2018 issued in Application No. 106116761.
Korean Notice of Allowance dated Jun. 29, 2018 issued in Application No. 10-2016-0184439.
United States Office Action dated Nov. 20, 2018 issued in U.S. Appl. No. 15/599,863.
United States Office Action dated Dec. 3, 2018 issued in U.S. Appl. No. 15/599,800.
United States Office Action dated Dec. 6, 2018 issued in U.S. Appl. No. 15/599,894.
Taiwanese Office Action dated Aug. 20, 2018 issued in Application No. 106116762.
Taiwanese Office Action dated Sep. 19, 2018 issued in Application No. 106116754.
Taiwanese Office Action dated Sep. 20, 2018 issued in Application No. 106116756.
Taiwanese Office Action dated Mar. 9, 2018 issued in Application No. 106116758 (with English translation).
Korean Office Action dated Mar. 20, 2018 issued in Application No. 10-2016-0141106.
Taiwanese Office Action dated Mar. 21, 2018 issued in Application No. 106116753 (with English translation).
United States Office Action dated Nov. 2, 2018 issued in U.S. Appl. No. 15/599,780.
United States Office Action dated Nov. 9, 2018 issued in U.S. Appl. No. 15/599,783.
United States Office Action dated Nov. 14, 2018 issued in U.S. Appl. No. 15/599,804.
PCT Search Report dated Aug. 25, 2017 issued in Application No. PCT/KR2017/005244.
PCT Search Report dated Aug. 25, 2017 issued in Application No. PCT/KR2017/005245.
PCT Search Report dated Aug. 25, 2017 issued in Application No. PCT/KR2017/005246.
PCT Search Report dated Aug. 25, 2017 issued in Application No. PCT/KR2017/005247.
PCT Search Report dated Aug. 25, 2017 issued in Application No. PCT/KR2017/005249.
PCT Search Report dated Aug. 28, 2017 issued in Application No. PCT/KR2017/005238.
PCT Search Report dated Aug. 28, 2017 issued in Application No. PCT/KR2017/005243.
PCT Search Report dated Aug. 30, 2017 issued in Application No. PCT/KR2017/005239.
PCT Search Report dated Aug. 30, 2017 issued in Application No. PCT/KR2017/005240.
PCT Search Report dated Sep. 4, 2017 issued in Application No. PCT/KR2017/005236.
Korean Office Action dated Sep. 20, 2017 issued in Application No. 10-2016-0109310.
Korean Office Action dated Sep. 20, 2017 issued in Application No. 10-2016-0109317.
European Search Report dated Oct. 2, 2017 issued in Application No. 17000864.3.
Korean Office Action dated Dec. 12, 2017 issued in Application No. 10-2016-0184439.
Korean Notice of Allowance dated Dec. 12, 2017 issued in Application No. 10-2016-0184442.
Korean Office Action dated Dec. 14, 2017 issued in Application No. 10-2016-0184446.
U.S. Office Action dated Feb. 11, 2019 issued in U.S. Appl. No. 15/599,862.
U.S. Office Action dated Mar. 5, 2019 issued in U.S. Appl. No. 15/599,786.
U.S. Final Office Action dated Mar. 15, 2019 issued in U.S. Appl. No. 15/599,783.
U.S. Final Office Action dated Mar. 28, 2019 issued in U.S. Appl. No. 15/599,804.
U.S. Office Action dated Feb. 15, 2019 issued in U.S. Appl. No. 15/599,870.
Chinese Office Action (with English translation) dated May 7, 2019 issued in CN Application No. 201710357980.4.
Russian Notice of Allowance (with English translation) dated Jun. 25, 2019 issued in RU Application No. 2018145053.
U.S. Appl. No. 15/599,780, filed May 19, 2017.
U.S. Appl. No. 15/599,783, filed May 19, 2017.
U.S. Appl. No. 15/599,786, filed May 19, 2017.
U.S. Appl. No. 15/599,800, filed May 19, 2017.
U.S. Appl. No. 15/599,804, filed May 19, 2017.
U.S. Appl. No. 15/599,829, filed May 19, 2017.
U.S. Appl. No. 15/599,862, filed May 19, 2017.
U.S. Appl. No. 15/599,863, filed May 19, 2017.
U.S. Appl. No. 15/599,870, filed May 19, 2017.
U.S. Appl. No. 16/014,924, filed Jun. 21, 2018.
U.S. Appl. No. 16/014,957, filed Jun. 21, 2018.
U.S. Appl. No. 16/053,009, filed Aug. 2, 2018.
U.S. Appl. No. 16/014,967, filed Jun. 21, 2018.
U.S. Appl. No. 16/014,994, filed Jun. 21, 2018.

* cited by examiner (a)

(b)

(c)

(d)

(e)

AUTONOMOUS CLEANER

CROSS-REFERENCE TO RELATED APPLICATIONS

This application claims priority under 35 U.S.C. § 119 to Korean Application No. 10-2016-0062415, filed in Republic of Korea on May 20, 2016, Korean Application No. 10-2016-0072690, filed in Republic of Korea on Jun. 10, 2016, Korean Application No. 10-2016-0109318, filed in Republic of Korea on Aug. 26, 2016, Korean Application No. 10-2016-0141106, filed in Republic of Korea on Oct. 27, 2016, Korean Application No. 10-2016-0184446, filed in Republic of Korea on Dec. 30, 2016, Korean Application No. 10-2016-0184439, filed in Republic of Korea on Dec. 30, 2016, and Korean Application No. 10-2016-0184442, filed in Republic of Korea on Dec. 30, 2016, whose entire disclosures are hereby incorporated by reference.

BACKGROUND

1. Field

The present disclosure relates to a robot cleaner and/or autonomous cleaner.

2. Background

In general, robots have been developed for industrial purposes to play a role in factory automation. Recently, application fields of robots have extended, and robots for medical purpose, space navigation robots, etc., and even home robots available that may be used in general houses have been developed.

A representative example of home robots is a robot cleaner. The robot cleaner performs a function of cleaning a floor while traveling by itself in a certain area. For example, a household robot cleaner is configured to suck dust (including foreign substances) on a floor or mop the floor while autonomously traveling inside a house.

Such a robot cleaner generally includes a rechargeable battery and various sensors for avoiding an obstacle during traveling. Thus, the robot cleaner performs a cleaning function while traveling by itself.

In order to allow the autonomous traveling of a robot cleaner to be smoothly performed, it is important to set the entire traveling route and sense obstacles on the traveling route. The robot cleaner may also perform a function of photographing or monitoring the inside of a house using autonomous traveling characteristics thereof. In order to perform the above-described functions, various sensors are used in the robot cleaner, but studies for an optimized design have not been satisfactory yet.

In addition, a typical robot cleaner has a structure in which a suction unit is provided at a lower portion of a cleaner body. However, the structure in which the suction unit is built in the cleaner body has problems in that the suction force of the robot cleaner is decreased, that the separation of a brush roller is impossible, and the like. Accordingly, there has been proposed a structure in which a suction unit is provided to protrude from a cleaner body as disclosed in the following patent documents. However, the structure has many problems to be solved in that the probability of collision between the suction unit and an obstacle is increased, that the suction unit is located in a blind spot of a sensing unit provided in the cleaner body, and the like.

In a structure in which a dust container is coupled to a cleaner body, and a dust container cover is coupled to the dust container, it is important to accurately assemble the components and easily perform the assembly. However, any product having the structure has not been released yet.

In addition, air introduced into a robot cleaner typically passes through a HEPA filter for filtering fine dust before the air is discharged through an exhaust port. In the existing robot cleaners, there is an inconvenience that a portion of a cleaner body should be disassembled so as to replace or clean the HEPA filter.

Various robot cleaners are described in the following documents:
Patent Document 1: U.S. Patent Laid-Open Publication No. US 2013/0305484 A1 (published on Nov. 21, 2013);
Patent Document 2: U.S. Patent Laid-Open Publication No. US 2013/0061420 A1 (published on Mar. 14, 2013); and
Patent Document 3: U.S. Patent Laid-Open Publication No. US 2013/0061417 A1 (published on Mar. 14, 2013).

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Figure 1:
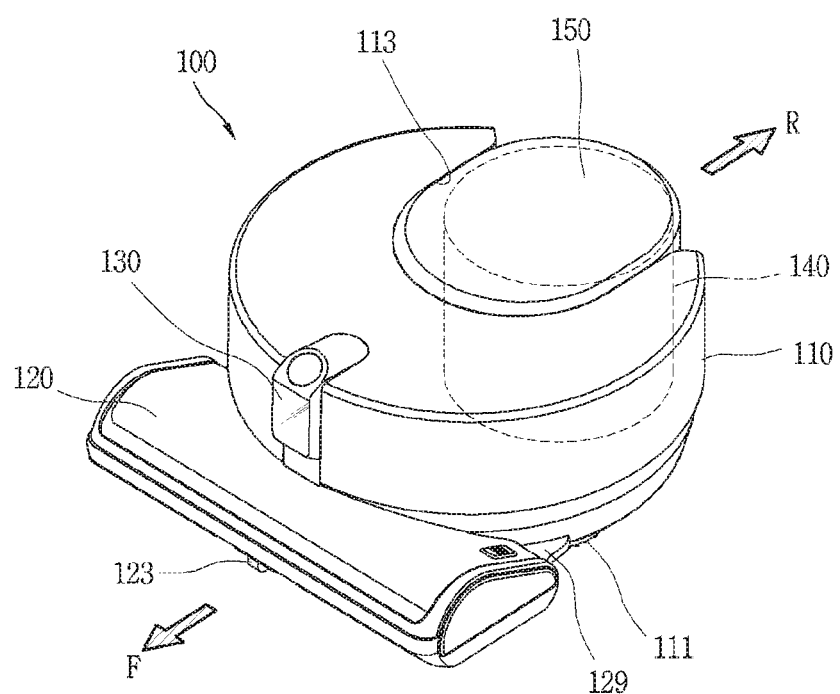
FIG. 1 is a perspective view illustrating an example of a robot cleaner according to an embodiment.
Figure 2:
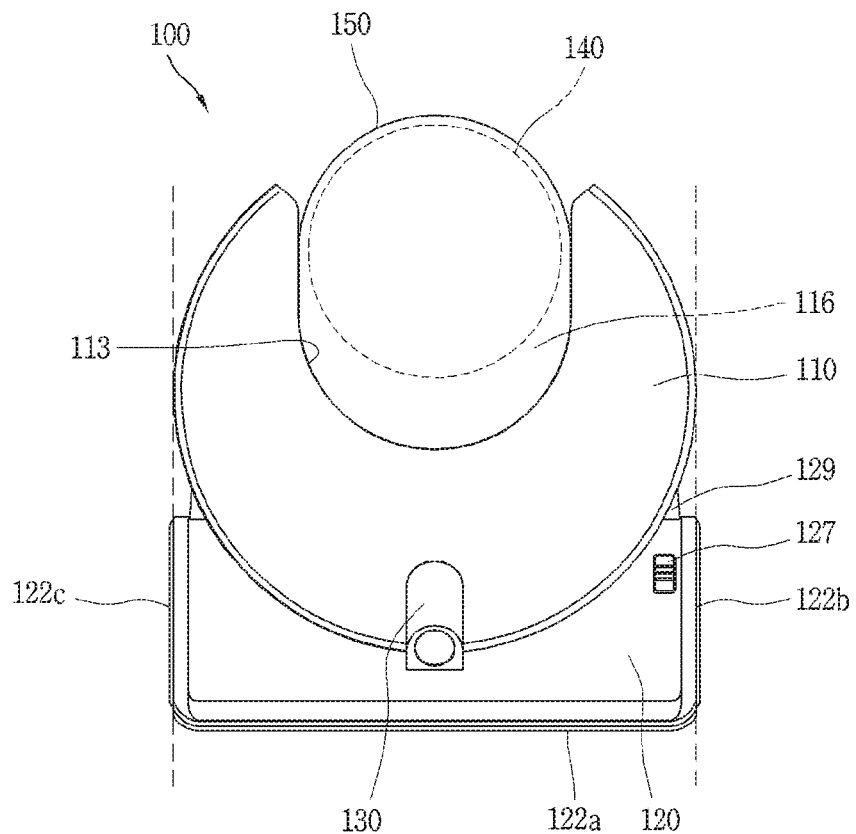
FIG. 2 is a plan view of the robot cleaner shown in FIG. 1.
Figure 3:
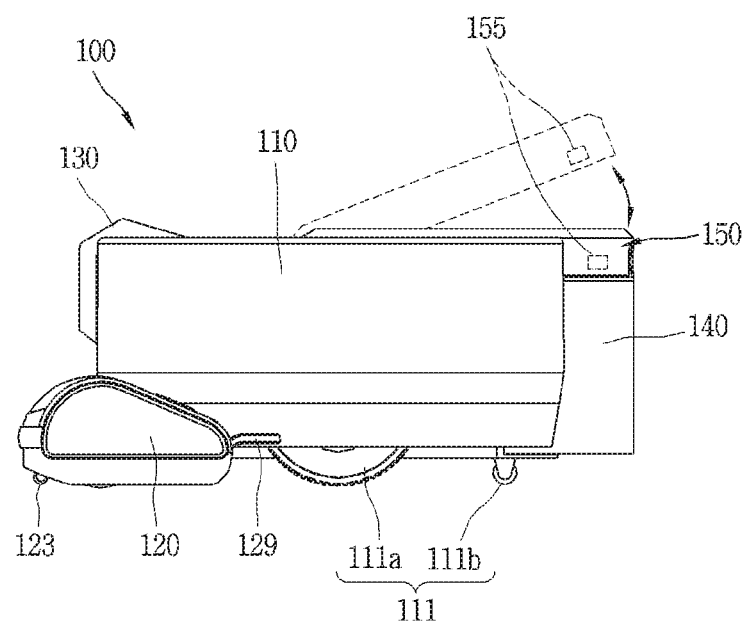
FIG. 3 is a side view of the robot cleaner shown in FIG. 1.

Referring to FIGS. 1 to 3, the robot cleaner 100 cleans a floor while traveling autonomously in a certain area. The cleaning of the floor includes sucking foreign substances, e.g., debris, dust, fine dust, ultrafine dust, etc., of the floor or mopping the floor. The robot cleaner 100 includes a cleaner body 110, a suction unit 120 (e.g. cleaner head), a sensing unit or module 130, and a dust container 140. The cleaner body 110 is provided with a controller for controlling the robot cleaner 100 and wheels 111 for allowing the robot cleaner 100 to travel. The robot cleaner 100 may be moved in all directions or be rotated by the wheels 111.

The wheels 111 includes main wheels 111a and a sub-wheel 111b. The main wheels 111a are provided at both sides of the cleaner body 110 to be rotatable in one direction or the other direction according to a control signal of the controller. The main wheels 111a may be configured to be driven independently from each other. For example, the main wheels 111a may be driven by different driving motors, respectively. The sub-wheel 111b supports the cleaner body 110 together with the main wheels 111a, and is configured to assist traveling of the robot cleaner 100 through the main wheels 111a. The sub-wheel 111b may also be provided in the suction unit 120. The controller controls the driving of the wheels 111, such that the robot cleaner 100 autonomously travels on the floor.

A battery 180 (FIG. 18) supplies power to the robot cleaner 100 and is mounted in the cleaner body 110. The battery 180 is rechargeable and may be configured to be attachable/detachable to/from a bottom surface of the cleaner body 110.

The suction unit 120 is provided in a shape protruding from one side of the cleaner body 110 to suck air containing foreign substances. The one side may be a side at which the cleaner body 110 travels in a forward direction F, i.e., the front of the cleaner body 110. The suction unit 120 may have a shape protruding frontward, leftward, and rightward at the one side of the cleaner body 110. A front end portion of the suction unit 120 may be provided at a position spaced apart forward from the one side of the cleaner body 110, and both left and right end portions of the suction unit 120 are provided at positions spaced apart leftward and rightward from the one side of the cleaner body 110, respectively.

As the cleaner body 110 is formed in a circular shape, and both sides of a rear end portion of the suction unit 120 are respectively formed to protrude leftward and rightward from the cleaner body 110, empty spaces, i.e., gaps may be formed between the cleaner body 110 and the suction unit 120. The empty spaces are spaces between both left and right end portions of the cleaner body 110 and both left and right end portions of the suction unit 120, and have a shape recessed inward of the robot cleaner 100.

When an obstacle is inserted into the empty space, a problem may occur where the robot cleaner 100 is caught by the obstacle and may stop movement. In order to prevent this problem, a cover member 129 or a flap of a plate or wedge shape may be provided to cover at least one portion of the empty space. The cover member 129 may be provided to the cleaner body 110 or the suction unit 120. In this embodiment, the cover members 129 may protrude from both sides of the rear end portion of the suction unit 120 to cover outer circumferential surfaces of the cleaner body 110, respectively.

The cover members 129 are provided to fill in the empty space, i.e., at least one portion of the empty spaces between the cleaner body 110 and the suction unit 120. The cover member 129 is provided to fill in at least one portion of spaces recessed inward between left and right outer circumferential surfaces of the cleaner body 110 formed in a curve and both left and right end portions of the suction unit 120 formed to protrude from the respective left and right outer circumferential surfaces. The structure of the cover member 129 may prevent an obstacle from being caught in the empty space or may allow escape from an obstacle even when the obstacle is caught in the empty space.

The cover member 129 formed to protrude from the suction unit 120 may be supported by the outer circumferential surface of the cleaner body 110. When the cover member 129 is formed to protrude from the cleaner body 110, the cover member 129 may be supported by a rear surface portion of the suction unit 120. When the suction unit 120 collides with an obstacle and receives an impact from the obstacle, a portion of the impact is transferred to the cleaner body 110, such that the force of impact may be distributed.

The suction unit 120 may be detachably coupled to the cleaner body 110. The suction unit 120 may be swapped with a mop module. When a user intends to remove dust of a floor, the user may mount the suction unit 120 to the cleaner body 110. When the user intends to mop the floor, the user may mount the mop module to the cleaner body 110.

When the suction unit 120 is mounted to the cleaner body 110, the mounting may be guided by the cover members 129. The cover members 129 are provided to cover the outer circumferential surface of the cleaner body 110 such that a relative position of the suction unit 120 with respect to the cleaner body 110 can be determined and/or aligned.

The sensing unit 130 (sensor module) is provided at the cleaner body 110. The sensing unit 130 may be provided at one side of the cleaner body 110, i.e., the front of the cleaner main body 110. The sensing unit 130 may protrude from top and side surfaces of the cleaner body 110, and an upper end 134b1 (FIG. 5) of the sensing unit 130 is formed at a position protruding upward from the top surface of the cleaner body 110.

The sensing unit 130 may be provided to overlap with the suction unit 120 in the top-bottom direction of the cleaner body 110. The sensing unit 130 is provided above the suction unit 120 to sense an obstacle and/or geographic feature at the front thereof such that the suction unit 120 located foremost of the robot cleaner 100 does not collide with the obstacle and/or geographic feature. The sensing unit 130 is configured to additionally perform another sensing function other than a sensing function, which will be described in detail hereinafter.

A dust container accommodation part 113 (recess) is provided in the cleaner body 110, and the dust container 140 that separates and collects foreign substances of the sucked air is detachably coupled to the dust container accommodation part 113. The dust container accommodation part 113 may be formed at the other side of the cleaner body 110, e.g., the rear of the cleaner body 110. The dust container accommodation part 113 has a shape opened rearward and upward from the cleaner body 110. The dust container accommodation part 113 may be formed in a shape dented toward rear and front sides of the cleaner body 110.

A portion or front of the dust container 140 is accommodated in the dust container accommodation part 113. In this case, the other portion or rear of the dust container 140 may be formed to protrude toward the rear of the cleaner body 110 (i.e., in a reverse direction R opposite to the forward direction F).

An entrance 140a (see FIG. 20) through which air containing dust is introduced and an exit 140b (see FIG. 20) through which air having dust separated therefrom is discharged are formed in the dust container 140. When the dust container 140 is mounted in the dust container accommodation part 113, the entrance or inlet 140a and the exit or outlet 140b are configured to respectively communicate with a first opening 110a (see FIG. 19) and a second opening 110b (see FIG. 19), which are formed in an inner wall of the dust container accommodation part 113.

An intake flow path in the cleaner body 110 corresponds to a flow path from an introduction port 110' communicating with a communication part 120b" to the first opening 110a, and an exhaust flow path in the cleaner body 110 corresponds to a flow path from the second opening 110b to an exhaust port 112. See FIG. 18.

According to such an air flow connection relationship, air containing foreign substances, which is introduced through the suction unit 120, is introduced into the dust container 140 via the intake flow path in the cleaner body 110, and the foreign substances are separated from the sucked air by passing through at least one cyclone provided in the dust container 140. The foreign substances, e.g., dust is collected in the dust container 140, and the air is discharged from the dust container 140. The filtered air is discharged to the outside through the exhaust port 112 by passing through the exhaust flow path in the cleaner body 110.

Figure 4:
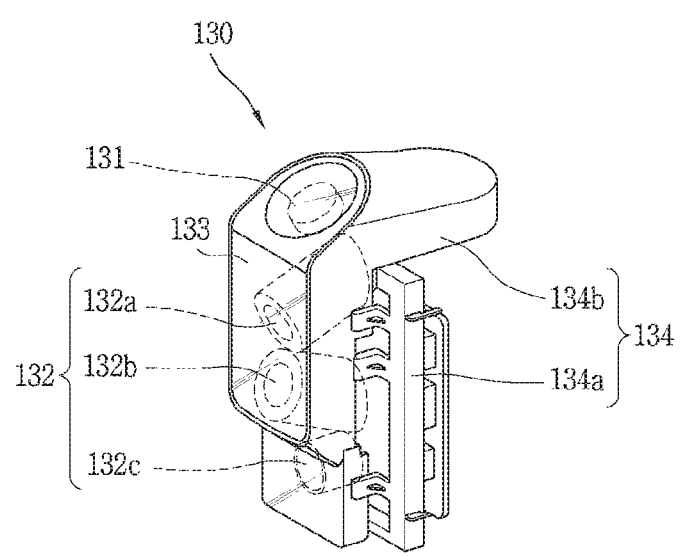
FIG. 4 is a view illustrating a sensing unit shown in FIG. 1.
Figure 5:
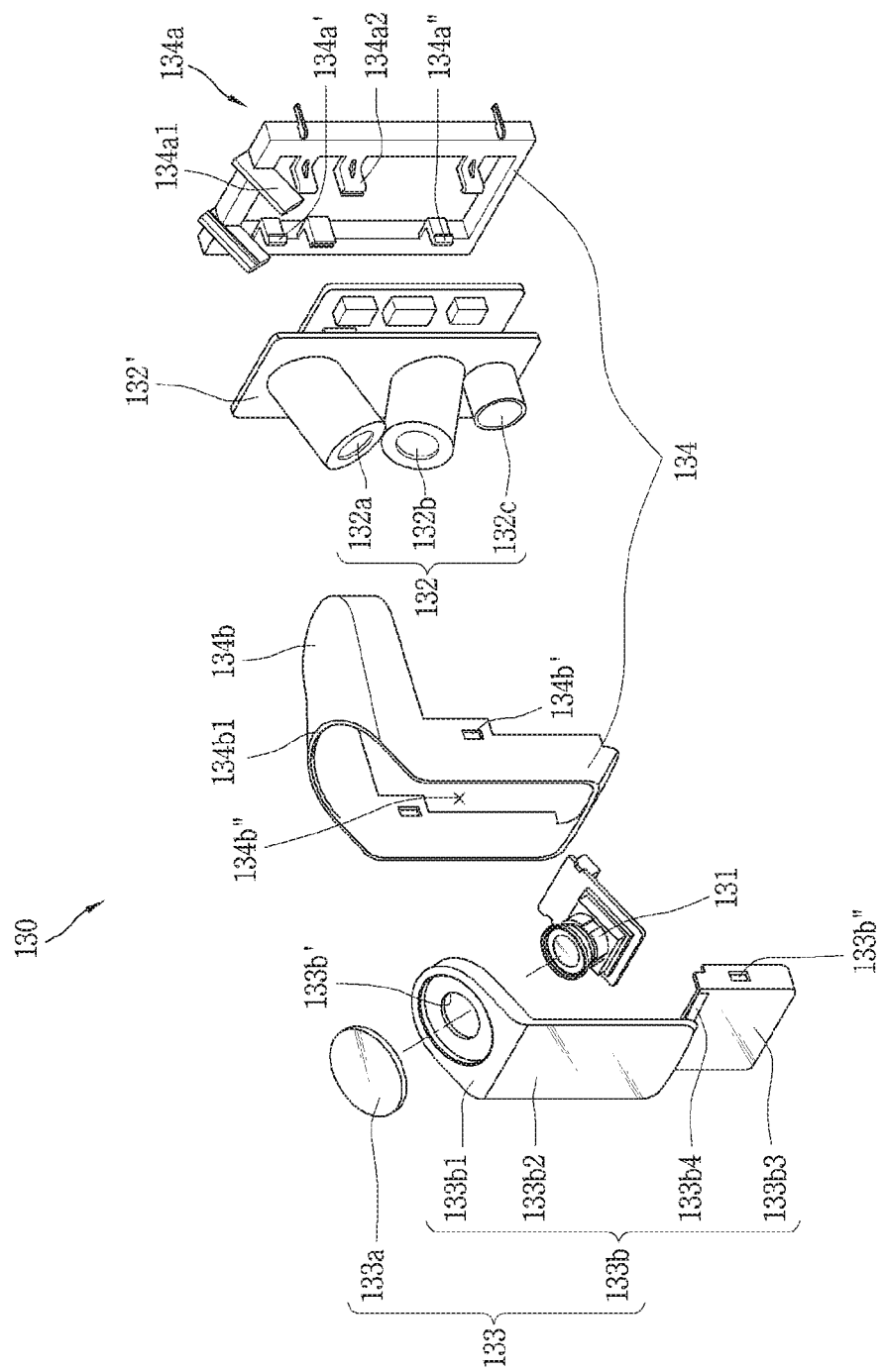
FIG. 5 is an exploded perspective view of the sensing unit shown in FIG. 4.
Figure 6:
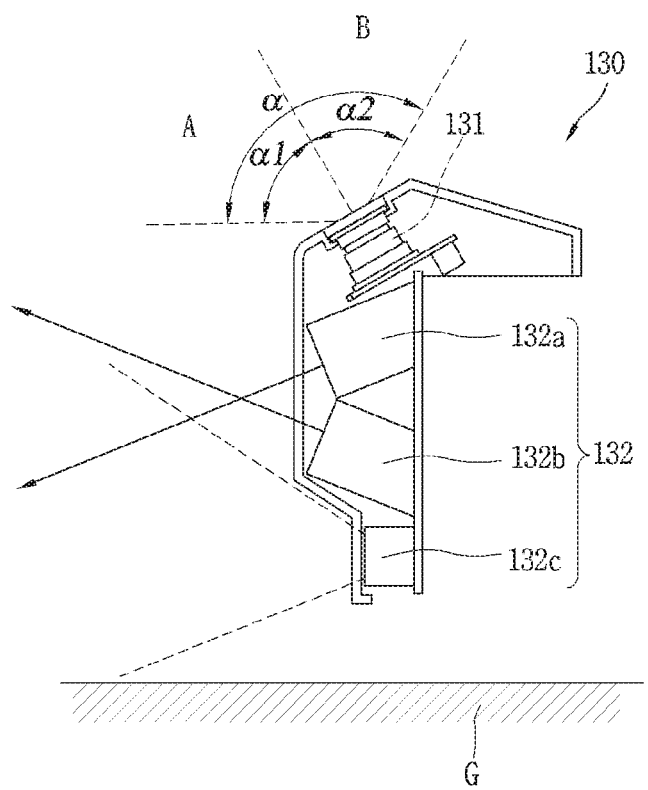
FIG. 6 is a view illustrating a section of the sensing unit shown in FIG. 4.

Referring to FIGS. 4 to 6, the sensing unit 130 includes a first sensing part 131 and a second sensing part 132. The first sensing part 131 (first image sensor) is provided inclined with respect to one surface of the cleaner body 110 to simultaneously photograph front and upper parts of the cleaner body 110. A camera may be used as the first sensing part 131. The camera may be inclined relative to a floor surface as a surface parallel to the floor, or the top or side surface of the cleaner body 110. For example, the first sensing part 131 may be provided inclined at 30 degrees with respect to the top surface of the cleaner body 110.

The first sensing part 131 may be located at an upper corner portion at which the top and side surfaces of the cleaner body 100 meet each other. For example, the first sensing part 131 may be provided at a middle upper corner portion of the cleaner body 110 to be inclined with respect to each of the top and side surfaces of the cleaner body 110. As the first sensing part 131 is provided inclined within a range of acute angles with respect to the one surface of the cleaner body 110, the sensing part 131 is configured to simultaneously photograph the front and upper parts of the cleaner body 110.

Figure 7:
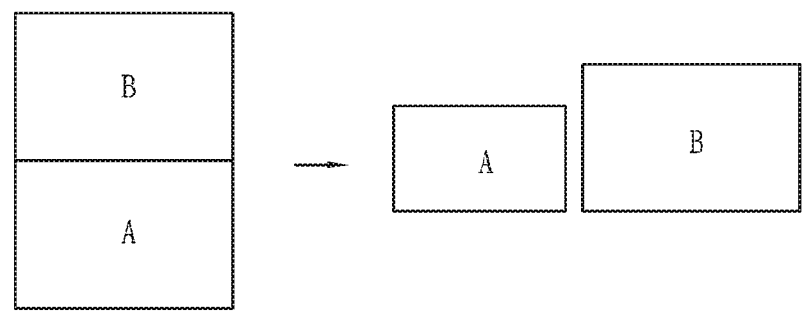
FIG. 7 is a view illustrating separation of an image photographed by a first sensing part shown in FIG. 6.

FIG. 7 in conjunction with FIG. 6 illustrates an image photographed by the first sensing part 131, which is divided into a front image A and an upper image B. The front image A and the upper image B, may be divided based on an angle α of view (field of view) in the top and bottom direction) of the first sensing part 131. An image corresponding to a portion α1 of the angle α of view in the photographed image A+B may be recognized as the front image A, and an image corresponding to the other portion α2 of the angle α of view in the photographed image A+B may be recognized as the upper image B. As shown in FIG. 6, the angle α of view may be an obtuse angle.

The front image A photographed by the first sensing part 131 is used to monitor the front in real time. For example, when the robot cleaner 100 is used for household purposes, the front image A photographed by the first sensing part 131 may be used for monitoring or to provide an image of the inside of the house to an electronic device (e.g., a mobile terminal possessed by the user) through a remote connection.

When the front image A photographed by the first sensing part 131 is used for monitoring a house, the following control or operational mode may be performed. The controller may compare fronts images A photographed by the first sensing part 131 at a preset time interval. When the front images A are different from each other, the controller may generate a control signal. The control may be performed in a state in which the cleaner body 110 is stationary. The control signal may be an alarm sound output signal or a transmission signal that provides a notification, a photographed front image, and the like to the electronic device through the remote connection.

When the front image A photographed by the first sensing part 131 is used to provide an image of the inside of the house to the electronic device, the following control or operational mode may be performed. When an image request signal is received by the robot cleaner from the electronic device through the remote connection, the controller may ascertain a front image A from an image photographed by the first sensing part 131 and transmit the front image A to the electronic device. The robot cleaner may be configured to move to a specific position by controlling driving of the wheel unit 111 and then transmit a front image at the corresponding position to the electronic device.

As shown in FIG. 6, the angle α of view may have a range in which the first sensing part 131 can photograph the upper image B including a ceiling. The upper image B photographed by the first sensing part 131 is used to generate a map of a traveling area and sense or determine a current position in the traveling area. For example, when the robot cleaner 100 is used for household purposes, the controller may generate a map of a traveling area, using a boundary between a ceiling and a side surface in the upper image B photographed by the first sensing part 131, and sense or determine a current position in the traveling area based on main feature points of the upper image B. The controller may use both upper image B and the front image A to generate a map of a traveling area and sense or determine a current position in the traveling area.

The second sensing part 132 (second sensor) is provided in a direction intersecting the first sensing part 131 to sense an obstacle or geographic feature located at the front thereof. The second sensing part 132 may be provided along the top-bottom direction at the side surface of the cleaner body 110. The second sensing part 132 includes a first pattern irradiating part or a first light source 132a, a second pattern irradiating part or a second light source 132b, and an image acquisition part or an image sensor 132c.

The first pattern irradiating part 132a is configured to irradiate a beam having a first pattern toward a front lower side or front bottom direction of the robot cleaner 100, and the second pattern irradiating part 132b is configured to irradiate a beam having a second pattern toward a front upper side or front upper direction of the robot cleaner 100. The first pattern irradiating part 132a and the second pattern irradiating part 132b may be provided in a line along the top-bottom direction of the cleaner body. As an example, the second pattern irradiating part 132b is provided under or below the first pattern irradiating part 132a.

The image acquisition part or second image sensor 132c is configured to photograph, in a preset photographing area, the beams having the first and second patterns, which are respectively irradiated by the first pattern irradiating part 132a and the second pattern irradiating part 132b. The preset photographing area includes an area from the floor to an upper end of the robot cleaner 100. The robot cleaner 100 may sense or detect an obstacle at the front thereof, and it is possible to prevent the robot cleaner 100 from colliding with an upper portion of the cleaner body being stuck or colliding with an obstacle.

The preset photographing area may be, for example, an area within an angle of view of 105 degrees in the top-bottom direction (i.e., the vertical direction), an angle of view of 135 degrees in the left-right direction (i.e., the horizontal direction), and the front of 25 m relative to the cleaner body. The preset photographing area may be changed depending on various factors such as installation positions of the first and second pattern irradiating parts 132a and 132b, irradiation angles of the first and second pattern irradiating parts 132a and 132b, and a height of the robot cleaner 100.

The first pattern irradiating part 132a, the second pattern irradiating part 132a, and the image acquisition part 132c may be provided in a line along the top-bottom direction of the cleaner body 110. As illustrated, the image acquisition part 132c is provided under the second pattern irradiating part 132b. The first pattern irradiating part 132a is provided to be downwardly inclined with respect to the side surface of the cleaner body 110, and the second pattern irradiating part 132b is provided to be upwardly inclined with respect to the side surface of the cleaner body 110.

Figure 8:
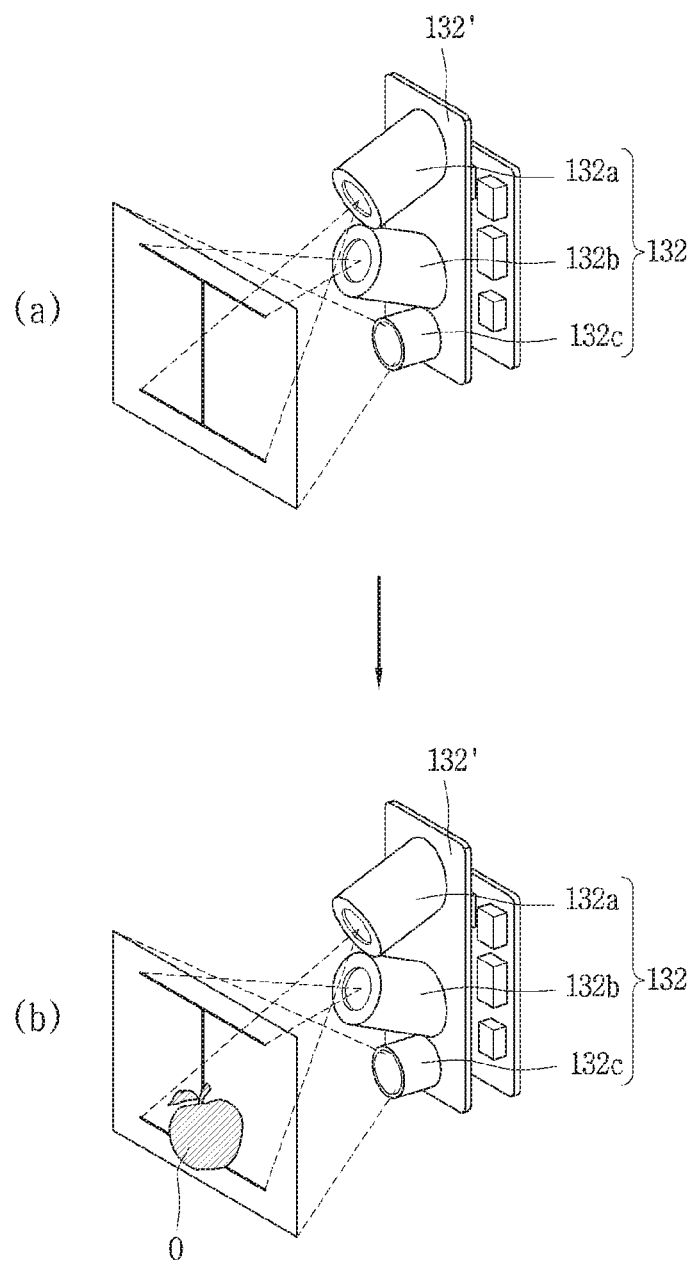
FIG. 8 illustrates sensing of an obstacle by a second sensing part shown in FIG. 4.

Referring to (a) of FIG. 8, the first pattern irradiating part 132a and the second pattern irradiating part 132b are configured to respectively irradiate beams having first and second patterns that have a shape extending at least one direction. As illustrated, the first pattern irradiating part 132a irradiates linear beams intersecting each other and the second pattern irradiating part 132b irradiates a single linear beam. Accordingly, a bottommost beam is used to sense an obstacle at a bottom portion, a topmost beam is used to sense an obstacle at a top portion, and a middle beam between the bottommost beam and the topmost beam is used to sense an obstacle at a middle portion.

For example, as shown in (b) of FIG. 8, when an obstacle O is located at the front, the bottommost beam and a portion of the middle beam may be interrupted or distorted by the obstacle O. When such interruption or distortion is sensed, the image acquisition part 132c transmits an obstacle sensing signal to the controller.

If the obstacle sensing signal is received, the controller determines that the obstacle O is located, and controls the driving of the wheel unit 111. For example, the controller may apply a driving force in the opposite direction to the main wheels 111a such that the robot cleaner 100 moves rearward. Alternatively, the controller may apply the driving force to only any one of the main wheels 111a such that the robot cleaner 100 rotates, or apply the driving force to both the main wheels 111a in directions different from each other.

Figure 9:
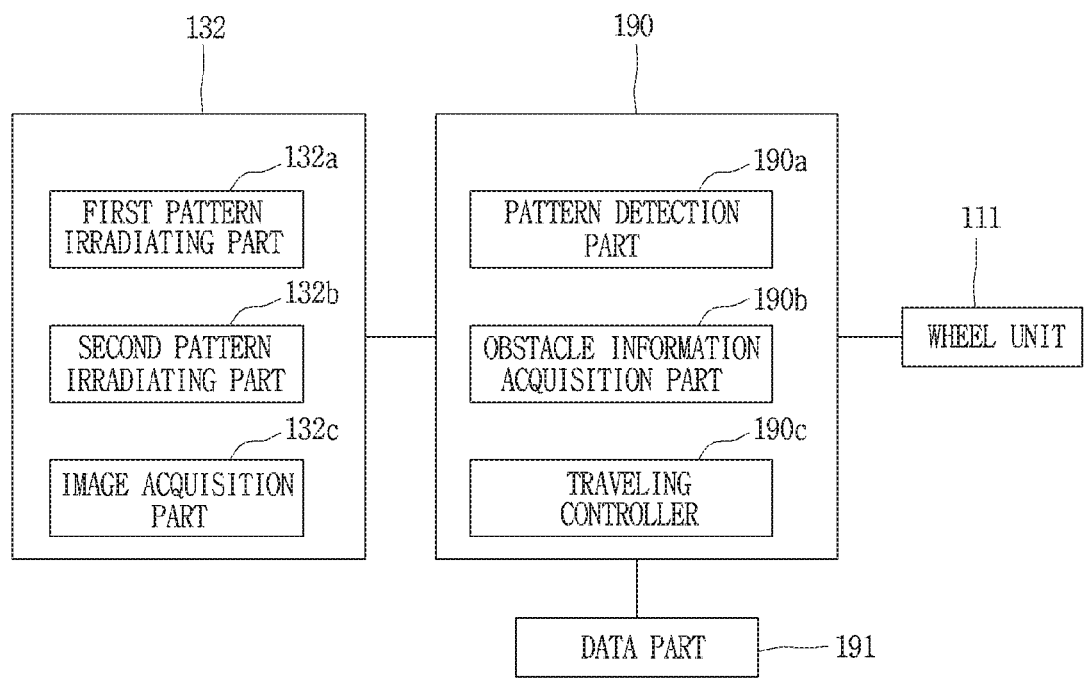
FIG. 9 is a block diagram illustrating main parts related to avoidance of an obstacle using the second sensing part.

FIG. 9 is a block diagram illustrating main parts or components related to avoidance of an obstacle using the second sensing part 132. The robot cleaner 100 includes the wheel unit 111, a data part or storage device 191, a second sensing part 132, and a controller 190 that controls overall operations.

The controller 190 may include a traveling or movement controller 190c that controls the wheel unit 111. As a left main wheel 111a and a right main wheel 111a are independently driven by the traveling controller 190c, the robot cleaner 100 may move in a straight direction or rotate left or right. A driving motor of which driving is controlled according to a control command of the traveling controller 190c may be connected to each of the left main wheel 111a and the right main wheel 111a.

The controller 190 may include a pattern detection part or pattern detector 190a that detects a pattern by analyzing data input from the second sensing part 132 and an obstacle information acquisition part or module 190b that determines whether an obstacle exists from the detected pattern. The pattern detection part 190a detects beam patterns P1 and P2 from an image (acquired image) acquired by the image acquisition part 132. The pattern detection part 190a may detect features of points, lines, surfaces, and the like with respect to predetermined pixels constituting the acquired image, and detect the beam patterns P1 and P2 or points, lines, surfaces, and the like, which constitute the beam patterns P1 and P2. The obstacle information acquisition part 190b determines whether an obstacle exists based on the patterns detected from the pattern detection part 190a, and determine a shape of the obstacle.

The data part 191 stores reference data that stores an acquired image input from the second sensing part 132 and allows the obstacle information acquisition part 190b to determine whether an obstacle exists. The data part 191 stores obstacle information on a sensed obstacle. The data part 191 stores control data for controlling an operation of the robot cleaner 100 and data corresponding to a cleaning mode of the robot cleaner 100. The data part 191 stores a map generated or received from the outside. In addition, the data part 191 stores data readable by a microprocessor, and may include a hard disk driver (HDD), a solid state disk (SSD), a silicon disk drive (SDD), a ROM, a RAM, a CD-ROM, a magnetic tape, a floppy disk, and an optical data storage device.

The second sensing part 132 includes the first pattern irradiating part 132a, the second pattern irradiating part 132b, and the image acquisition part 132c. The second sensing part 132 is installed at a front side of the cleaner body 110. In the second sensing part 132, the first and second pattern irradiating parts 132a and 132b irradiate beams P1 and P2 having first and second patterns toward the front of the robot cleaner 100, and the image acquisition part 132c acquires an image by photographing the irradiated beams having the patterns.

The controller 190 stores an acquired image in the data part 191, and the pattern detection part 190a extracts a pattern by analyzing the acquired image. The pattern detection part 190a extracts a beam pattern obtained by irradiating a beam having a pattern, which is irradiated from the first pattern irradiating part 132a or the second pattern irradiating part 132b, onto a floor or obstacle. The obstacle information acquisition part 190b determines whether an obstacle exists, based on the extracted beam pattern.

The controller 190 determines whether an obstacle exists through an acquired image input from the second sensing part 132 and controls the wheel unit 111 to travel while avoiding the obstacle by changing a moving direction or traveling route.

When a cliff (e.g., stairs) exists in the vicinity of the robot cleaner 100, the robot cleaner 100 may fall from the cliff. The controller 190 may sense the cliff through an acquired image, and reconfirm whether the cliff exists through a cliff sensor 124, to control the traveling of the robot cleaner 100 such that the robot cleaner 100 does not fall from the cliff. When it is determined that a cliff does exist, the controller 190 may control the wheel unit 111 to travel along the cliff by determining a change in beam pattern through an acquired image.

In addition, when the movement of the robot cleaner 100 may be restricted due to a plurality of obstacles existing in an area having a certain size or less, the controller 190 may determine whether the robot cleaner 100 is in a restricted situation, and set an escape mode such that the robot cleaner 100 avoids the restricted situation. The controller 190 may allow the robot cleaner 100 to avoid the restricted situation by setting an escape route based on information on each obstacle around the robot cleaner 100 according to whether a currently set mode is a fundamental mode or a fast cleaning mode.

For example, in the fundamental mode, the controller 190 may generate a map on a peripheral area by acquiring information on all obstacles around the robot cleaner 100 and then set an avoidance route. In the fast cleaning mode, the controller 190 may set an avoidance route by determining whether the robot cleaner 100 is to enter according to a distance between sensed obstacles.

The controller 190 determines a distance between sensed obstacles by analyzing a beam pattern of an acquired image with respect to the sensed obstacles, and determines that the robot cleaner 100 is to travel and enter when the distance between the obstacles is a certain value or more, to control the robot cleaner 100 to travel. Thus, the controller 190 enables the robot cleaner 100 to escape a restricted situation.

Figure 10:
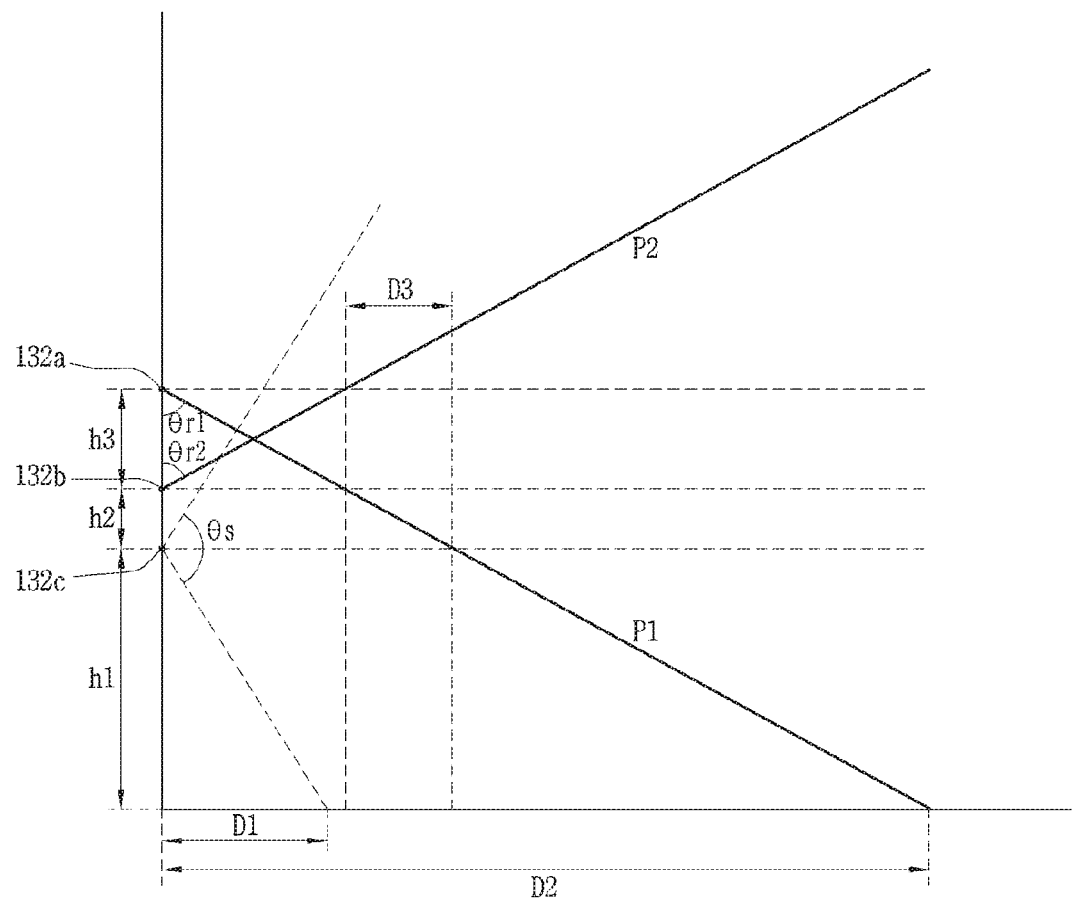
FIG. 10 is a view illustrating a beam irradiation range of first and second pattern irradiating parts and an obstacle detection range of an image acquisition part.

FIG. 10 is a view illustrating a beam irradiation range of the first and second pattern irradiating parts 132a and 132b and an obstacle detection range of the image acquisition part 132c. Each of the first and second pattern irradiating parts 132a and 132b may include a beam source and an optical pattern projection element (OPPE) that generates a beam having a predetermined pattern as a beam irradiated from the beam source is transmitted therethrough.

The beam source may be a laser diode (LD), a light emitting diode (LED), or the like. Since a laser beam has characteristics of monochromaticity, straightness, and connectivity, the laser diode is superior to other beam sources, and thus can accurately measure a distance. In particular, since an infrared or visible ray has a large variation in accuracy of distance measurement depending on factors such as a color and a material of an object, the laser diode is used as the beam source.

A pattern generator may include a lens and a diffractive optical element (DOE). Beams having various patterns may be irradiated according to a configuration of a pattern generator provided in each of the first and second pattern irradiating parts 132a and 132b. The first pattern irradiating part 132a may irradiate a beam P1 having a first pattern (hereinafter, referred to as a first pattern beam) toward a front lower side of the cleaner body 110. The first pattern beam P1 may be incident onto a floor of a cleaning area. The first pattern beam P1 may be formed in the shape of a horizontal line. The first pattern beam P1 may be formed in the shape of a cross pattern in which a horizontal line and a vertical line intersect each other.

The first pattern irradiating part 132a, the second pattern irradiating part 132b, and the image acquisition part 132c may be vertically aligned. As illustrated, the image acquisition part 132c is provided under the first pattern irradiating part 132a and the second pattern irradiating part 132b. However, the present disclosure is not necessarily limited thereto, and the image acquisition part 132c may be provided above the first pattern irradiating part 132a and the second pattern irradiating part 132b.

The first pattern irradiating part 132a may also sense an obstacle located lower than the first pattern irradiating part 132a by downwardly irradiating the first pattern beam P1 toward the front, and the second pattern irradiating part 132b may be located at a lower side of the first pattern irradiating part 132a to upwardly irradiate a beam P2 having a second pattern (hereinafter, referred to as a second pattern beam) toward the front. The second pattern beam P2 may be incident onto an obstacle or a certain portion of the obstacle, which is located higher than at least the second pattern irradiating part 132b from the floor of the cleaning area. The second pattern beam P2 may have a pattern different from that of the first pattern beam P1, and may be configured to include a horizontal line. The horizontal line is not necessarily a consecutive line segment but may be formed as a dotted line.

Meanwhile, a horizontal irradiation angle of the first pattern beam P1 irradiated from the first pattern irradiating part 132a (e.g., an angle made by both ends of the first pattern beam P1 and the first pattern irradiating part 132a) may be defined in a range of 130 degrees to 140 degrees, but the present disclosure is not necessarily limited thereto. The first pattern beam P1 may be formed in a shape symmetrical with respect to the front of the robot cleaner 100.

Like the first pattern irradiation part 132a, a horizontal irradiation angle of the second pattern irradiating part 132b may be defined in a range of 130 degrees to 140 degrees. In some other embodiments, the second pattern irradiating part 132b may irradiate the second pattern beam P2 at the same horizontal irradiation angle as the first pattern irradiating part 132a. In this case, the second pattern beam P2 may also be formed in a shape symmetrical with respect to the front of the robot cleaner 100.

The image acquisition part 132c may acquire an image of the front of the cleaner body 110. The pattern beams P1 and P2 are shown in an image acquired by the image acquisition part 132c (hereinafter, referred to as an acquired image). Hereinafter, images of the pattern beams P1 and P2 shown in the acquired image are referred to as beam patterns. Since the beam patterns are images formed as the pattern beams P1 and P2 incident onto an actual space are formed in an image sensor, the beam patterns are designated by the same reference numerals as the pattern beams P1 and P2. Images corresponding to the first pattern beam P1 and the second pattern beam P2 are referred to as a first beam pattern P1 and a second beam pattern P2, respectively.

The image acquisition part 132 may include a digital image acquisition part that converts an image of a subject into an electrical signal and then converts the electrical signal into a digital signal to be stored in a memory device. The digital image acquisition part may include an image sensor and an image processing part or processor.

The image sensor is a device that converts an optical image into an electrical signal, and is configured as a chip having a plurality of photo diodes integrated therein. An example of the photo diode may be a pixel. Electric charges are accumulated in each of the pixels by an image formed in the chip through a beam passing through a lens. The electric charges accumulated in the pixel are converted into an electric signal (e.g., a voltage). A charge coupled device (CCD), a complementary metal oxide semiconductor (CMOS), and the like are well known as the image sensor.

The image processing part generates a digital image, based on an analog signal output from the image sensor. The image processing part may include an AD converter that converts an analog signal into a digital signal, a buffer memory that temporarily records digital data according to the digital signal output from the AD converter, and a digital signal processor (DSP) that generates a digital image by processing the data recorded in the buffer memory.

The pattern detection part 190a may detect features of points, lines, surfaces, and the like with respect to predetermined pixels constituting an acquired image, and detect the beam patterns P1 and P2 or points, lines, surfaces, and the like, which constitute the beam patterns P1 and P2. For example, the pattern detection part 190a may extract a horizontal line constituting the first beam pattern P1 and a horizontal line constituting the second beam pattern P2 by extracting line segments configured as pixels brighter than surroundings are consecutive. However, the present disclosure is not limited thereto. Since various techniques of extracting a pattern having a desired shape from a digital image have already been well known in the art, the pattern detection part 190a may extract the first beam pattern P1 and the second beam pattern P2 using these techniques.

The first pattern irradiating part 132a and the second pattern irradiating part 132b are vertically provided to be spaced apart from each other at a distance h3. The first pattern irradiating part 132a downwardly irradiates a first pattern beam, and the second pattern irradiating part 132b upwardly irradiates a second pattern beam, so that the first and second pattern beams intersect each other.

The image acquisition part 132c is provided downward from the second pattern irradiating part 132b at a distance h2 to photograph an image of the front of the cleaner body 110 at an angle θs of view with respect to the top-bottom direction. The image acquisition part 132c is installed at a position spaced apart from the bottom surface at a distance h1. The image acquisition part 132c may be preferably installed at a position that does not interfere with the photographing of an image of the front, by considering the shape of the suction unit 120.

Each of the first pattern irradiating part 132a and the second pattern irradiating part 132b is installed such that a direction in which the direction of optical axes of lenses constituting each of the first pattern irradiating part 132a and the second pattern irradiating part 132b forms a certain irradiation angle.

The first pattern irradiating part 132a downwardly irradiates the first pattern beam P1 at a first irradiation angle θr1, and the second pattern irradiating part 132b upwardly irradiates the second pattern beam P2 at a second irradiation angle θr2. The first irradiation angle θr1 and the second irradiation angle θr2 are basically different from each other, but may be set equal to each other in some cases. The first irradiation angle θr1 and the second irradiation angle θr2 may be preferably set in a range of 50 degrees to 75 degrees, but the present disclosure is not necessarily limited thereto. For example, the first irradiation angle θr1 may be set to 60 degrees to 70 degrees, and the second irradiation angle θr2 may be set to 50 degrees to 55 degrees. The first irradiation angle θr1 and the second irradiation angle θr2 may be changed depending on the shape of the suction unit 120 and the height of an upper portion to be sensed.

When a pattern beam irradiated from the first pattern irradiating part 132a and/or the second pattern irradiating part 132b is incident onto an obstacle, the positions of the beam patterns P1 and P2 in an acquired image may be changed depending on a position at which the obstacle is distant from the first pattern irradiating part 132a. For example, when the first pattern beam P1 and the second pattern beam P2 are incident onto a predetermined obstacle, the first beam pattern P1 is displayed at a higher position in the acquired image as the obstacle is located closer to the robot cleaner 100. On the contrary, the second beam pattern P2 is displayed at a lower position in the acquired image as the obstacle is located more distant from the robot cleaner 100.

Data on distances to an obstacle, which correspond to rows (lines configured with pixels arranged in the lateral direction) constituting an image generated by the image acquisition part 132c, is stored in advance. If the beam patterns P1 and P2 detected in the image acquired through the image acquisition part 132c are detected on a predetermined row, a position of the obstacle may be estimated from data on a distance to the obstacle, which corresponds to the row. The angle θs of view of the image acquisition part 132c may be set to a value of 100 degrees or more, and be preferably set to 100 degrees to 110 degrees. However, the present disclosure is not necessarily limited thereto.

In addition, the distance from the floor of the cleaning area to the image acquisition part 132c may be set to about 60 mm to 70 mm. In this case, the floor of the cleaning area in the image acquired by the image acquisition part 132c is shown posterior to D1 from the image acquisition part 132c, and D2 is a position at which the first beam pattern P1 is displayed on the floor shown in the acquired image.

When an obstacle is located in D2, an image in which the first beam pattern P1 is incident onto the obstacle may be acquired by the image acquisition part 132c. When the obstacle comes closer to the robot cleaner 100 than D2, the first optical pattern is displayed upward of a reference position ref1, corresponding to the incident first pattern beam P1.

The distance from the cleaner body 110 to D1 may be 100 mm to 150 mm, and the distance from the cleaner body 110 to D2 may be preferably 180 mm to 280 mm. However, the present disclosure is not necessarily limited thereto. Meanwhile, D3 represents a distance from a most protruding portion of the front of the cleaner body 110 to a position at which the second pattern beam is incident. Since the cleaner body 110 senses an obstacle during traveling, D3 is a minimum of distance at which the cleaner body 110 can sense the obstacle at the front (upper portion) thereof without colliding with the obstacle. D3 may be set to about 23 mm to 30 mm.

When the first beam pattern P1 shown in an acquired image disappears in a normal state during traveling of the cleaner body 110 or when a portion of the first beam pattern is displayed in the acquired image, the obstacle information acquisition part 190b determines that a cliff exists in the vicinity of the robot cleaner 100.

When the first beam pattern P1 is not displayed in the acquired image, the obstacle information acquisition part 190b may recognize that a cliff exists at the front of the robot cleaner 100. When a cliff (e.g., stairs) exists at the front of the robot cleaner 100, the first pattern beam is not incident onto the floor, and therefore, the first beam pattern P1 disappears in the acquired image.

The obstacle information acquisition part 190b may determine that a cliff exists at the front distant by D2 from the cleaner body 110, based on a length of D2. In this case, when the first beam pattern P1 has a cross shape, the horizontal line disappears and only the vertical line is displayed. Therefore, the obstacle information acquisition part 190b may determine that a cliff exists.

In addition, when a portion of the first beam pattern is not displayed, the obstacle information acquisition part 190b may determine that a cliff exists at the left or right side of the robot cleaner 100. When a right portion of the first beam pattern is not displayed, the obstacle information acquisition part 190b may determine that a cliff exists at the right side of the robot cleaner 100. Based on detected information on a cliff, the obstacle information acquisition part 190b can control the wheel unit 111 to travel along a route on which the robot cleaner 100 does not fall from the cliff.

When a cliff exists at the front of the robot cleaner 100, the traveling controller 190c may again check whether a cliff exists, using a cliff sensor installed at a lower portion of the cleaner body 110, by moving forward by a certain distance, e.g., D2 or less. The robot cleaner 100 can primarily check whether a cliff exists through an acquired image and secondarily check whether a cliff exists through the cliff sensor.

Figure 11:
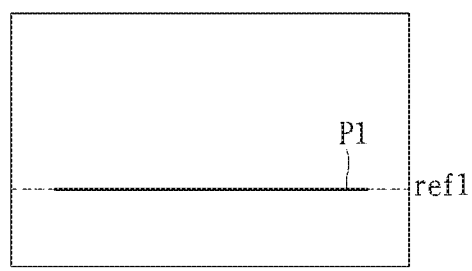
FIG. 11 is a view illustrating a beam having a first pattern, irradiated by the first pattern irradiating part.
Figure 11:
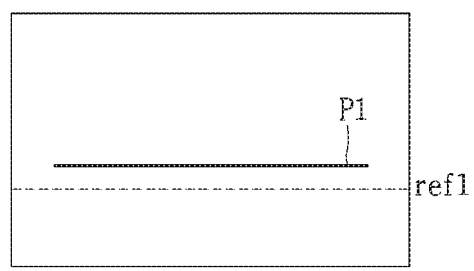
Figure 11:
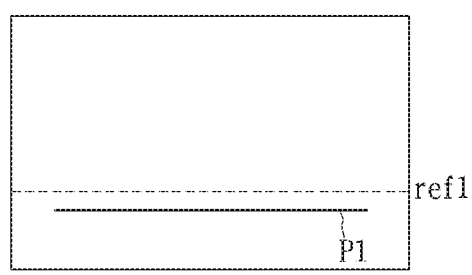
Figure 11:
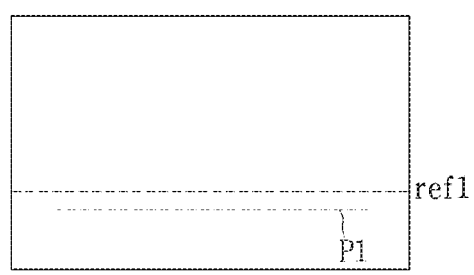
Figure 11:
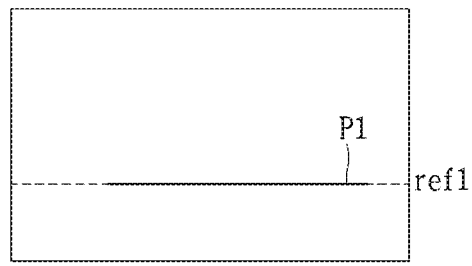

FIG. 11 is a view illustrating a beam having a first pattern, irradiated by the first pattern irradiating part 132a. The pattern detection part 190a detects a first beam pattern or a second beam patter from an acquired image input from the image acquisition part 132c and applies the first or second beam pattern to the obstacle information acquisition part 190b. The obstacle information acquisition part 190b analyzes the first or second beam pattern detected from the acquired image and compares a position of the first beam pattern with the reference position ref1, thereby determining whether an obstacle exists.

As shown in (a) of FIG. 11, when the horizontal line of the first beam pattern P1 is located at the reference position ref1, the obstacle information acquisition part 190b determines that a current state is a normal state. The normal state is a state in which the floor is even and flat, and is a state in which the robot cleaner 100 can continuously travel as any obstacle does not exist at the front of the robot cleaner.

The second beam pattern P2 is incident onto an obstacle only when the obstacle exists at an upper portion of the front to be displayed in an acquired image. The second beam pattern P2 is not generally displayed in the acquired image in the normal state.

As shown in (b) of FIG. 11, when the horizontal line of the first beam pattern P1 is located above the reference position ref1, the obstacle information acquisition part 190b determines that an obstacle exists at the front. If an obstacle is detected through the obstacle information acquisition part 190*b* as described above, the traveling controller 190*c* controls the wheel unit 111 to travel while avoiding the obstacle. Meanwhile, the obstacle information acquisition part 190*b* may determine the position and size of the sensed obstacle, corresponding to the positions of the first and second beam patterns P1 and P2 and whether the second beam pattern P2 has been displayed. In addition, the obstacle information acquisition part 190*b* may determine the position and size of the obstacle, corresponding to changes of the first and second beam patterns P1 and P2 displayed in the acquired image during traveling.

The traveling controller 190*c* controls the wheel unit 111 by determining whether the wheel unit 111 is to continuously travel with respect to the obstacle or to travel while avoiding the obstacle, based on information of the obstacle, which is input from the obstacle information acquisition part 190*b*. For example, when the height of the obstacle is lower than a certain height or less or when the cleaner body 110 is to enter into a space between the obstacle and the floor, the traveling controller 190*c* determines that the traveling of the wheel unit 111 is possible.

As shown in (c) of FIG. 11, the first beam pattern P1 may be displayed at a position lower than the reference position ref1. When the first beam pattern P1 may be displayed at a position lower than the reference position ref1, the obstacle information acquisition part 190*b* determines that a downhill road exists. In the case of a cliff, the first beam pattern P1 disappears, and therefore, the downhill road is distinguished from the cliff.

As shown in (d) of FIG. 11, the obstacle information acquisition part 190*b* determines that a cliff exists in a traveling direction when the first beam pattern P1 is not displayed. As shown in (e) of FIG. 11, when a portion of the first beam pattern P1 is not displayed, the obstacle information acquisition part 190*b* may determines that a cliff exists at the left or right side of the cleaner body 110. In this case, the obstacle information acquisition part 190*b* determines that a cliff exists at the left side of the cleaner body 110. Meanwhile, when the first beam pattern P1 has a cross shape, an obstacle may be determined by considering both the position of the horizontal line and the length of the vertical line.

Figure 12:
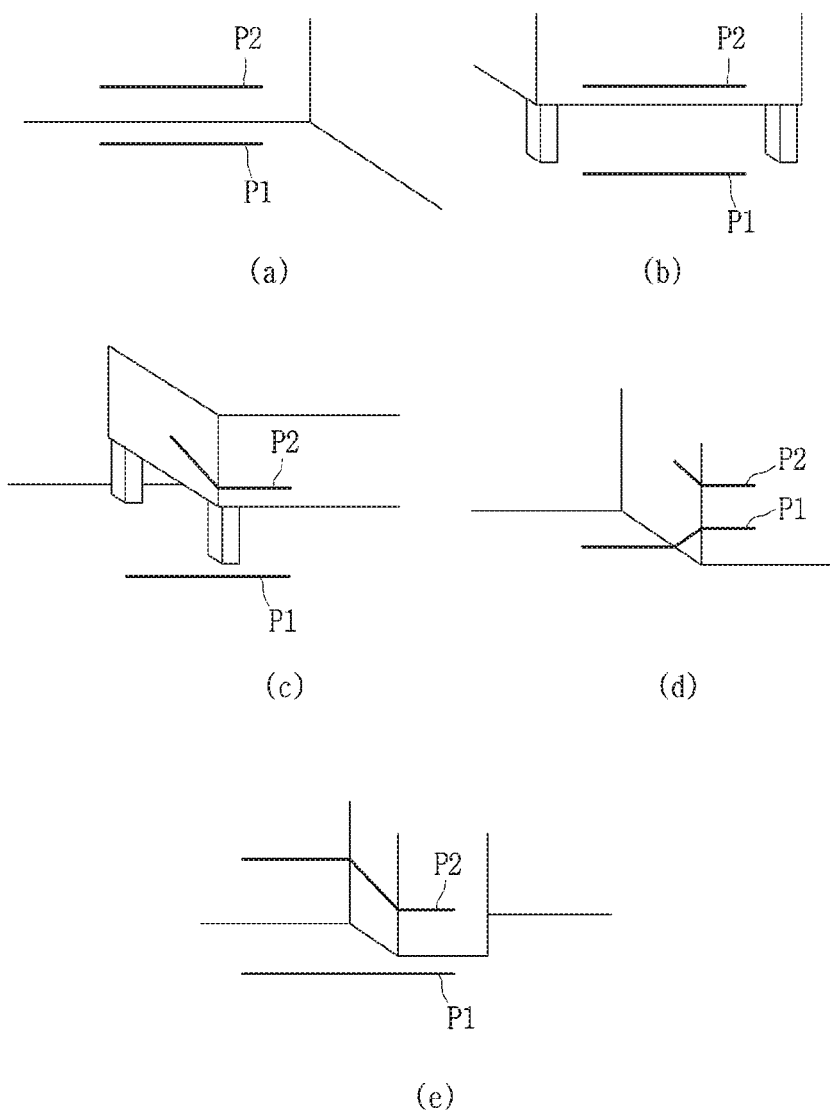
FIG. 12 is a view illustrating shapes of first and second beam patterns irradiated onto each obstacle for each shape of the obstacle.
Figure 13:
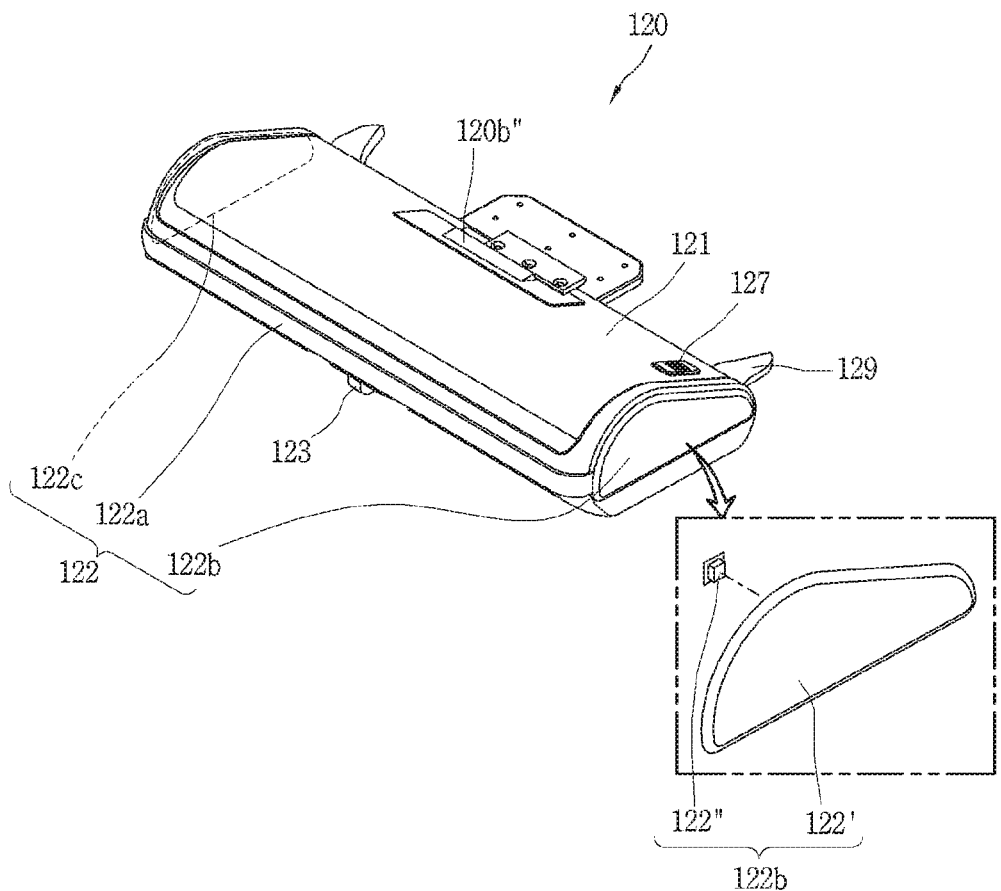
FIG. 13 is a view illustrating a suction unit shown in FIG. 1.
Figure 14:
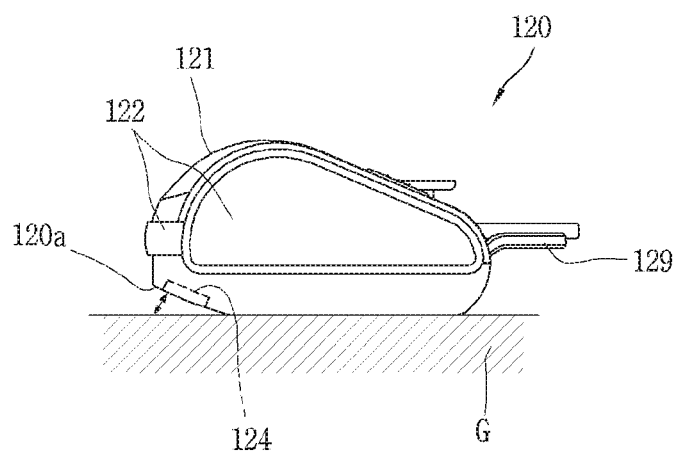
FIG. 14 is a side view of the suction unit shown in FIG. 13.
Figure 15:
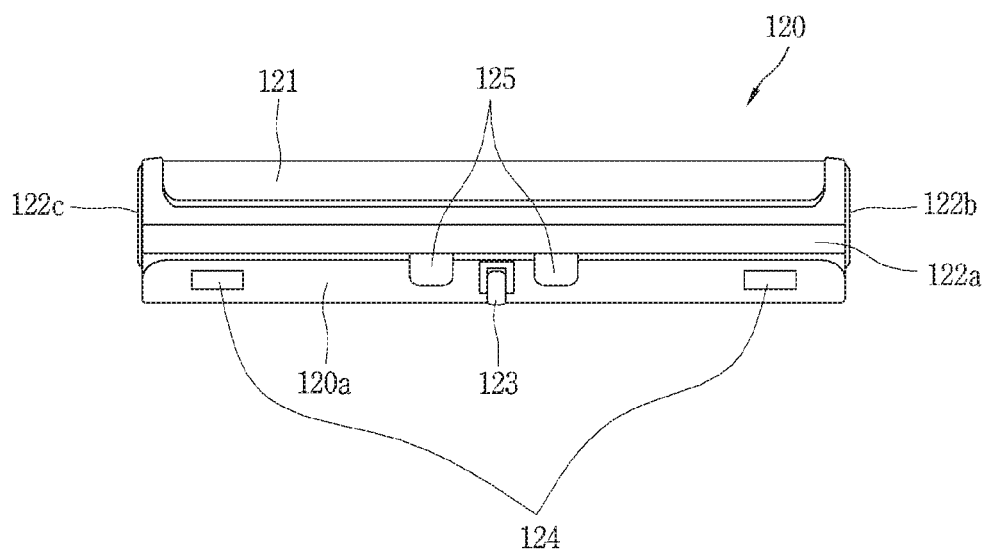
FIG. 15 is a front view of the suction unit shown in FIG. 13.
Figure 16:
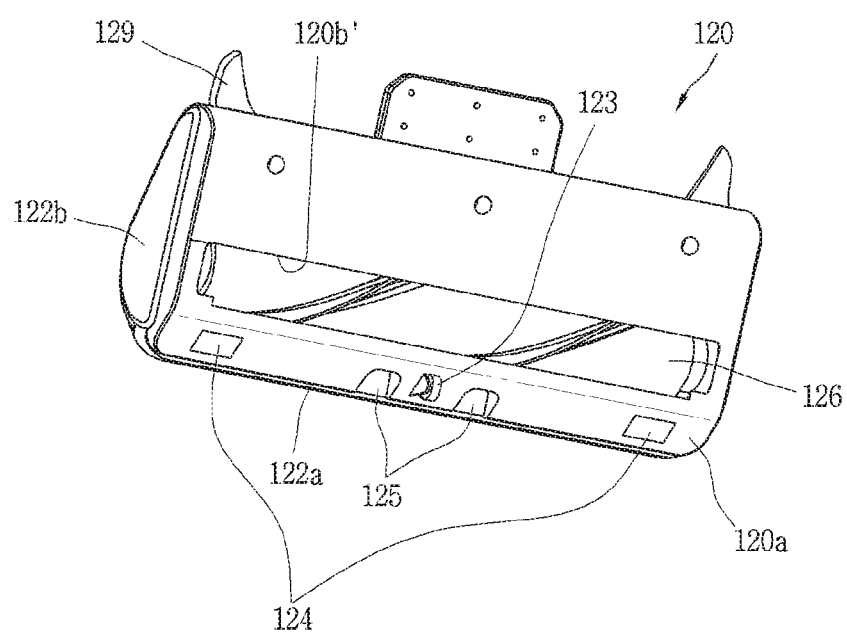
FIG. 16 is a view illustrating a bottom portion of the suction unit shown in FIG. 13.

FIG. 12 illustrates shapes of the first and second beam patterns P1 and P2 irradiated onto each obstacle for each shape of the obstacle. As beams irradiated from the first and second pattern irradiating parts 132*a* and 132*b* are incident onto an obstacle, so that beam patterns are shown in an acquired image, the obstacle information acquisition part 190*b* may determine the position, size, and shape of the obstacle.

As shown in (a) of FIG. 12, when a wall surface exists at the front during traveling of the cleaner body 110, a first pattern beam is incident onto a floor and a second pattern beam is incident onto the wall surface. The first beam pattern P1 and the second beam pattern P2 are displayed as two horizontal lines in an acquired image. When a distance of the cleaner body 110 to the wall surface is longer than D2, the first beam pattern P1 is displayed at the reference position ref1, but the second beam pattern P2 is also displayed together with the first beam pattern P1. Therefore, the obstacle information acquisition part 190*b* may determine that an obstacle exists.

Meanwhile, when the distance of the cleaner body 110 to the wall surface is less than D2, the first pattern beam is incident onto the wall surface instead of the floor. Therefore, the first beam pattern P1 is displayed at an upper side of the reference position ref1, and the second beam pattern P2 is displayed at an upper side of the first beam pattern P1. Since the position of the second beam pattern P2 is displayed at a lower side as the second beam pattern P2 approaches the obstacle, the second beam pattern P2 is displayed at a lower side as compared with when the distance of the cleaner body 110 to the wall surface is longer than D2. The second pattern beam P2 is displayed at an upper side as compared with the reference position ref1 and the first beam pattern P1. Accordingly, the obstacle information acquisition part 190*b* can calculate a distance of the cleaner body 110 to the wall surface as an obstacle through the first beam pattern P1 and the second beam pattern P2.

As shown in (b) of FIG. 12, when an obstacle such as a bed or a dresser exists, the first beam pattern P1 and the second beam pattern P2 are incident as two horizontal lines onto a floor and an obstacle, respectively. The obstacle information acquisition part 190*b* determines whether an obstacle exists, based on the first beam pattern P1 and the second beam pattern P2. The height of the obstacle may be determined based on a position of the second beam pattern P2 and a change of the second beam pattern P2, which occurs while the cleaner body 110 is approaching the obstacle. Accordingly, the traveling controller 190*c* controls the wheel unit 111 by determining whether the cleaner body 110 is to enter into a lower space of the obstacle. For example, when an obstacle having a predetermined space formed from the floor, such as a bed in a cleaning area, is located, the traveling controller 190*c* may recognize the space, and preferably determine whether to pass through or avoid the obstacle by detecting the height of the space.

When it is determined that the height of the space is lower than that of the cleaner body 110, the traveling controller 190*c* may control the wheel unit 111 such that the cleaner body 110 travels while avoiding the obstacle. On the other hand, when it is determined that the height of the space is higher than that of the cleaner body 110, the traveling controller 190 may control the wheel unit 111 such that cleaner body 110 enters into or passes through the space.

Although the first beam pattern P1 and the second beam pattern P2 are displayed as two horizontal lines even in (a) of FIG. 12, a distance between the first beam pattern P1 and the second beam pattern P2 in (b) of FIG. 12 is different from that between the first beam pattern P1 and the second beam pattern P2 in (a) of FIG. 12. Therefore, the obstacle information acquisition part 190*b* may distinguish the difference. In (a) of FIG. 12, the position of the first beam pattern P1 is displayed higher than the reference position ref1 as the first beam pattern approaches the obstacle. However, as shown in (b) of FIG. 12, when an obstacle is located above the cleaner body 110, the first beam pattern P1 is displayed at the reference position ref1 and the position of the second beam pattern P2 is changed even when they approach the obstacle by a certain distance. The obstacle information acquisition part 190*b* may distinguish the kind of the obstacle.

As shown (c) of FIG. 12, in the case of a corner of an obstacle such as a bed or dresser, as the first beam pattern P1 is irradiated as a horizontal line onto a floor, and the second beam pattern P2 is irradiated onto the corner of the obstacle. As the second beam pattern P2 is irradiated onto the corner of the obstacle, a portion of the second beam pattern P2 is displayed as a horizontal line, and the other portion of the second beam pattern P2 is displayed as an oblique line. Since the position of the second beam pattern P2 becomes higher as the second beam pattern P2 is more distant from the cleaner body 110, the second beam pattern P2 irradiated onto a side surface of the obstacle is displayed as an oblique line bent upward of the horizontal line irradiated onto a front surface of the obstacle.

As shown in (d) of FIG. 12, when the cleaner body 110 approaches a corner of a wall surface by a certain distance or more, a portion of the first beam pattern P1 is displayed as a horizontal line at an upper side of the reference position ref1. As a portion of the second beam pattern P2 is irradiated onto a side surface of the corner, the portion of the second beam pattern P2 is displayed as an oblique line bent downward. As for a bottom surface, a portion of the second beam pattern P2 is displayed as a horizontal line at the reference position ref1.

Meanwhile, a portion of the second beam pattern P2 is displayed as a horizontal line as shown in (c) of FIG. 12, and a portion of the second beam pattern P2, which is irradiated onto the side surface of the corner, is displayed as an oblique line bent upward.

As shown in (e) of FIG. 12, in the case of an obstacle protruding from a wall surface, the first beam pattern P1 is displayed as a horizontal line as the reference position ref1. A portion of the second beam pattern P2 is displayed as a horizontal line on a protruding surface, another portion of the second beam pattern P2 is displayed as an oblique line bent upward on a side surface of the protruding surface, and the other portion of the second beam pattern P2 is displayed as a horizontal line on the wall surface.

Accordingly, the obstacle information acquisition part 190b can determine the position, shape, and size (height) of an obstacle, based on the positions and shapes of first and second pattern beams.

Additional details of the first sensor and second sensor are disclosed in U.S. application Ser. No. 15/597,333 filed on May 17, 2017 or Korean Application No. 10-2016-0060444 filed May 17, 2016, and Korean Application No. 10-2016-0014116 filed on Oct. 27, 2016, whose entire disclosure is incorporated herein by reference.

Referring to FIG. 5, the sensing unit 130 further includes a window part or assembly 133 and a case 134, in addition to the first sensing part 131 and the second sensing part 132. The window part 133 is provided to cover the first and second sensing parts 131 and 132, and has transparency. The transparency is a property that at least one portion of an incident beam is transmitted, and is translucent.

The window part 133 may be formed of a synthetic resin material or a glass material. When the window part 133 has the translucency, the material may be formed to have the translucency. Further, the material may have the transparency, and a film attached to the material may have the translucency.

The case 134 is mounted to the cleaner body 110, and is configured to fix the first and second sensing parts 131 and 132 and the window part 133. As shown in this figure, the case 134 is configured to accommodate at least one portion of the window part 133. The case 134 may be formed of a synthetic resin material or a metallic material, and has opaqueness.

As shown in this figure, the case 134 may include a mounting frame 134a and the cover frame 134b. The mounting frame 134a provides a space in which the first and second sensing parts 131 and 132 are mounted and supported. The mounting frame 134a may be provided with a first mounting part 134a1 (e.g., inclined protrusions) for mounting the first sensing part 131 thereto and a second mounting part 134a2 (e.g., tabs) for mounting the second sensing part 132 thereto. A board or a substrate 132' on which the first and second pattern irradiating parts 132a and 132b and the image acquisition part 132c are mounted may be mounted to the second mounting part 134a2. The second mounting part 134a2 may be provided inclined with respect to the first mounting part 134a1.

The mounting frame 134a is provided with first and second fastening hooks 134a' and 134a" for allowing the mounting frame 134a to be fastened to the cover frame 134b and the window part 133. The first fastening hook 134a' is fastened to a fastening hole 134b' of the cover frame 134b, and the second fastening hook 134a" is fastened to a fastening hole 133b" of the window part 133. The mounting frame 134a may be mounted to the cleaner body 110.

The cover frame 134b is mounted to the cleaner body 110 in a state in which the cover frame 134b is coupled to the mounting frame 134a and accommodates at least one portion of the window part 133. The cover frame 134b may be formed in an "L" shape to cover top and side surfaces of the cleaner body 110 at a corner of the cleaner body 110.

The upper end 134b1 of the cover frame 134b is located at an upper side of the first sensing part 131, and may be formed inclined to have a sharp shape. According to the above-described shape, although the robot cleaner 100 is inserted into furniture or a gap during traveling thereof, the robot cleaner 100 can easily escape from the furniture or gap, and the first and second sensing parts 131 and 132 can be protected by the upper end 134b1 located upward of the first and second sensing parts 131 and 132. In this figure, a case where the upper end 134b1 is formed at an end portion of a hole 134b" which will be described later is illustrated as an example.

The first sensing part 131 and at least one portion of the second sensing part 132 may be accommodated in the hole 134b" formed inside the cover frame 134b. As illustrated, the first sensing part 131 and the first and second pattern irradiating parts 132a and 132b of the second sensing part 132 are accommodated in the hole 134b".

The window part 133 may include a first window 133a and a second window 133b. The first window 133a is formed of a transparent material, and is provided to cover the first sensing part 131. The second window 133b is translucent, and is provided to cover the second sensing part 132. As illustrated, a through-hole 133b' may be formed at a portion of the second window part 133b, which corresponds to the first sensing part 131, and the first window 133a may be provided to cover the through-hole 133b'.

As the first window 133a is formed of a transparent material, images at the front and upper parts of the cleaner body 110 can be clearly photographed. Further, as the second window 133b is translucent, the first pattern irradiating part 132a, the second pattern irradiating part 132b, and the image acquisition part 132c on a rear surface of the second window 133b are not noticeable by the naked eye from the outside for a clean appearance.

The second window 133b may be divided in a first part 133b1 (first window cover), a second part 133b2 (second window cover), an extension part 133b4 (extension cover), and a third part 133b3 (third window cover).

The first part 133b1 is a part having the through-hole 133b', and is provided inclined with respect to the top surface of the cleaner body 110. The first window 133a mounted in the through-hole 133b' is provided to cover the first sensing part 131.

The second part 133b2 downwardly extends in an inclined shape from the first part 133b1, and is provided to cover the first and second pattern irradiating parts 132a and 132b. As illustrated, the second part 133b2 downwardly extends in parallel to the side surface of the cleaner body 110.

The extension part 133b4 downwardly extends from the second part 133b2, and is covered by the cover frame 134b. As illustrated, the extension part 133b4 may downwardly extend toward the inside of the second part 133b2. In other words, the extension part 133b4 may be provided upwardly inclined with respect to the third part 133b3 not to interfere with the angle of view in the top-bottom direction of the image acquisition part 132c. Similarly, a portion of the cover frame 134b, which covers the extension part 133b4, is provided inclined not to interfere with the angle of view in the top-bottom direction of the image acquisition part 132c.

The third part 133b3 downwardly extends from the extension part 133b4 to protrude outward of the cover frame 134b, and is provided to cover the image acquisition part 132c. The third part 133b3 may downwardly extend in parallel to the second part 133b2 along the side surface of the cleaner body 110.

The suction unit 120 of FIG. 1 will be described in more detail with reference to FIGS. 13-16. When the suction unit 120 has a shape protruding from the cleaner body 110, it is likely that the suction unit 120 will collide with an obstacle unless a separate sensing unit is provided to the suction unit 120. The sensing unit 130 provided to the cleaner body 110 senses an obstacle at the front of the suction unit 120.

When an obstacle exists in a blind spot that the sensing unit 130 does not sense, a physical collision may occur between the robot cleaner 100 and the obstacle. When the physical collision occurs, the robot cleaner 100 is to move rearward or change a direction so as to avoid further collision with the obstacle. To avoid further collision, it is first required to sense the physical collision between the robot cleaner 100 and the obstacle.

The suction unit 120 includes a case 121 and a bumper switch 122 that senses the physical collision. The case 121 forms an appearance of the suction unit 120, and includes an inlet port 120b' that sucks air containing foreign substances, e.g., dust, and the communication part 120b" (air outlet port of the suction unit 120) communicating with the inhalation flow path in the cleaner body 110. At least one portion of the case 121 may have transparency such that the inside of the suction unit 120 may be viewable. The bumper switch 122 may be provided at at least one surface of the case 121. When the bumper switch 122 in contact with an obstacle, the bumper switch 122 is pressurized to transmit a contact signal to the controller. The bumper switch 122 may be also provided to surround the case 121. As illustrated, a front bumper switch 122a is provided at a front side of the case 121, and side bumper switches 122b and 122c are provided at both left and right sides of the case 121, respectively. It is possible to sense not only a physical collision with an obstacle located at the front of the suction unit 120 but also a physical collision of an obstacle located on a side surface of the suction unit 120. The sensing range of a physical collision with an obstacle can be increased.

Referring back to FIG. 2, the side bumper switches 122b and 122c may protrude further than both the sides of the cleaner body 110 in a side direction. In other words, the width of the cleaner head with bumper switches is wider than the width of the cleaner body. When an obstacle is located on a side surface of the robot cleaner 100, the side bumper switch 122b or 122c collides with the obstacle earlier than the cleaner body 110, so that the obstacle can be effectively sensed.

The bumper switch 122 includes a bumper 122' and a switch 122". The bumper 122' is a part mounted to the case 121 to be exposed to the outside and movable inwards, and the bumper 122' is pressurized when it is in contact with an obstacle.

An elastic member or elastic spring pressurizes the bumper 122' to the outside. The elastic spring may be provided at the inside of the bumper 122' so that the bumper 122' returns to the original state when the bumper 122' is pressurized by the obstacle. The elastic member may be supported by the bumper 122' and the case 121. The switch 122" is provided at the inside of the bumper 122' to generate an electrical signal by being pressurized when the bumper 122' is moved inward. A micro-switch may be used as the switch 122".

If a contact signal with an obstacle is transmitted through the bumper switch 122, the controller determines that the suction unit 120 has collided with the obstacle to control the driving of the wheel unit 111. For example, the controller may apply a driving force in the opposite direction to the main wheels 111a such that the robot cleaner 100 moves rearward. Alternatively, the controller may apply a driving force to only any one of the main wheels 111a or apply a driving force in different directions to both the main wheels 111a such that the robot cleaner 100 rotates.

In the above, the bumper switch 122 is configured to be divided into the front bumper switch 122a and the side bumper switches 122b and 122c, but the present disclosure is not limited thereto. The bumper switch 122 may be also formed in a '⊏' shape to cover the front and left and right surfaces of the case 121. In such a case, the bumper switch 122 is configured to be movable to a rear side (when a portion provided at the front surface of the case 121 is in contact with an obstacle), a right side (when a portion provided at the left surface of the case 121 is in contact with an obstacle), and a left side (when a portion provided at the right surface of the case 121 is in contact with an obstacle).

As described above, when a mechanical bumper switch 122 is provided in the suction unit 120, a collision with an obstacle may be directly sensed as compared with when an electronic sensor (e.g., an acceleration sensor, a PSD sensor, etc.) is provided. Further, manufacturing cost can be reduced, and a circuit configuration can be simplified. In addition, an improved function of sensing an obstacle and changing a direction can be implemented by the combination of the bumper switch 122 and the sensing unit 130 provided to the cleaner body 110.

Meanwhile, when the robot cleaner is located close to a step, cliff, or a surface having a steep profile, an additional avoidance operation may be required. If an additional sensing of such a situation and control corresponding to the sensing are not provided, the robot cleaner may break after falling from the step, or may be unable to recover to climb or drive over the steep surface to perform cleaning again. To this end, the cliff sensor 124 that senses topography thereunder is provided at a front end portion of a lower side of the suction unit 120.

The cliff sensor 124 may be provided with a light emitting part (light emitter) and a light receiving part (light receiver), and measures a distance between the cliff sensor 124 and a floor G by measuring a time for which a beam irradiated onto the floor G from the light emitting part is received to the light receiving part. When a rapidly lowered surface exists at the front, the received time increases rapidly. When a cliff or step exists at the front, the emitted beam is not received by the light receiving part.

In these figures, it is illustrated that an inclined part 120a upwardly inclined with respect to the floor G is formed at the front end portion of the lower side of the suction unit 120, and the cliff sensor 124 is installed at the inclined part 120*a* to face the floor G. According to the above-described structure, the cliff sensor 124 is provided inclined toward the floor G at a front lower side of the suction unit 120. Therefore, topography the front lower side of the suction unit 120 may be sensed by the cliff sensor 124. Alternatively, the cliff sensor 124 may be provided parallel to the floor G to sense topography immediately under the cliff sensor 124.

If it is sensed through the cliff sensor that the topography under the cliff sensor is lowered to a certain level or lower, the controller controls the driving of the wheel unit 111. For example, the controller may apply a driving force in the opposite direction to the main wheels 111*a* such that the robot cleaner 100 moves rearward in the reverse direction R. Alternatively, the controller may apply a driving force to only any one of the main wheels 111*a* or apply a driving force in different directions to both the main wheels 111*a* such that the robot cleaner 100 rotates.

The cliff sensor 124 may also be provided at the bottom surface of the cleaner body 110. By considering the function of the cliff sensor 124, a cliff sensor provided to the cleaner body 110 may be provided adjacent to the rear of the cleaner body 110.

For reference, as the inclined part 120*a* is formed at the front end portion of the lower side of the suction unit 120, the robot cleaner 100 can easily climb a low threshold or obstacle. In addition, as shown in these figures, when an auxiliary wheel 123 is provided at the inclined part 120*a*, the climbing may be more easily performed. For reference, the auxiliary wheel 123 is omitted in FIG. 14 so as to describe the cliff sensor 124.

Because the robot cleaner 100 is autonomously driven, it is required to charge the battery 180 provided in the cleaner body 110 to continuously use the robot cleaner 100. In order to charge the battery 180, a charging station as a power supply is provided, and a charging terminal 125 configured to be connectable to the charging station is provided in the suction unit 120. In these figures, it is illustrated that the charging terminal 125 is provided at the inclined part 120*a* to be exposed to the front. The charging terminal 125 may be provided between the cliff sensors 124 which are provided at both sides of the suction unit 120.

Meanwhile, a brush roller 126 may be provided in the suction unit 120 to permit effective suction of dust. The brush roller 126 is rotatable in the inlet port 120*b*' to sweep foreign substances, e.g., dust and allow the dust to be introduced into the suction unit 120.

By considering the function of the brush roller 126, foreign substances may become stuck to the brush roller 126 over a length of time. Although there are needs for cleaning of the brush roller 126, the suction unit 120 typically has a structure making it difficult to disassemble the suction unit 120, resulting in difficulty to clean the brush roller 126. In the present disclosure, the brush roller 126 can be separated and cleaned easily without entire disassembly of the suction unit 120.

Figure 17:
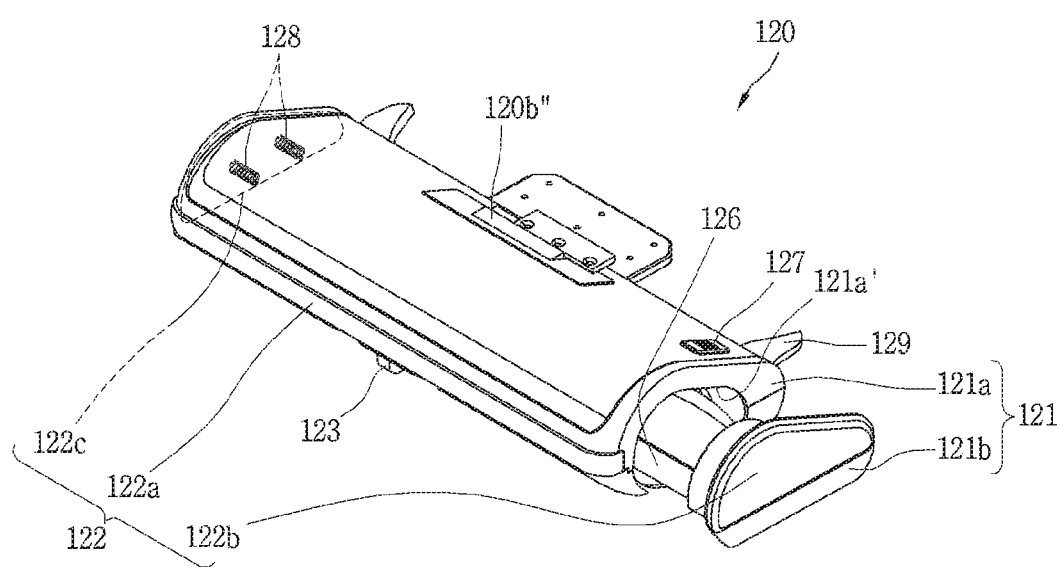
FIG. 17 illustrates a brush roller protruding through a manipulation of a manipulation part in the suction unit shown in FIG. 13.

Referring to FIG. 17, the case 121 includes a main case 121*a* and a cover case 121*b* (or inner case). The main case 121*a* is provided with the rotatable brush roller 126, and an opening 121*a*' is formed at one side of the main case 121*a*. The front bumper switch 122*a* is mounted at a front side of the main case 121*a*, and any one of the side bumper switches 122*b* and 122*c* is mounted at the other side of the main case 121*a*.

The cover case 121*b* is detachably coupled to the main case 121*a* to open/close the opening 121*a*' provided at the one side of the main case 121*a*. The other of the side bumper switches 122*b* and 122*c* is mounted to the cover case 121*b*. If the cover case 121*b* is separated from the main case 121*a*, the opening 121*a*' provided at the one side of the main case 121*a* is exposed to the outside. The brush roller 126 provided in the main case 121*a* may be exposed to the outside through the opening 121*a*'.

The manipulation part 127 (lock/unlock switch) through which locking of the cover case part 121*b* to the main case part 121*a* is released in manipulation thereof may be provided in the suction unit 120. The manipulation part 127 may be implemented in various types such as a slide type and a press type. In this embodiment, the manipulation part 127 of the slide type is installed at the main case part 121*a*. An elastic member or elastic spring 128 elastically pressurizes the brush roller 126 inside the other side of the main case 121. A leaf spring, a coil spring, and the like may be used as the elastic member 128.

When the elastic member 128 is pressurized, the brush roller 126 held by the cover case 121*b* is fastened to the main case 121*a*. If the fastening is released by the manipulation of the manipulation part 127.

Figure 18:
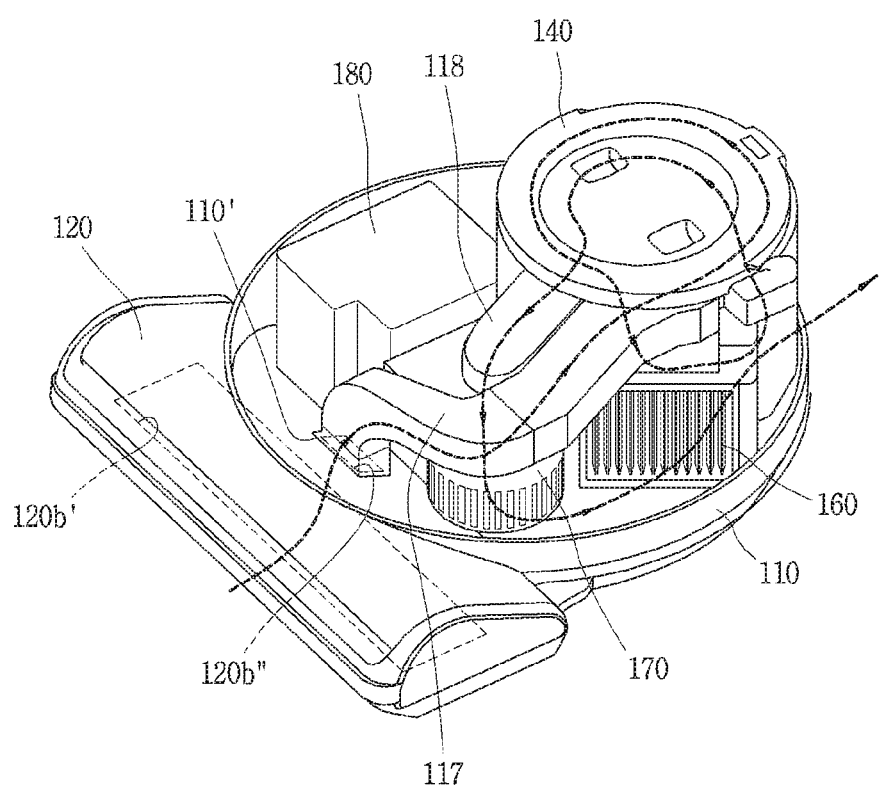
FIG. 18 illustrates a flow of air inside the robot cleaner shown in FIG. 1.

Referring to FIG. 18, air introduced into the suction unit 120 through the inlet port 120*b*' of the suction unit 120 is introduced into the cleaner body 110 through the communication part 120*b*". The air introduced into the cleaner body 120 is introduced into the dust container 140. The intake flow path corresponds to a flow path continued from the introduction port 110' communicating with the communication part 120*b*" to the first opening 110*a* (see FIG. 19). The intake flow path may be formed as a duct, a peripheral component(s), or a combination of the duct and the peripheral component(s). As illustrated, an intake duct 117 connects the introduction port 110' to the first opening 110*a*, thereby forming the inhalation flow path.

The communication part 120*b*" of the suction unit 120 may be provided under a bottom surface of the front side of the cleaner body 110. In this case, the introduction port 110' is formed in the bottom surface of the front side of the cleaner body 110. In addition, as the dust container 140 is provided at the rear of the cleaner body 110, a fan motor module 170 and the battery 180 are provided at both left and right sides of the front of the dust container 140, respectively.

A front end portion of the inlet duct 117 communicating with the introduction port 110' (inlet port) is formed to extend upward. In addition, the inlet duct 117 extends to one side of the cleaner body 110 while avoiding the battery 180. In this case, the inlet duct 117 may be provided to pass over the fan motor module 170 provided at the one side of the cleaner body 110.

The first opening 110*a* is formed in an upper inner circumferential surface of the dust container accommodation part 113 to communicate with the entrance 140*a* formed in an upper outer circumferential surface of the container 140. The inlet duct 117 is formed to extend upward toward the first opening 110*a* from the introduction port 110'.

Air introduced into the dust container 140 passes through at least one cyclone in the dust container 140. Foreign substances, e.g., dust contained in the air is separated by the at least one cyclone and collected in the dust container 140. The air having the foreign substances removed therefrom is discharged from the dust container 140.

Air forms a rotational flow in the dust container 140, and foreign substances and air are separated from each other by a difference in centrifugal force between the air and the dust. The air is flowed into the exit 140 via the at least one cyclone by a suction force generated by the fan motor module 170.

Since an inertial force caused by the weight of the foreign substance is larger than the suction force generated by the fan motor module 170, the foreign substances are collected at a lower portion of the dust container 140 by gradually falling into the dust container 140.

The introduction port 110' may be formed at the bottom center surface of the front side of the cleaner body 110. The entrance 140a of the dust container 140 may be formed opened in a tangential direction in an inner circumferential surface of the dust container 140 such that air is introduced in a lateral direction to naturally form a rotational flow. In the state in which the dust container 140 is accommodated in the dust container accommodation part 113, the entrance 140a may be located in a lateral direction of the cleaner body 110.

The air having the dust separated therefrom is discharged or exhausted from the dust container 140 and then is finally discharged to the outside through the exhaust port 112 via the exhaust port in the cleaner body 110. The exhaust flow path corresponds to a flow path from the second opening 110b (see FIG. 19) to the exhaust port 112. The exhaust flow path may be formed as a duct, a peripheral component(s), or a combination of the duct and the peripheral component(s).

The exhaust flow path is configured as a combination of an exhaust duct 118 that connects the second opening 110b to the fan exhaust port of the fan motor module 170 and an internal component(s) that guides the flow of air from the fan exhaust port 170 to the exhaust port 112. The fan exhaust port may be provided adjacent to a central portion of the cleaner body 110 to reduce noise discharged to the outside. Correspondingly, the second opening 110b may also be formed adjacent to the central portion of the cleaner body 110.

A front end portion of the exhaust duct 118 communicating with the second opening 110b and a rear end portion of the intake port 117 communicating with the first opening 110a may be provided side by side at the same height.

Figure 19:
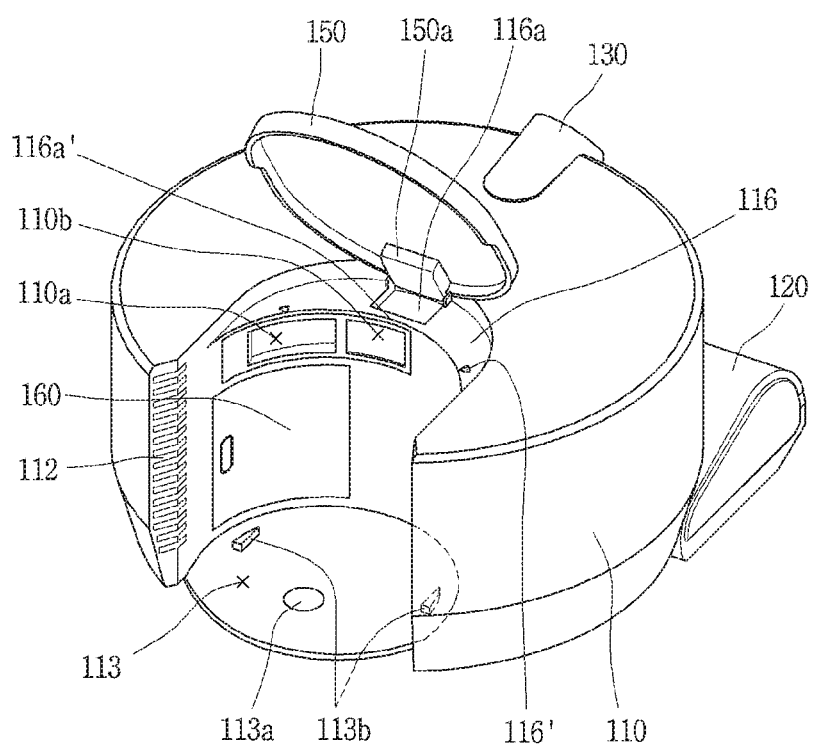
FIG. 19 is a view illustrating a state in which a dust container is mounted in a dust container accommodation part in the robot cleaner shown in FIG. 1.

Referring to FIG. 19, the dust container accommodation part 113 (dust container dock) to dock the dust container 140 therein is formed in the cleaner body 110. The dust container accommodation part 113 has a shape indented toward a front side from a rear side of the cleaner body 110, and is opened rearward and upward. The dust container accommodation part 113 may be defined by a bottom surface supporting the dust container 140 and an inner wall surrounding a portion of the outer circumference of the dust container 140.

A recessed part 116 (recess) dented from the top surface of the cleaner body 110 is formed along the outer circumference of the dust container accommodation part 113. The dust container cover 150 is provided for in the dust container accommodation part 113 and rotatably hinged. The dust container cover 150 is provided to simultaneously cover the top surface of the dust container 140 and the recessed part 116 (see FIG. 2). A portion of the dust container cover 150 is accommodated in the recessed part 116 in the state in which the dust container cover 150 is coupled to the dust container 140.

The first opening 110a and the second opening 110b are formed in the inner wall of the dust container accommodation part 113. The first opening 110a and the second opening 110b may be provided at the same height. As illustrated, the first opening 110a and the second opening 110b are laterally formed adjacent to each other at an upper end of the inner wall of the dust container accommodation part 113.

In order to form the flow of air continued from the intake flow path to the exhaust flow path through the dust container 140, the first and second openings 110a and 110b are to be provided to respectively communicate with the entrance 140a and the exit 140b. In order to permit the communication, the dust container 140 is to be mounted at a normal position of the dust container accommodation part 113.

A mounting or alignment projection 113b is formed to protrude from the bottom surface of the dust container accommodation part 113, and a mounting or alignment groove 149 (see FIG. 22) corresponding to the mounting projection 113b is formed in a bottom surface of the dust container 140. The dust container 140 may be mounted at the normal position of the dust container accommodation part 113 as the mounting projection 113b is accommodated in the mounting groove 149.

The mounting projection 113b may be formed at a position such that the dust container 140 shaped cylindrically is not rotated when docked in the dust container accommodation part 113. For example, the mounting projection 113b may be formed at both left and right sides with respect to the center of the dust container 140.

The positions of the mounting projection 113b and the mounting groove 149 may be reversed to each other. The mounting projection may be formed to protrude from the bottom surface of the dust container 140, and the mounting groove may be formed in the bottom surface of the dust container accommodation part 113.

A protruding part or a protrusion 113a may be formed to protrude from the bottom surface of the dust container accommodation part 113, and a groove part or a recess 148 (see FIG. 22) corresponding to the protruding part 113a may be formed in the bottom surface of the dust container 140. The groove part 148 may be formed at the center of the dust container 140.

The dust container accommodation part 113 or the dust container 140 may be provided with gaskets 110a' and 110b' that maintain airtightness between the first opening 110a and the entrance 140a and airtightness between the second opening 110b and the exit 140b when the dust container 140 is mounted at the normal position of the dust container accommodation part 113. The gaskets 110a' and 110b' may be formed to surround the first opening 110a and the second opening 110b, or be formed to surround the entrance 140a and the exit 140b.

Figure 20:
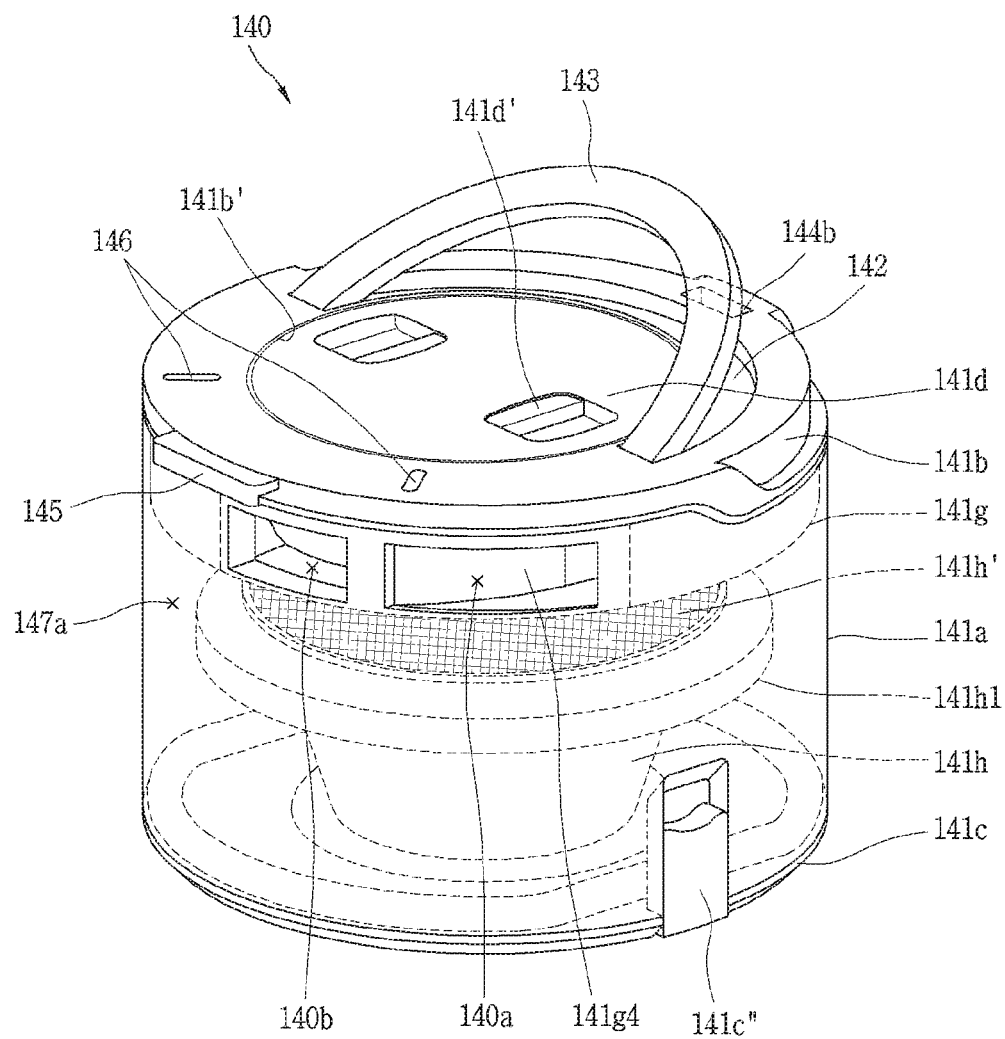
FIG. 20 is a view illustrating the dust container shown in FIG. 1.
Figure 21:
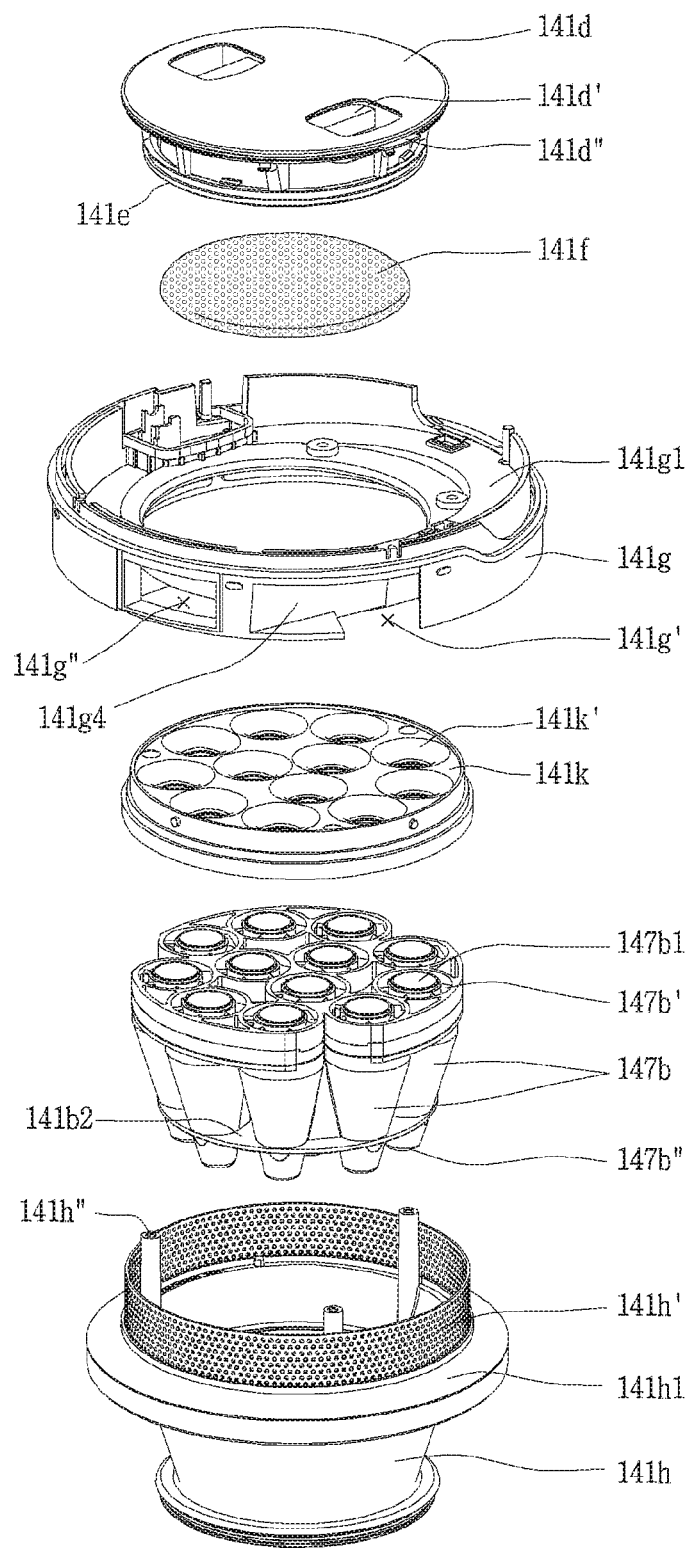
FIG. 21 is an exploded perspective view illustrating main parts of the dust container illustrated in FIG. 20.

As illustrated in FIGS. 20 and 21, the dust container 140 is accommodated in the dust container accommodation part 113 formed at the other side of the cleaner body 110, and is configured to collect dust filtered from sucked air. The dust container 140 may be formed in a cylindrical shape, and include an external case 141a defining appearance, an upper case 141b, an upper cover 141d, and a lower case 141c.

The external case 141a is formed in a cylindrical shape with both ends open so as to define a side appearance of the dust container 140. The dust container 140 is provided with the entrance 140a through which unfiltered air is introduced, and the exit 140b through which filtered air is discharged. The entrance 140a and the exit 140b may be formed through a side surface of the external case 141a. The entrance 140a and the exit 140b may be arranged at the same height. The entrance 140a and the exit 140b may be formed adjacent to each other at an upper end of the external case 141a.

At least one cyclone may be provided in the external case 141a. For example, a first cyclone 147a filtering larger substances and/or particles from air introduced through the entrance 140a and a second cyclone 147b provided in the first cyclone 147a to filter fine substance and/or particles may be provided in the external case 141a.

The unfiltered air, introduced into the dust container 140 through the entrance 140a flows along the first cyclone 147a as an empty space which is formed in an annular shape between the external case 141a and the inner case 141h. During the flow, relatively heavy particles (e.g., debris and/or dust) is dropped down and collected and relatively light air is introduced into the inner case 141h through a mesh filter 141h' by a suction force. Finer particles (e.g., fine dust and/or ultrafine dust) may be introduced into the inner case 141h together with the air.

The mesh filter 141h' is mounted in the inner case 141h to spatially partition inside and outside of the inner case 141h. The mesh filter 141h' is formed in a mesh shape or a porous shape such that the air can flow therethrough.

A criterion for distinguishing sizes of dust and fine dust may be decided by the mesh filter 141h'. Foreign substances and/or particles as small as passing through the mesh filter 141h' may be classified as the fine dust, and foreign substances and/or particles failing to pass through the mesh filter 141h' may be classified as the dust.

Foreign materials and dust which have dropped down without passing through the mesh filter 141h' are collected in a first storage portion or chamber S1 located under the mesh filter 141h'. The first storage portion S1 is defined by the external case 141, the inner case 141h and the lower case 141c.

A skirt 141h1 may be provided at a lower side of the mesh filter 141h' protruding along a circumference of the inner case 141h. The skirt 141h1 may restrict air flow into the first storage portion S1 located under the skirt 141h1. This may result in preventing the foreign materials and dust collected in the first storage portion S1 from being dispersed and upward reverse flow toward the skirt 141h1.

The second cyclone 147b is configured to separate fine dust from the air introduced therein through the mesh filter 141h'. The second cyclone 147b includes a cylindrical portion and a conical portion extending downwardly from the cylindrical portion. In the cylindrical portion, the air rotates due to a guide vane provided in therein. In the conical portion, the fine dust and the air are separated from each other, and the second cyclone 147b may be provided in plurality. The second cyclones 147b may be arranged within the first cyclone 147a in an up and down direction of the dust container 140. The height of the dust container 140 may be reduced with respect to the arrangement structure of the second cyclones on the first cyclone.

The air introduced into the inner case 141h is introduced into intake openings 147b' on upper portions of the second cyclones 147b. An empty space in which the second cyclones 147b are not arranged within the inner case 147h is used as a path along which the air flows upward. The empty space may be formed by the adjacent cyclones 147b and/or by the inner case 141h and the second cyclones 147b adjacent to the inner case 141h.

A vortex finder 147b1 through which air from which the fine dust is separated is discharged is provided on a center of the upper portion of each second cyclone 147b. The intake opening 147b' may be defined as an annular space between an inner circumference of the second cyclone 147b and an outer circumference of the vortex finder 147b1.

A guide vane extending in a spiral shape along an inner circumference is provided in the intake opening 147b' of the second cyclone 147b. The guide vane allows air introduced in the second cyclone 147b through the introduction opening 147b' to be rotated. The vortex finder 147b1 and the guide vane are arranged in the cylindrical portion of the second cyclone 147b. Additional details may be found in U.S. application Ser. No. 15/487,756, and U.S. application Ser. No. 15/487,821, both filed on Apr. 14, 2017, whose entire disclosures are incorporated herein by reference.

The fine dust gradually flows downward while spirally orbiting along the inner circumference of the second cyclone 147b, is discharged through a discharge opening 147b'' and is finally collected in a second storage portion S2. The air which is relatively lighter than the fine dust is discharged through the upper vortex finder 147b1 by a suction force.

The second storage portion or chamber S2 may be called as a fine dust storage portion in the aspect of forming a storage space of the fine dust. The second storage portion S2 is a space defined by an inside of the inner case 141h and the lower case 141c.

A cover 141k is arranged on the top of the second cyclones 147b. The cover 141k is provided to cover the intake openings 147b' of the second cyclones 147b with a predetermined interval. The cover 141k is provided with communication holes 141k' corresponding to the vortex finders 147b1. The cover 141k may be provided to cover the inner case 141h except for the vortex finders 147b1.

A partition plate 141b2 is installed on outer circumferences of the second cyclones 147b. The partition plate 141b2 partitions a space such that the air introduced into the inner case 141h through the mesh filter 141h' is not mixed with the fine dust discharged through the discharge opening 147b''. The air passed through the mesh filter 141h' flows above the partition plate 141b2 and the fine dust discharged through the discharge opening 147b'' is collected below the partition plate 141b2.

The discharge opening 147b'' of the second cyclone 147b has a shape penetrating through the partition plate 141b2. The partition plate 141b2 may be formed integral with the second cyclone 147b, or may be mounted on the second cyclone 147b after being produced as a separate member.

A flow separation member or guide 141g is provided on an inner upper portion of the external case 141a. The flow separation member 141g separates a flow of air introduced through the entrance 140a of the dust container 140 from a flow of air discharged through the exit 140a of the dust container 140.

The upper case 141b is provided to cover the flow separation member 141g, and the lower case 141c is provided to cover a lower portion of the external case 141a. The flow separation member 141g, the upper case 141b, the upper cover 141d and the filter 141f will be described later.

Since the dust container 140 is configured to be detachably coupled to the dust container accommodation part 113, a handle 143 may be provided to the dust container 140 such that the dust container 140 may be grabbed for detachment from the dust container accommodation part 113. The handle 143 is hinge-coupled to the upper case 141b to be rotatable. A handle accommodation part or recess 142 having the handle 143 accommodated therein is formed in the upper case 141b.

When the dust container cover 150 is coupled to the dust container 140 to cover the dust container 140, the handle 143 may be pressurized by the dust container cover 150 to be accommodated in the handle accommodation part 142. In a state in which the dust container cover 150 is separated from the dust container 140, the handle 143 may protrude from the handle accommodation part 142. To this end, the upper case 141b may be provided with an elastic part or elastic spring that elastically pressurizes the handle 143.

A locking hook 145 may be formed to protrude from the upper case 141b. The locking hook 145 is formed at the front of the upper case 141b. The front of the upper case 141b means a direction toward the front of the cleaner body 110 when the dust container 140 is mounted normally in the dust container accommodation part 113.

The locking hook 145 is accommodated in an accommodation or locking groove 116a formed in the recessed part 116 of the cleaner body 110. The locking hook 145 may have a shape protruding from an outer circumferential surface of the upper case 141b to be bent downward. A step 116a' is formed in the accommodation groove 116a, and the locking hook 145 may be configured to be locked to the step 116a'. See FIGS. 35-36.

Figure 22:
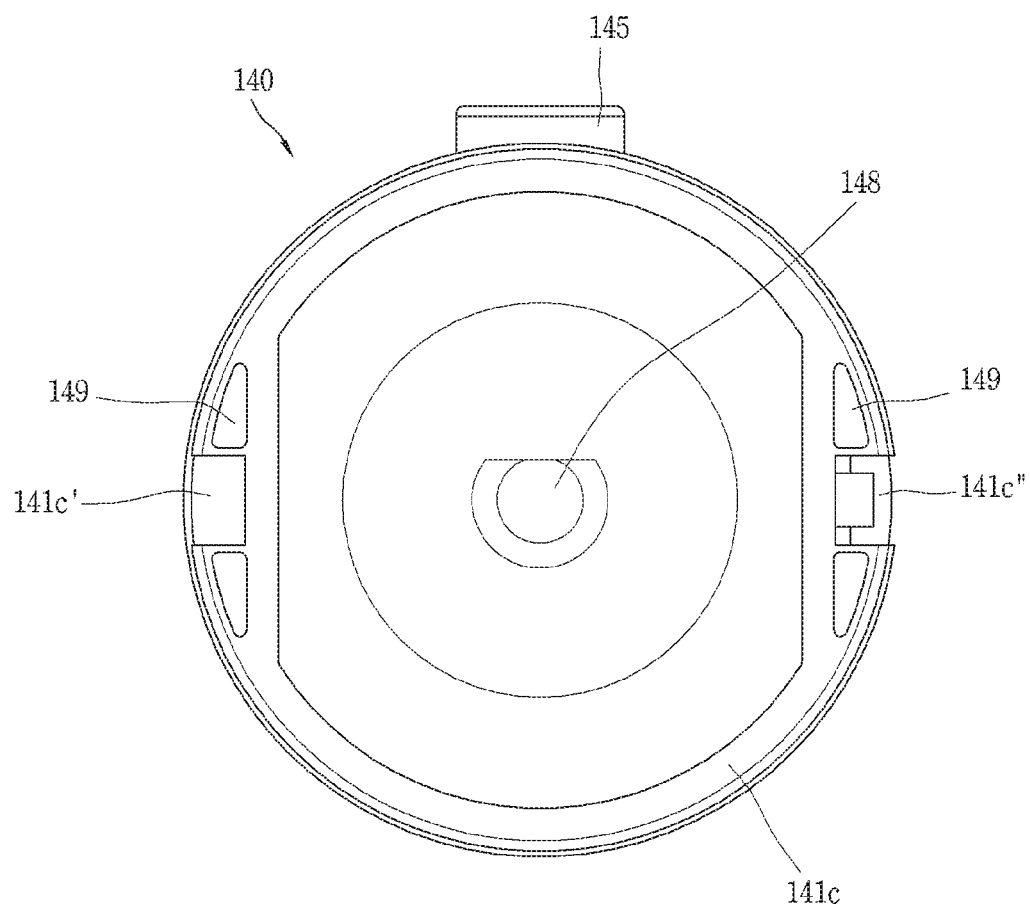
FIG. 22 is a bottom view of the dust container shown in FIG. 20.

FIG. 22 is a bottom view of the dust container 140 illustrated in FIG. 20. The lower case 141c may be rotatably coupled to the external case 141a by a hinge 141c'. A lock 141c" provided to the lower case 141c is detachably coupled to the external case 141a, to allow the lower case 141c to be fixed to the external case 141a when the lock 141c" is coupled to the external case 141 and to allow the lower case 141c to be rotatable with respect to the external case 141a when the coupling is released.

The lower case 141c is coupled to the external case 141a to form a bottom surface of the first storage portion S1 and the second storage portion S2. When the lower case 141c is rotated by a hinge portion 141c' to simultaneously open the first storage portion S1 and the second storage portion S2, the dust and the fine dust may simultaneously be discharged.

The hinge 141c' and the lock 141c" may be provided at positions opposite to each other with the center of the lower case 141c, which is interposed therebetween. When the dust container 140 is normally mounted in the dust container accommodation part 113, the hinge part 141c' and the locking member 141c" may be covered by the inner wall of the dust container accommodation part 113 and not exposed to the outside.

The mounting groove 149 corresponding to the mounting projection 113b is formed at a bottom surface of the lower case 141c. As shown in FIG. 21, the mounting groove 149 may be formed at a position adjacent to the hinge part 141c' and the locking member 141c". The groove part 148 corresponding to the protruding part 113a may be formed in the bottom surface of the lower case 141c. The groove part 148 may be formed at the center of the dust container 140.

Figure 23:
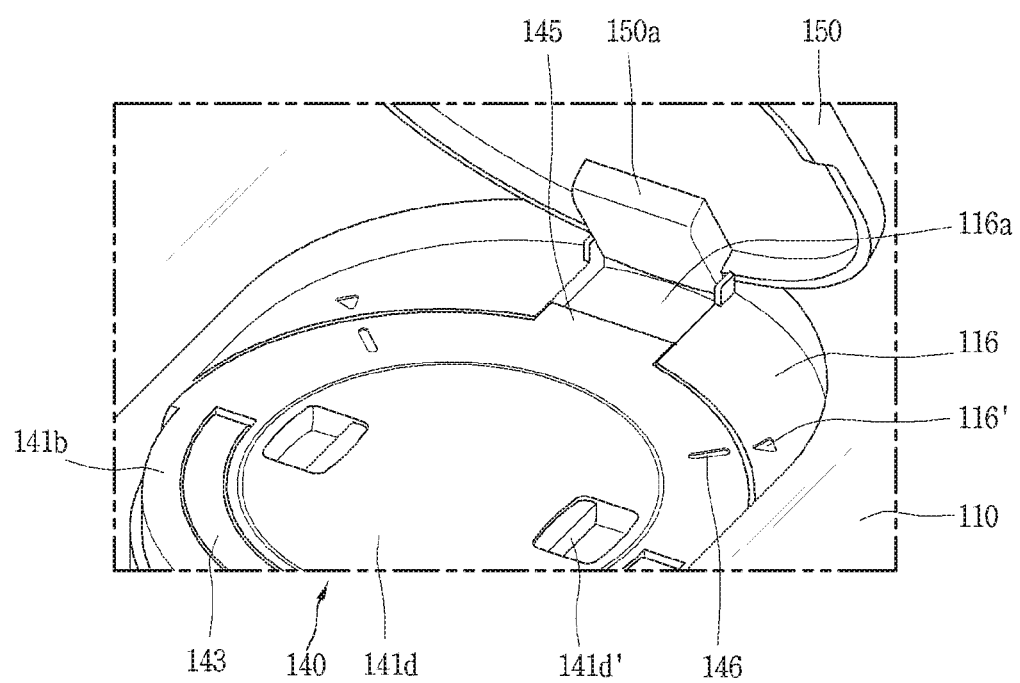
FIG. 23 is a view illustrating a state in which the dust container is mounted in the dust container accommodation part shown in FIG. 19.
Figure 24:
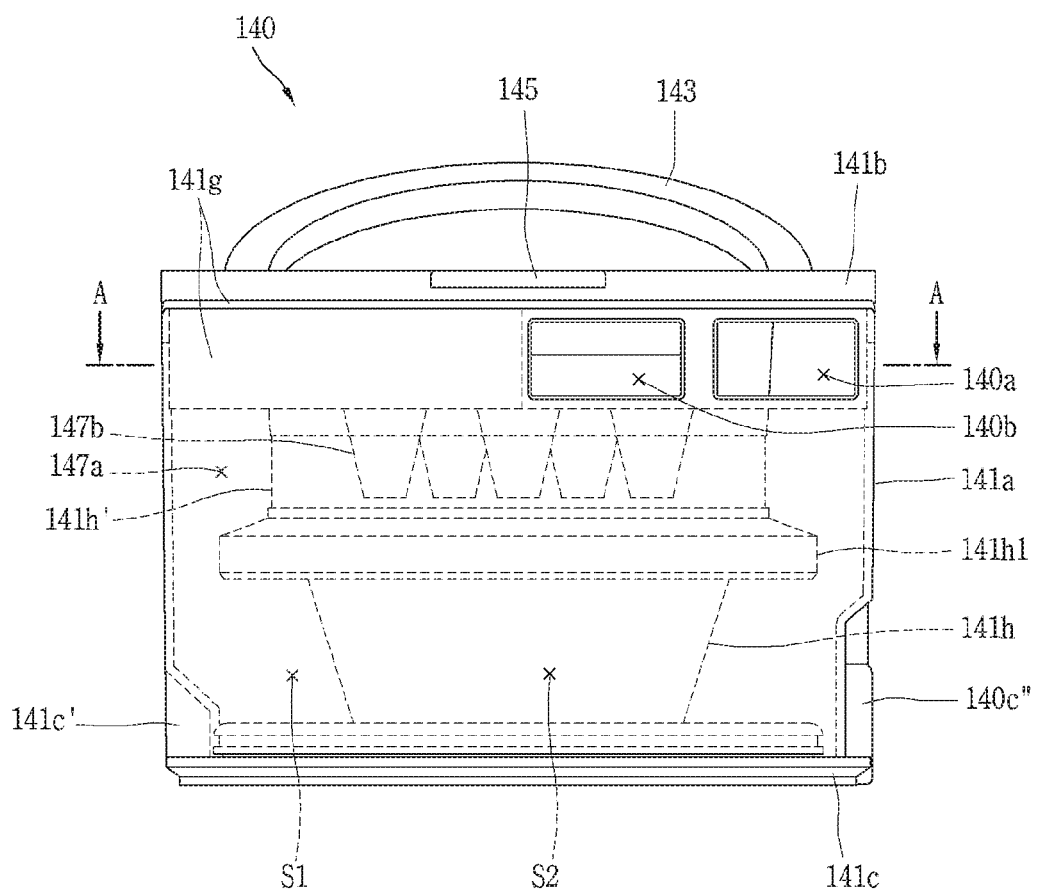
FIG. 24 is a front view of the dust container shown in FIG. 20.
Figure 25:
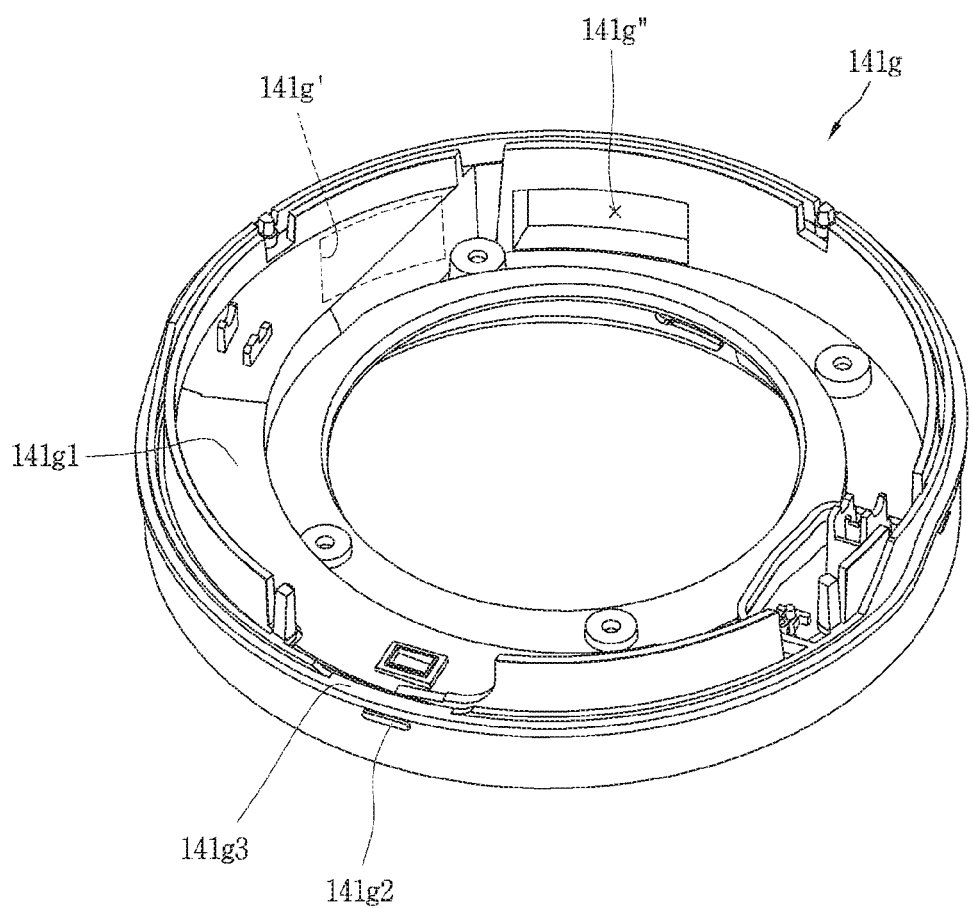
FIGS. 25 and 26 are perspective views of a flow separation member illustrated in FIG. 24, viewed from different directions.
Figure 26:
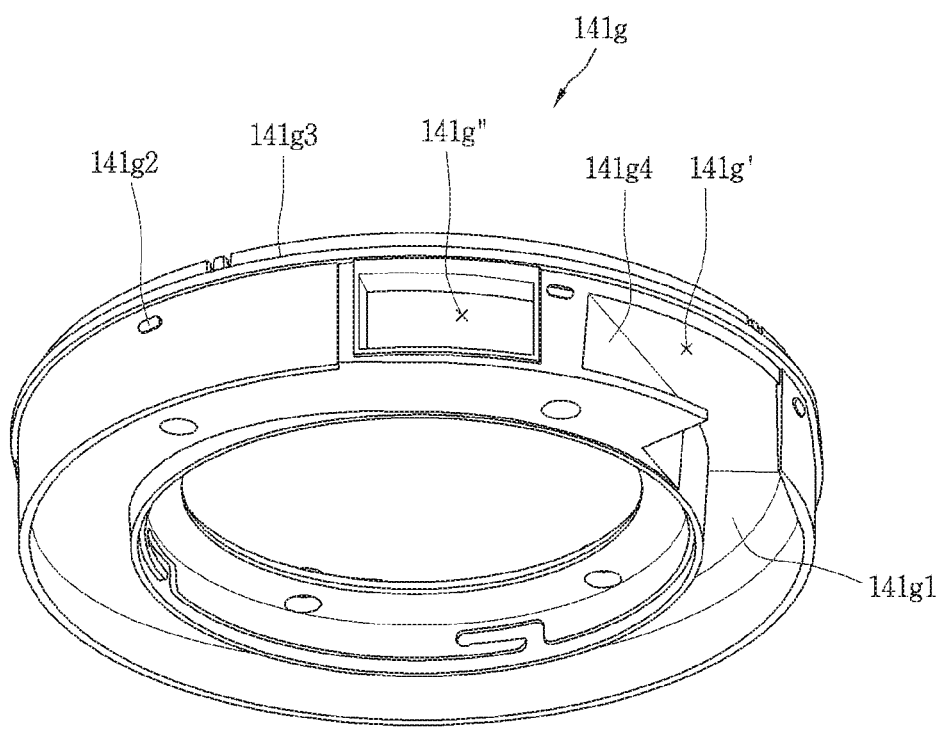
Figure 27:
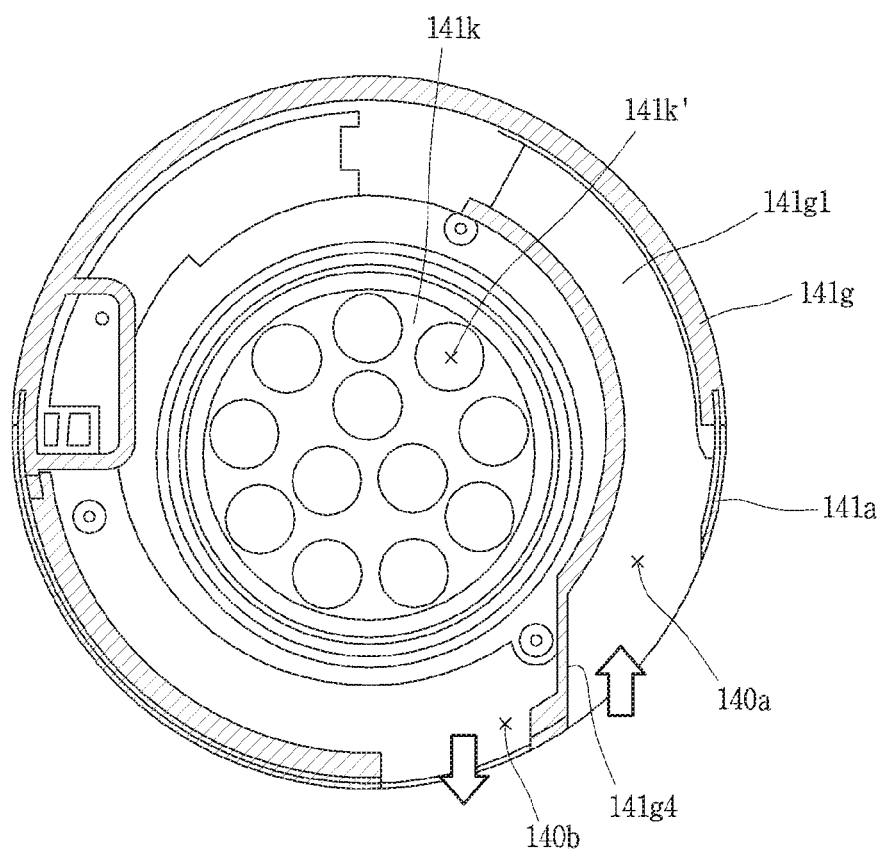
FIG. 27 is a sectional view taken along the line A-A of FIG. 24.
Figure 28:
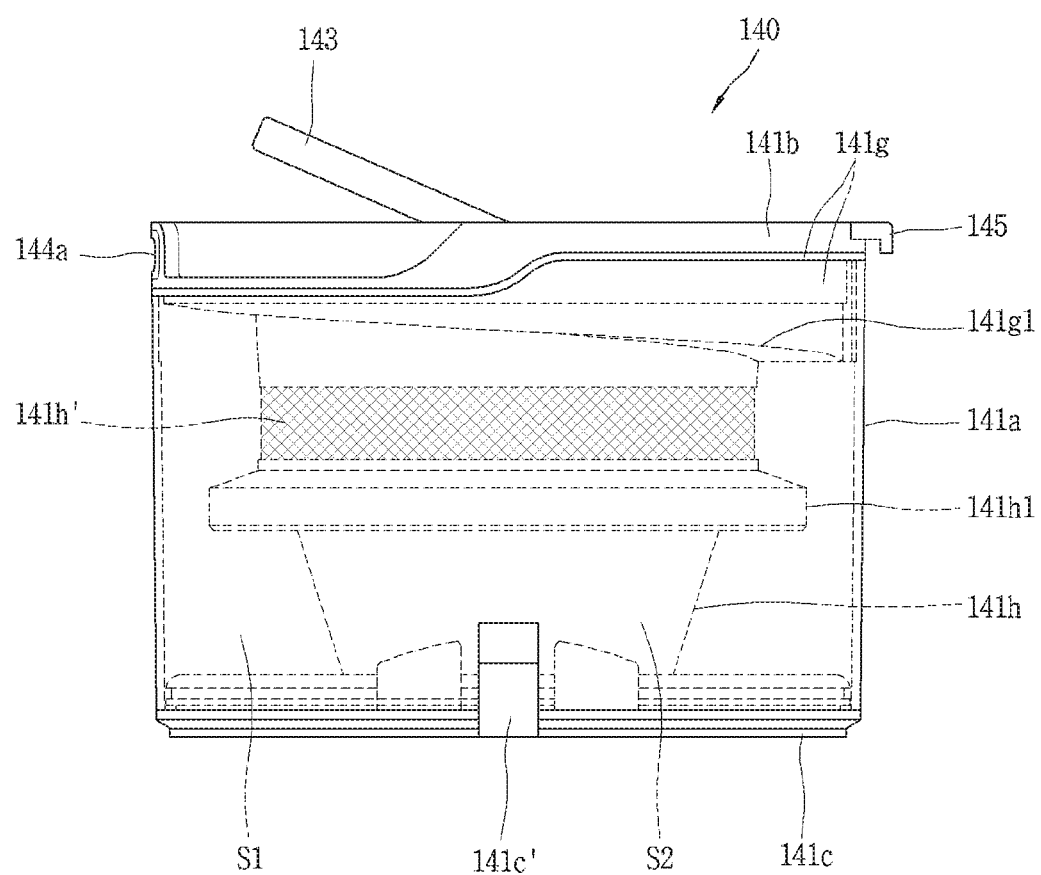
FIG. 28 is a left side view of the dust container of FIG. 20.
Figure 29:
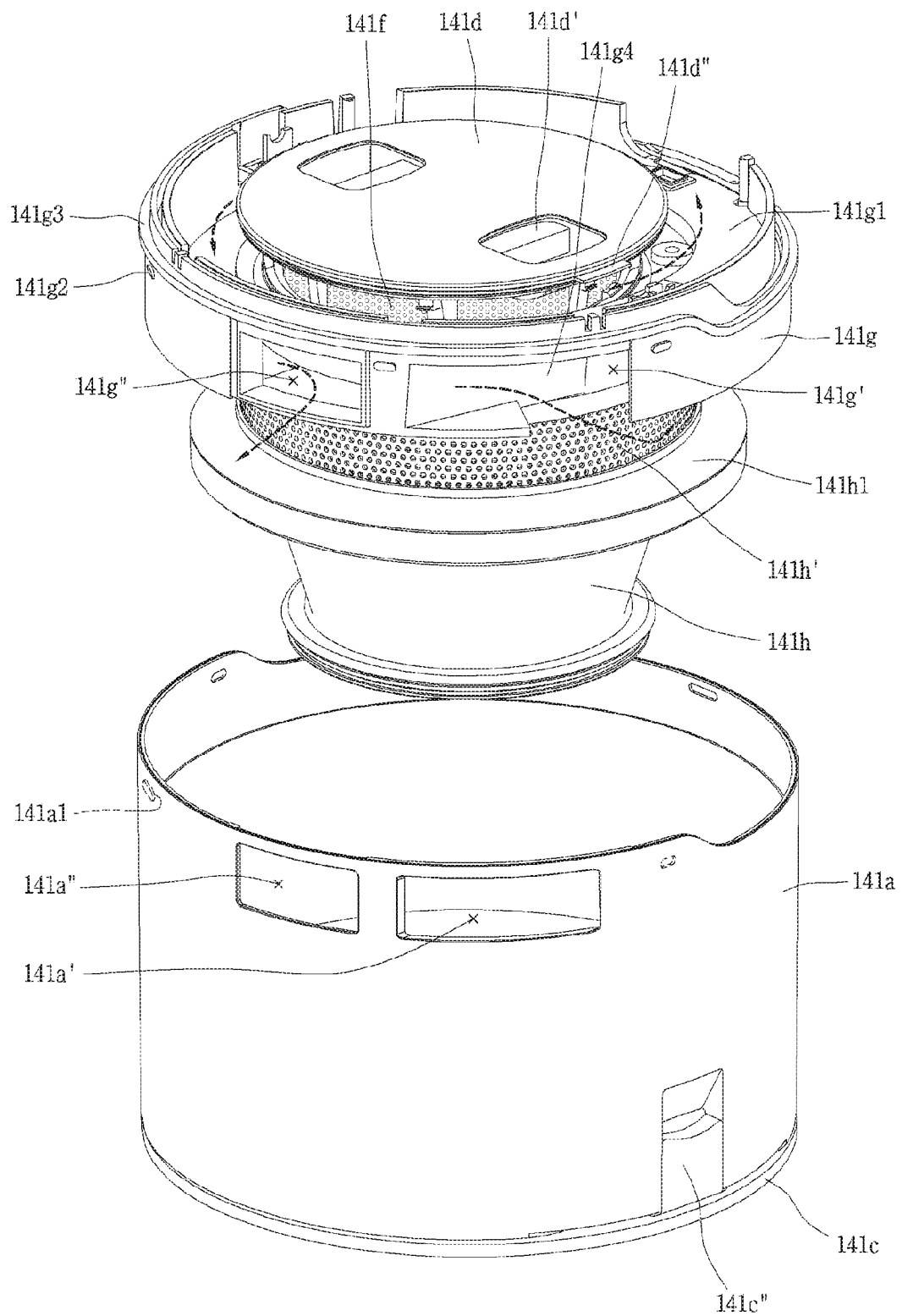
FIG. 29 is a view illustrating the dust container of FIG. 20, excluding the upper case.

FIG. 23 is a view illustrating a state in which the dust container 140 is mounted in the dust container accommodation part 113 shown in FIG. 19. When the dust container 140 is not mounted in the dust container accommodation part 113, the dust container cover 150 may be provided upwardly inclined by a hinge 150a that provide an upward elastic force. The dust container 140 may be inserted downwardly inclined at a rear upper side of the dust container accommodation part 113 for docketing in the dust container accommodation part 113.

If the dust container 140 is docked normally, the locking hook formed to protrude from the outer circumference of the dust container 140 is accommodated in the accommodation groove 116a formed in the recessed part 116 of the cleaner body 110. The accommodation groove 116a has a shape dented relatively further than the recessed part 116.

Accordingly, the step 116a' is formed in the accommodation groove 116a. The step 116a' is inserted into the inside of the locking hook 145 to be locked when the locking hook 145 is moved in a lateral direction. In the state in which the dust container cover 150 is coupled to the dust container 140, the duct container cover 150 is provided to cover the locking hook 145. When the dust container 140 is accommodated in the dust container accommodation part 113, a top surface of the upper case 141b of the dust container may be at the same plane as the recessed part 116.

An alignment mark 146 may be formed at an upper portion of the dust container 140, and a guide mark 116' corresponding to the alignment mark 146 may be formed at the recessed part 116, so that the locking hook 145 can be accommodated at the regular position of the accommodation groove 116a. The alignment mark 146 may be engraved or painted in the upper case 141b and the guide mark 116' may be engraved or painted in the recessed part 116.

The accommodation groove 116a may be formed to extend long toward the front of the cleaner body 110. When the dust container cover 150 is coupled to the dust container 140, the hinge 150a of the duct container cover 150 may be accommodated into the accommodation groove 116a.

The locking hook 145 is locked to the step 116a' of the accommodation groove 116a, so that the dust container 140 is restricted from being moved in the lateral direction in the dust container accommodation part 113. The mounting projection 113b of the dust container accommodation part 113 is inserted into the mounting groove 149 formed in the dust container 140. The dust container 140 is also restricted from being moved in the lateral direction in the dust container accommodation part 113.

The dust container 140 may not separate from the dust container accommodation part 113 except when the dust container 140 is moved upward. When the dust container cover 150 is fastened to the dust container 140 to cover the dust container 140, the dust container 140 is also restricted from being moved upward. Thus, the dust container 140 cannot be separated from the dust container accommodation part 113.

Referring to FIGS. 24 to 30 in conjunction with FIG. 20, the upper cover 141d is configured to open/close an upper opening 141b' of the dust container 140. The upper opening 141b' may be formed in the upper case 141b, and the upper cover 141d is detachably coupled to the upper case 141b to open/close the upper opening 141b'. The upper opening 141b' is provided to overlap with the cover 141k. See FIG. 30.

The upper cover 141d is provided with manipulation parts 141d' (lock/unlock mechanical switch) that allows the upper cover 141d to be fastened to the upper case 141b and allow the fastening to be released. The manipulation parts 141d' may be respectively formed at both left and right sides of the upper cover 141d, to permit pressing in directions opposite to each other, i.e., inward and returning to the original state by an elastic force. See FIG. 29.

The upper cover 141d is provided with fixing projections 141d" withdrawn or retracted from the outer circumference of the upper cover 141d in linkage with the manipulation of the manipulation part 141d. When the pressing manipulation of the manipulation parts 141d' is performed, the fixing projections 141d" are retracted into accommodation parts formed in the upper cover 141d not to protrude from the outer circumference of the upper cover 141d. If the manipulation parts 141d' are turned to the original state by the elastic force, the fixing projections 141d" protrude from the outer circumference of the upper cover 141d.

A fixing groove 141b" having the fixing projection 141d" inserted and fixed thereinto is formed in an inner surface of the upper case 141b, which forms the upper opening 141b'. The fixing groove 141b" may be formed at a position corresponding to each of the fixing projections 141d", so that the fixing grooves 141b" are opposite to each other. The fixing groove 141b" may be formed in a loop shape to extend along the inner surface of the upper case 141b to allow a greater degree of freedom in installing the fixing projections 141d".

The flow separation member or guide 141g that separate the flow of the air introduced through the entrance 140a from the flow of the air discharged toward the exit 140a, and guides the air flow in the dust container 140. The flow separation member 141g may be coupled to an upper end portion at an inner side of the external case 141a.

First and second holes 141a' and 141a" corresponding to the entrance 140a and the exit 140b of the dust container 140 are formed through the external case 141a. A first opening 141g' and a second opening 141g" corresponding to the first and second holes 141a' and 141a" are formed through the flow separation member 141g. With this structure, when the flow separation member 141g is coupled to the inner side of the external case 141a, the first hole 141a' and the first opening 141g' communicate with each other to form the entrance 140a of the dust container 140, and the second hole 141a" and the second opening 141g" communicate with each other to form the exit 140b of the dust container 140. See FIG. 29.

The flow separation member 141g may be provided with insertion protrusions 141g2 which are inserted into recesses 141a1 formed on an inner circumferential surface of the external case 141a. A support rib 141g3 may protrude from an upper portion of the flow separation member 141g along a circumference, such that the flow separation member 141g can be supported on an upper end of the external case 141a.

The flow separation member 141g has a hollow portion and is provided with a flow separating part 141g1 surrounding the hollow portion along a circumference. The hollow portion of the flow separation member 141g is configured to overlap the cover 141k such that air discharged through the communication holes 141k' can be introduced into an upper portion of the flow separating parts 141g1.

The first and second openings 141g' and 141g" are formed on surfaces of the flow separation member 141g, which are opposite to each other. As shown in this figure, the first opening 141g' is provided on a bottom surface of the flow separation member 141g, so that air introduced through the entrance 140a flows at a lower portion of the flow separation member 141g. The second opening 141g" is provided on a top surface of the flow separation member 141g, so that air discharged toward the exit 140b flows at an upper portion of the flow separation member 141g.

The flow separation member 141g is formed to block between the first opening 141g' and the second opening 141g", so that air introduced through the first opening 141g' and air discharged toward the second opening 141g" are separated from each other. The first opening 141g' may be provided with a guide part 141g4 which extends from one side of the first opening 141g' to guide air introduced into the dust container 140 to form a rotational flow. The exit 140b of the dust container 140 may be formed to minimize flow loss and to harmonize with peripheral structures without interruption.

The first opening 141g' and the second opening 141g" may be laterally provided side by side along the circumference of an upper portion of the flow separation member 141g. Accordingly, the entrance 140a and the exit 140b of the dust container 140 corresponding to the first and second openings 141g' and 141g", respectively, may be formed at the same height of the dust container 140. The entrance 140a is formed at an upper portion of the dust container 140 such that air introduced into the dust container 140 does not scatter dust collected on the bottom of the dust container 140.

In a cleaner (e.g., an upright type cleaner, a canister type cleaner, etc.) in which the height of the multi-cyclone is less restricted, an exit is typically installed at a position higher than that of an entrance. However, in the robot cleaner 100 of the present disclosure, when the capacity of the dust container 140 is to increase while considering of height restriction, the exit 140b along with the entrance 140a may be formed at the same height of the dust container 140.

In the structure of the present disclosure, in which air introduced through the entrance 140a is guided by the downwardly inclined flow separating part 141g1 (inclined guide), an angle at which the air introduced through the entrance 140a flows downward is related to inclination of the flow separating part 141g1. In this respect, if the inclination of the flow separating part 141g1 is large, the air introduced through the entrance 140a does not receive a sufficient centrifugal force, and may scatter dust collected on the bottom of the dust container 140.

The inclination of the flow separating part 141g1 may be relatively as small as possible. Since the flow separating part 141g1 is continued from an upper side of the entrance 140a to a lower side of the exit 140b, when the entrance 140a and the exit 140b are formed at the same height of the dust container 140, the downward inclination of the flow separating part 141g1 becomes more gentle as the length of the flow separating part 141g1 becomes longer. The flow separating part 141g1 is formed longest when the second opening 141g" is located immediately next to the first opening 141g'.

As illustrated, the entrance 140a and the exit 140b are laterally formed side by side at an upper end of the external case 141a. The flow separation member 141g may have a shape downwardly inclined spirally along an inner circumferential surface of the external case 141a from an upper end of the first opening 141g' to the lower end of the second opening 141g".

The inner case 141h, the cover 141k and the flow separation member 141g are coupled together. The inner case 141h may be provided with coupling bosses 141h" for coupling to the cover 141k and the flow separation member 141g.

The multi-cyclone provided within the dust container 140 filters foreign substances or dust in air introduced into the dust container 140 through the entrance 140a. The air having the foreign substances or dust filtered therefrom ascends and flows toward the exit 140b at an upper portion of the flow separating part 141g1. In the present disclosure, the dust container 140 has a structure in which foreign substances or dust is again filtered before the air flowing as described above is finally discharged through the exit 140b.

A filter 141f that passes through the multi-cyclone and then filters foreign substances or dust in air discharged toward the exit 140b is provided at a rear surface of the upper cover 141d. The filter 141f is provided to cover the cover 141k, so that dust in air passing through the vortex finder of the second cyclone 147b can be filtered by the filter 141f.

When the upper cover 141d is mounted to the upper case 141b, the filter 141f is provided to cover the cover 141k. For example, the filter 141f may be adhered closely to the top surface of the flow separating part 141g1 or be adhered closely to a top surface of the cover 141k.

The filter 141f may be mounted to a mounting rib 141e protruding from the rear surface of the upper cover 141d. The mounting rib 141e includes a plurality of protruding parts 141e' and a mounting part 141e". The mounting rib 141e may be integrally formed with the upper cover 141d in injection molding of the upper cover 141d.

The protruding parts 141e' are formed to protrude from the rear surface of the upper cover 141d, and are provided at a plurality of places, respectively. The mounting part 141e" is provided to be spaced apart from the rear surface of the upper cover 141d at a certain distance, and is supported at a plurality of places by the plurality of protruding parts 141e'. The mounting part 141e" may be formed in a loop shape larger than the hollow portion of the flow separation member 141g.

The filter 141f includes a filter part 141f' and a sealing part 141f". The filter part 141f' is provided to cover the hollow portion of the flow separation member 141g or the cover 141k to filter foreign substances or dust in air discharged through the communication holes 141k of the cover 141k. The filter part 141f' may have a mesh shape.

The sealing part 141f" is provided to surround the filter part 141f', and is mounted to the mounting part 141e" to allow the filter 141f to be fixed to the mounting rib 141e. In order for the filter 141f to be fixed to the mounting rib 141e, a groove into the mounting part 141e" is inserted may be formed in the sealing part 141f". The sealing part 141f" may be adhered closely to the top surface of the flow separating part 141g1 or the top surface of the cover 141k to cover the communication holes 141k' of the cover 141k.

Air from which foreign substances or dust is filtered by the multi-cyclone is discharged toward the exit 140b through an empty space between the protruding parts 141e' by passing through the filter part 141f'. Here, the empty space is formed at the outer circumference of the filter 141f, and communicates with an upper portion of the flow separating part 141g1. In addition, the sealing part 141f" is configured to seal a gap between the filter 141f and the top surface of the flow separating part 141g1 adhered closely to the filter 141f or the top surface of the cover 141k, so that it is possible to prevent foreign substances or dust in air from being discharged toward the exit 140b through the gap.

Figure 31:
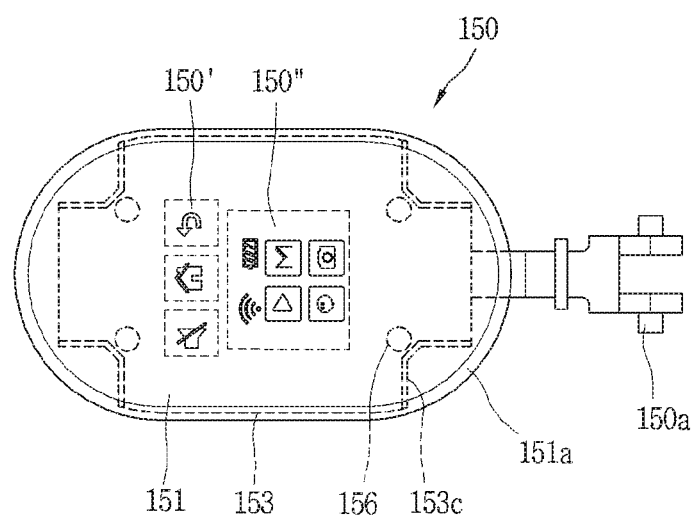
FIG. 31 is a view illustrating a dust container cover shown in FIG. 1.
Figure 32:
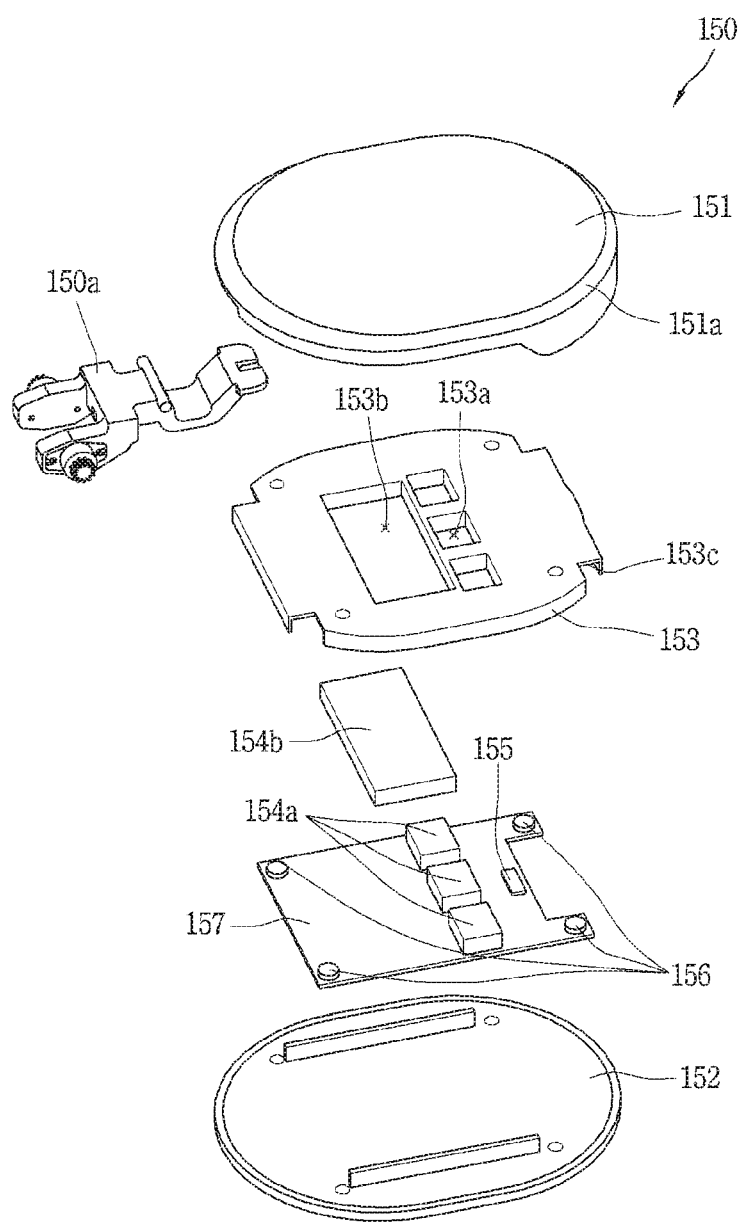
FIG. 32 is an exploded perspective view of the dust container cover shown in FIG. 31.

Referring to FIGS. 31 and 32 in conjunction with FIGS. 1 to 3, the dust container cover 150 is rotatably coupled to the cleaner body 110 by a hinge 150a, and is provided to completely cover a top surface of the dust container 140 when the dust container cover 150 is coupled to the dust container 140. In this state, a portion of the dust container cover 150 is accommodated in at the dust container accommodation part 113, and the other portion of the dust container cover 150 may be formed to protrude toward the rear of the cleaner body 110 (i.e., in the reverse direction R opposite to the forward direction F). The hinge 150a is configured to elastically pressurize the dust container cover 150 in the upper direction. When the dust container cover 150 is not coupled to the dust container 140, the dust container cover 150 may be tilted upwardly inclined with respect to the top surface of the dust container 140.

The dust container cover 150 may be formed in an elliptical shape in the front-rear direction of the cleaner body 110 to completely cover the circular dust container 140 when the dust container cover 150 is coupled to the dust container 140. A recessed part 116 dented from the top surface of the cleaner body 110 is formed along the outer circumference of the dust container accommodation part 113 in the cleaner body 110 (see FIGS. 19 and 23). The dust container cover 150 is accommodated in the dust container accommodation part 113 through rotation thereof.

The dust container cover 150 is provided to simultaneously cover the top surface of the dust container and the recessed part 116. A front-rear length of the dust container cover 150 corresponding to the front-rear direction of the cleaner body 110 may be formed longer than a left-right length of the dust container cover 150 corresponding to the left-right direction of the cleaner body 110. The left-right direction is formed equal to or longer than a radius of the dust container cover 150.

The dust container cover 150 may be provided with at least one of a touch key 150', a touch screen 150", and a display. The touch screen 150" may be distinguished from the display that outputs visual information but has no touch function, in that the touch screen 150" outputs visual information and receives a touch input to the visual information. The dust container cover 150 may include a top cover 151, a bottom cover 152, and a middle frame 153 between the top cover 151 and the bottom cover 152. The components may be formed of a synthetic resin material.

The top cover 151 may be configured to have a certain degree of transparency. For example, the top cover may be translucent. Alternatively, the top cover itself may be formed to be transparent, and a film attached to a rear surface of the top cover 151 may be translucent. As the top cover 151 has the transparency, a pictogram of the touch key 150' or visual information output from the touch screen 150" or the display may be transmitted to a user through the top cover 151.

A touch sensor that senses a touch input to the top cover 151 may be attached to the rear surface of the top cover 151. The touch sensor may constitute a touch key module 154a and/or a touch screen module 154b, which will be described later.

The bottom cover 152 is coupled to the top cover 151, so that the top cover 151 and the bottom cover 152 form an appearance of the dust container cover 150. The bottom cover 152 may be formed of an opaque material, and form a mounting surface on which electronic devices or a sub-circuit board 151 can be mounted in the dust container cover 150.

The hinge 150a rotatably coupled to the cleaner body 110 may be coupled to the top cover 151 or the bottom cover 152. The hinge part 150a may be provided in the top cover 151 or the bottom cover 152.

The electronic devices or the sub-circuit board 157 may be mounted on the bottom cover 152. For example, the sub-circuit board 157 electrically connected to a main circuit board of the cleaner body 110 may be mounted on the bottom cover 152. The main circuit board may be configured as an example of the controller for operating various functions of the robot cleaner 100.

Various electronic devices are mounted on the sub-circuit board 157. In FIG. 23, the touch key module 154a, the touch screen module 154b, and infrared receiving units 156 (e.g., IR sensors) are electrically connected on the sub-circuit board 157. The electrical connection includes not only that the electronic devices are mounted on the sub-circuit board 157 but also that the electronic devices are connected to the sub-circuit board 157 through a flexible printed circuit board (FPCB).

A pictogram may be printed on the top cover above the touch key module 154a, and the touch key module 154a is configured to sense a touch input to the pictogram of the top cover 151. The touch key module 154a may include a touch sensor, and the touch sensor may be provided to be attached or adjacent to the rear surface of the top cover 151. The touch key module 154a may further include a backlight unit that lights the pictogram.

The touch screen module 154b provides an output interface between the robot cleaner 100 and the user through the output of visual information. The touch screen module 154b senses a touch input to the top cover 151 to provide an input interface between the robot cleaner 100 and the user. The touch screen module 154b includes a display that outputs visual information through the top cover 151 and a touch sensor that senses a touch input to the top cover 151, and the display and the touch sensor form a mutual-layered structure or is integrally formed, thereby implementing a touch screen.

The touch screen module 154b may be accommodated in a through-hole 153b of the middle frame 153 to be coupled to the middle frame 153 through bonding, hook-coupling, or the like. In this case, the touch screen module 154b may be electrically connected to the sub-circuit board 157 through the FPCB. The touch screen module 154b may be attached to or provided adjacent to the rear surface of the top cover 151.

The dust container cover 150 may be provided with an acceleration sensor 155. The acceleration sensor 155 may be mounted on the sub-circuit board 157 or be electrically connected to the sub-circuit board 157 through the FPCB. The acceleration sensor 155 senses a gravitational acceleration acting on the acceleration sensor 155, which is divided into X, Y, and Z vectors perpendicular to one another.

The controller may sense whether the dust container cover 150 has been opened/closed, using X, Y, and Z vector values sensed by the acceleration sensor 155. Specifically, based on a state in which the dust container cover 150 is closed, at least two vector values are changed in a state in which the dust container cover 150 is opened (tilted). That is, the vector values sensed through the acceleration sensor 155 are changed depending on a degree to which the dust container cover 150 is inclined.

When a difference between vector values in the two states is equal to or greater than a preset reference value, the controller may determine that the dust container cover 150 has not been coupled to the dust container 140, to generate a corresponding control signal. For example, if the dust container cover 150 is in a tilted state as it is opened, the controller 155 may senses the tilted state to stop the driving of wheel unit 111 and generate an alarm.

In addition, if vibration is applied to the dust container cover 150, vector values sensed through the acceleration sensor 155 are changed. When a difference between the vector values, which is equal to or greater than the preset reference value, is sensed within a certain time, the state of the touch screen module 154b may be changed from a non-activation (OFF) state to an activation (ON) state. For example, if the user taps the dust container cover 150 plural times in a state in which the touch screen module 154b is not activated, the controller may sense the tapping of the user through the acceleration sensor 155 to change the state of the touch screen module 154b from the non-activation state to the active state.

A gyro sensor may be used instead of the acceleration sensor 155. The acceleration sensor 155 and the gyro sensor may be used together, so that improved sensing performance can be implemented through complementary detection.

The infrared receiving units 156 may be provided at corner portions of the sub-circuit board 157 to receive infrared signals transmitted from directions different from one another. Here, the infrared signal may be a signal output from a remote controller for controlling the robot cleaner 100 in manipulation of the remote controller.

The middle frame 153 is provided to cover the sub-circuit board 157, and has through-holes 153a and 153b respectively corresponding to the touch key module 154a and the touch screen module 154b, which are mounted on the sub-circuit board 157. Inner surfaces defining the through-holes 153a and 153b are formed to surround the touch key module 154a and a touch screen module 154b, respectively.

An accommodation part 153c that is provided to cover an upper portion of each of the infrared receiving units 156 and has an opened front to receive infrared light may be provided at each corner portion of the middle frame 153. According to the above-described disposal, the infrared receiving unit 156 is provided to face a side surface of the dust container cover 150 (specifically, a side surface of the top cover 151 having transparency). Since the upper portion of the infrared receiving unit 156 is covered by the accommodation part 153c, it is possible to prevent a malfunction of the infrared receiving unit 156, caused by a three-wavelength lamp provided on a ceiling or sunlight.

At least one portion of the dust container cover 150 may be provided to protrude further than the top surface of the cleaner body 110. As shown in these figure, the top cover 151 may be provided with a tapered part 151a extending downwardly inclined to the outside from a top surface thereof. The tapered part 151a may be formed to extend along the outer circumference of the top cover 151, and be located to protrude further than the top surface of the cleaner body 110 in the state in which the dust container cover 150 is coupled to the dust container 140 as shown in FIG. 3.

If a side surface vertically downwardly extending from the top surface of the top cover 151 is continuously formed, an infrared signal introduced into the top cover 151 at a corner portion of the top cover 151 is refracted or reflected, and therefore, the receiving performance of the infrared receiving unit 156 may be deteriorated. Further, if the side surface of the top cover 151 is completely covered by the top surface of the cleaner body 110, the receiving performance of the infrared receiving unit 156 may further deteriorate.

An infrared signal introduced into the top cover 151 can be introduced into the infrared receiving unit 156 provided adjacent to the inside of the tapered part 151a without being almost refracted or reflected by the tapered part 151a. In addition, as the tapered part 151a is located to protrude further than the top surface of the cleaner body 110, and the infrared receiving unit 156 is provided in plural numbers to be spaced apart from each other at a certain distance inside the tapered part 151a, infrared signals can be received in all directions. Thus, the receiving performance of the infrared receiving unit 156 may be improved.

Figure 33:
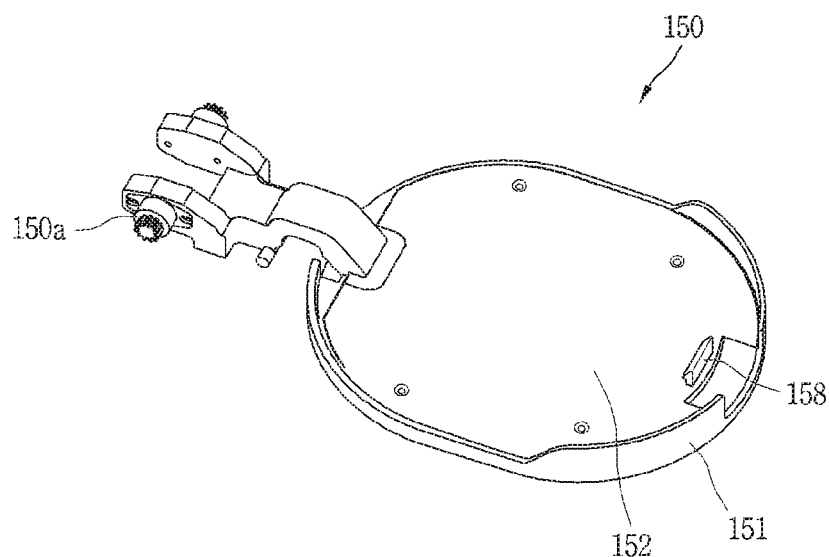
FIG. 33 is a view illustrating a rear surface of the dust container cover shown in FIG. 31.
Figure 34:
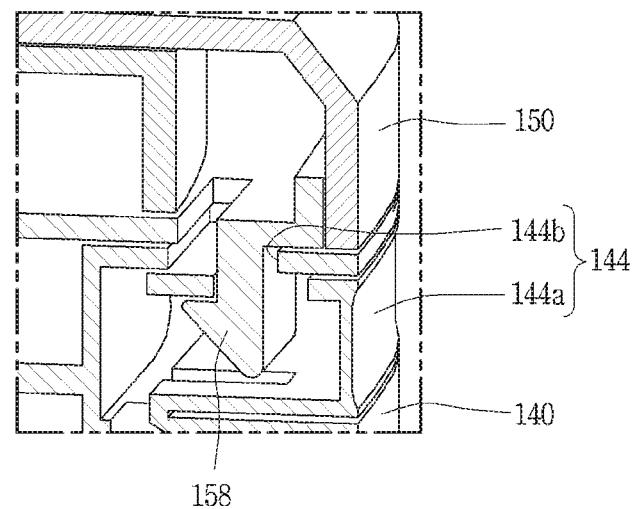
FIG. 34 is a sectional view illustrating a structure in which a hook part shown in FIG. 33 is fastened to the dust container.

Referring to FIGS. 33 and 34 in conjunction with FIG. 20, the dust container cover 150 is provided with the hook 158 configured to be fastened to a locking part 144 of the dust container 140. In these figures, it is illustrated that the hook part 158 is formed to protrude at one side of the bottom surface of the bottom cover 152. The hook part 158 may be provided at the opposite side of the hinge 150a.

When the hook 158 is fastened to the locking part 144, the handle 143 provided at an upper portion of the dust container 140 is pressurized by the dust container cover 150 to be accommodated in the handle accommodation part 142. If the fastening between the hook part 158 and the locking part 144 is released, the handle 143 is pressurized by the elastic member to protrude from the handle accommodation part 142. As described above, the handle 143 may be provided inclined with respect to the upper case 141b.

The locking part 144 provided in the dust container 140 includes a button part 144a and a holding part 144b. The locking part 144 is exposed to the rear of the cleaner body 110.

The button part 144a is provided at a side surface of the dust container 140 to permit pressing manipulation, and the holding part 146b is configured such that the hook part 158 of the dust container cover 150 can be locked thereto. Also, the holding part 146b is configured such that the locking of the holding part 146b to the hook part 158 is released in the pressing manipulation of the button part 144a. The holding part 144b may be formed at an upper portion of the dust container 140.

In the above, the case where the hook part 158 is provided in the dust container cover 150 and the locking part 144 is provided in the dust container 140 has been described as an example, but formation positions of the hook part 158 and the locking part 144 may be changed from each other. In other words, the locking part may be provided in the dust container cover 150 and the hook part may be provided in the dust container 140.

As described above, the dust container cover 150 is detachably coupled to the dust container by the fastening structure between the hook part 158 and the locking part 144. That is, there exists no direct fastening relation between the dust container cover 150 and the cleaner body 110, and the dust container cover 150 is fastened to the dust container 140 accommodated in the dust container accommodation part 113.

As described above, the dust container 140 accommodated in the dust container accommodation part 113 is restricted from being moved in the lateral direction by the fastening between the mounting projection 113b and the mounting groove 149 and the fastening between the locking hook 145 and the step 116a'. In the state in which the dust container 140 is accommodated in the dust container accommodation part 113, if the dust container cover 150 is fastened to the dust container 140 in a state in which the dust container cover 150 covers the dust container 140, the dust container 140 is also restricted from being moved upward. Thus, the dust container 140 can be prevented from being separated from the dust container accommodation part 113.

When the dust container 140 is not mounted, the dust container cover 150 is in a state in which it is freely rotatable about the hinge part 150a, i.e., a non-fixing state. As described above, the dust container cover 150 may be provided upwardly tilted in the non-fixing state.

The dust container cover 150 is provided in a horizontal state when the dust container cover 150 is fastened to the dust container 140. If the dust container cover 150 is not fastened to the dust container 140, the dust container cover 150 is in a state in which it is tilted upwardly inclined. When the dust container 140 is not accommodated in the dust container accommodation part 113, the dust container cover 150 is also in the state in which it is tilted upwardly inclined. Thus, the user can intuitively check whether the dust container cover 150 has been fasted to the dust container 140, by checking, with the naked eye, whether the dust container cover 150 is in the state in which it is tilted.

Air filtered in the dust container 140 is discharged from the dust container and finally discharged to the outside through the exhaust port 112. A filter unit 160 that filters fine dust included in the filtered air is provided at the front of the exhaust port 112.

Figure 35:
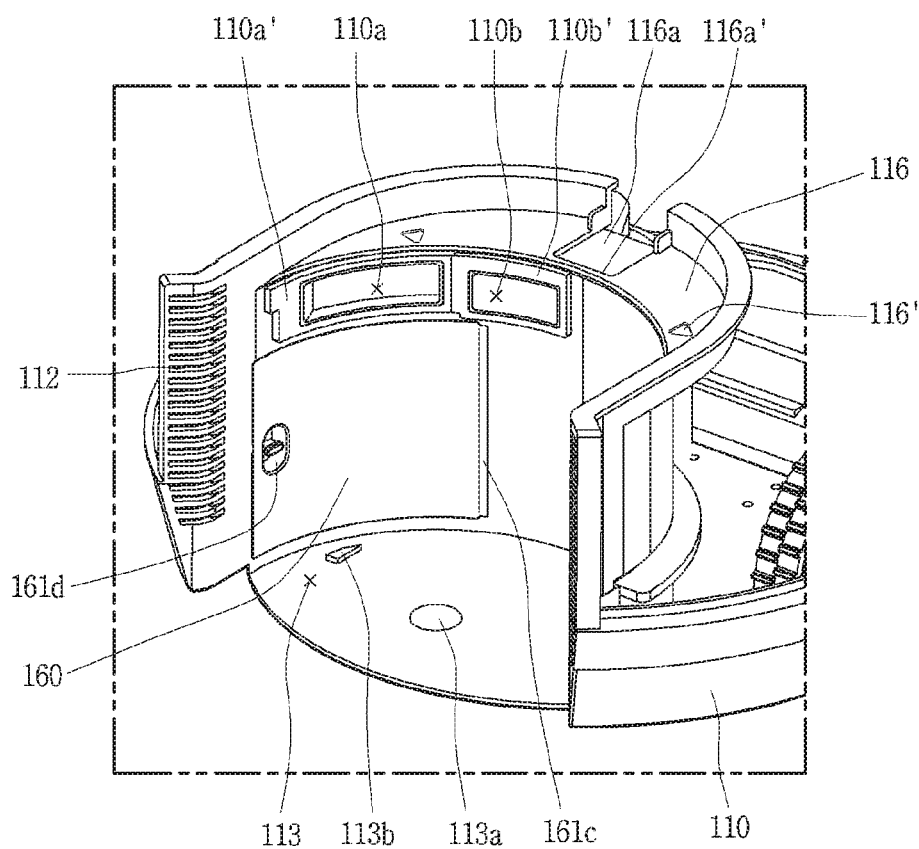
FIG. 35 is a view illustrating an inside of the dust container accommodation part shown in FIG. 19.
Figure 36:
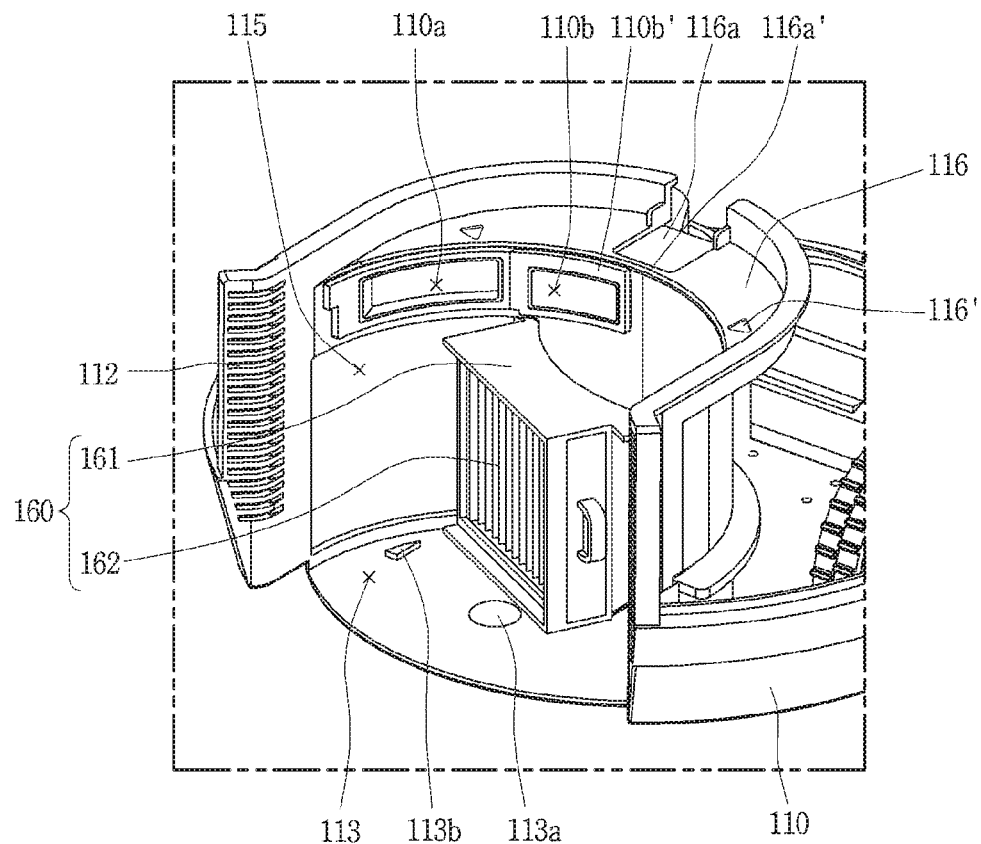
FIG. 36 is a view illustrating a state in which a filter unit shown in FIG. 35 is rotated.
Figure 37:
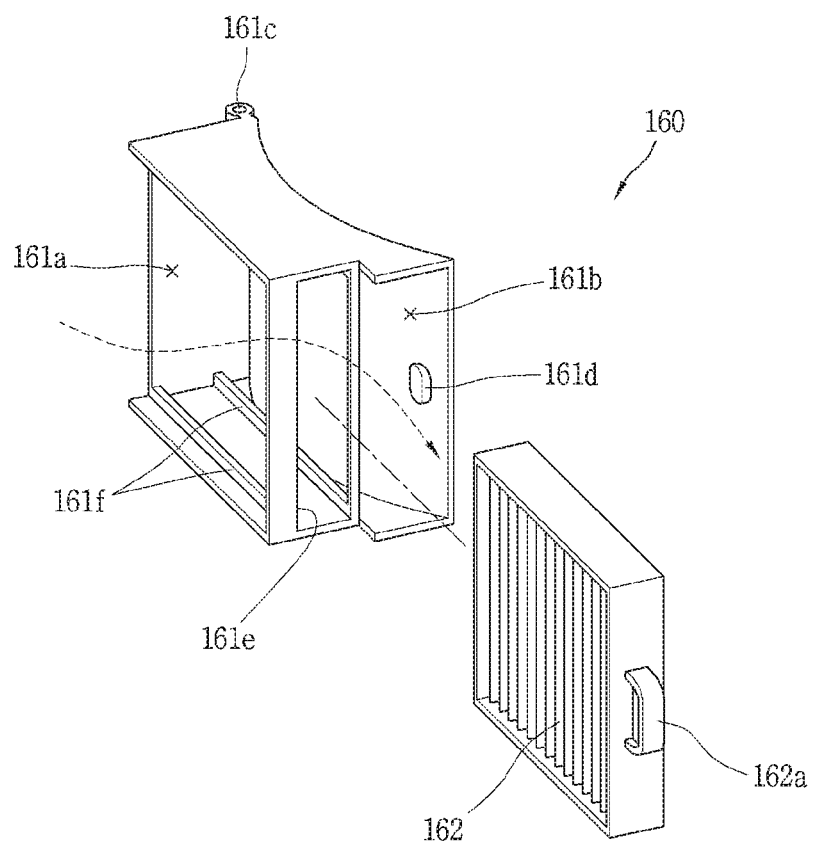
FIG. 37 is an exploded perspective view of the filter unit shown in FIG. 36.

Referring to FIGS. 35 to 37, the filter unit 160 is accommodated in the cleaner body 110, and is provided at the front of the exhaust port 112. The filter unit 160 is exposed to the outside when the dust container 140 is separated from the dust container accommodation part 113. The exhaust port 112 may be formed in an inner wall of the cleaner body 110 that defines the dust container accommodation part 113. The exhaust port 112 may be formed at one (left or right) end portion of the cleaner body 110 that surrounds the dust container accommodation part 113. In this exemplary embodiment, it is illustrated that the exhaust port 112 is formed long along the height direction of the cleaner body 110 at the left end portion of the dust container accommodation part 113 on the drawing.

Air discharged from the second opening 110b is guided to the exhaust port 112 through the exhaust flow path. In the structure in which the exhaust port 112 is formed at the one end portion of the cleaner body 110, the exhaust flow path extends to the one end of the cleaner body 100. The filter unit 160 is provided on the exhaust flow path.

The filter unit 160 includes a filter case 161 and a filter 162. The filter case 161 is provided with a hinge part 161c hinge-coupled to the inner wall of the cleaner body 110 that defines the dust container accommodation part 113. The filter case 161 is configured to be rotatable with respect to the cleaner body 110.

The filter case 161 includes a filter accommodation part 161a (filter housing) and a ventilation port 161b that communicates with the filter accommodation part 161a and is provided to face the exhaust port 112. Air introduced into the filter case 161 is discharged to the ventilation port 161b via the filter 162 mounted in the filter accommodation part 161a.

The filter 162 is mounted in the filter accommodation part 161a. A HEPA filter for filtering fine dust may be used as the filter 162. A handle 162a may be provided to the filter 162.

Figure 30:
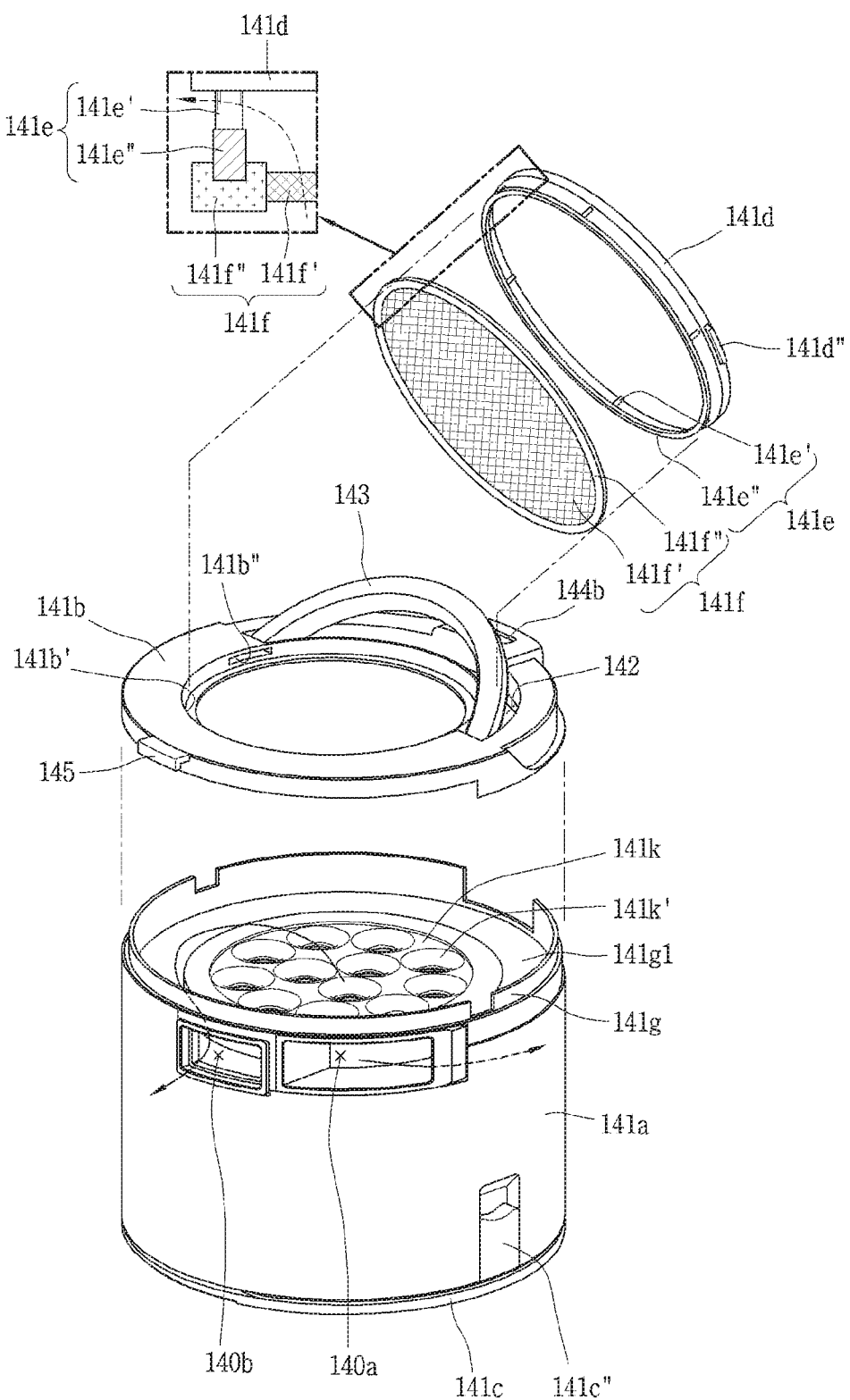
FIG. 30 is a view illustrating a state in which an upper case and an upper cover are separated from the dust container shown in FIG. 20.

In FIG. 30, it is illustrated that the filter accommodation part 161a is formed at a front surface of the filter case 161, and the ventilation port 161b is formed in a side surface of the filter case 161. More specifically, a through-hole 161e is formed in the side surface of the filter case 161, and a guide rail 161f protrudes along the insertion direction of the filter 162 on a bottom surface of the filter case 161 to guide the insertion of the filter 162 through the through-hole 161e.

The structure in which the filter 162 is mounted in the filter case 161 is not limited thereto. As another example, unlike the structure shown in FIG. 30, the filter 162 may be mounted at a front surface of the filter case 161 to be accommodated in the filter accommodation part 161a. In this case, the filter 162 may be fixed to the filter accommodation part 161a through hook coupling.

The filter case 161 may be received in the cleaner body 110 through an opening 115 formed in the inner wall of the cleaner body 110, and an outer surface of the filter case 161 is exposed to the outside in the state in which the filter case 161 is received in the cleaner body 110 to define the dust container accommodation part 113 together with the inner wall of the cleaner body 110. To this end, the outer surface of the filter case 161 may have a rounded shape, and be preferably formed as a curved surface having the substantially same curvature as the inner wall of the dust container accommodation part 113.

A knob 161d may be formed on one surface of the filter case 161 that defines the dust container accommodation part 113 together with the inner wall of the cleaner body 110. Referring to FIGS. 2 and 19, when the dust container 140 is accommodated in the dust container accommodation part 113, the dust container 140 is configured to cover the filter case 161, and the knob 161d is not exposed to the outside as the dust container 140 covers the knob 161d.

The filter case 161 may be provided in the dust container accommodation part 113 in a state in which the filter case 161 is rotated to open the opening 115. The filter accommodation part 161a is exposed to the outside, so that the filter 162 can be easily replaced.

Figure 38:
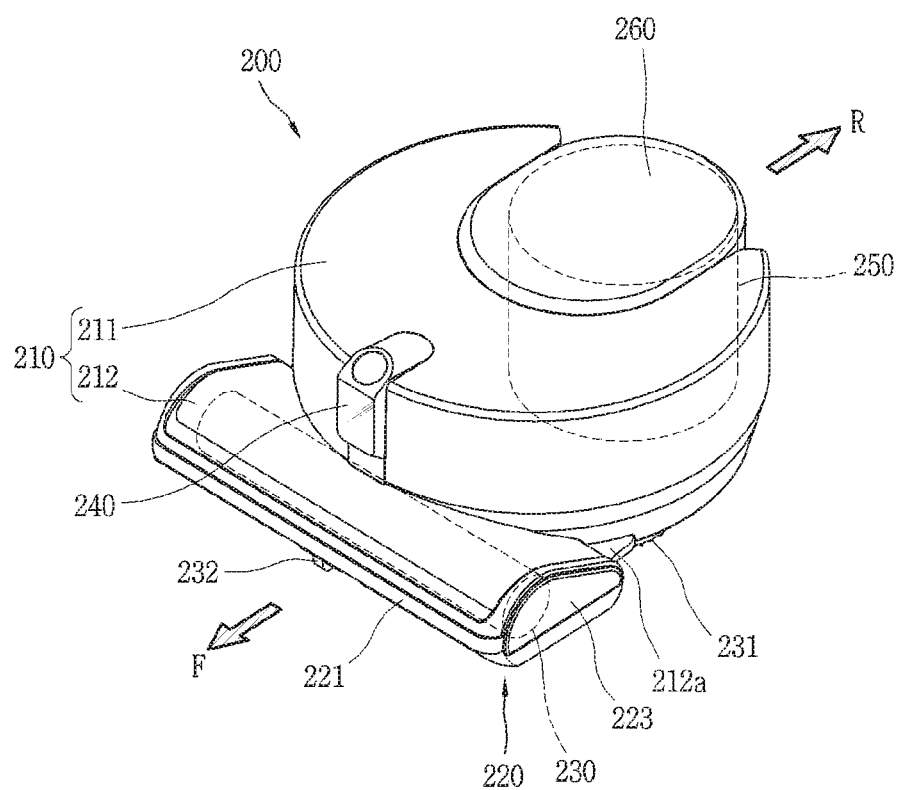
FIG. 38 is a perspective view illustrating another example of the robot cleaner according to the exemplary embodiment.
Figure 39:
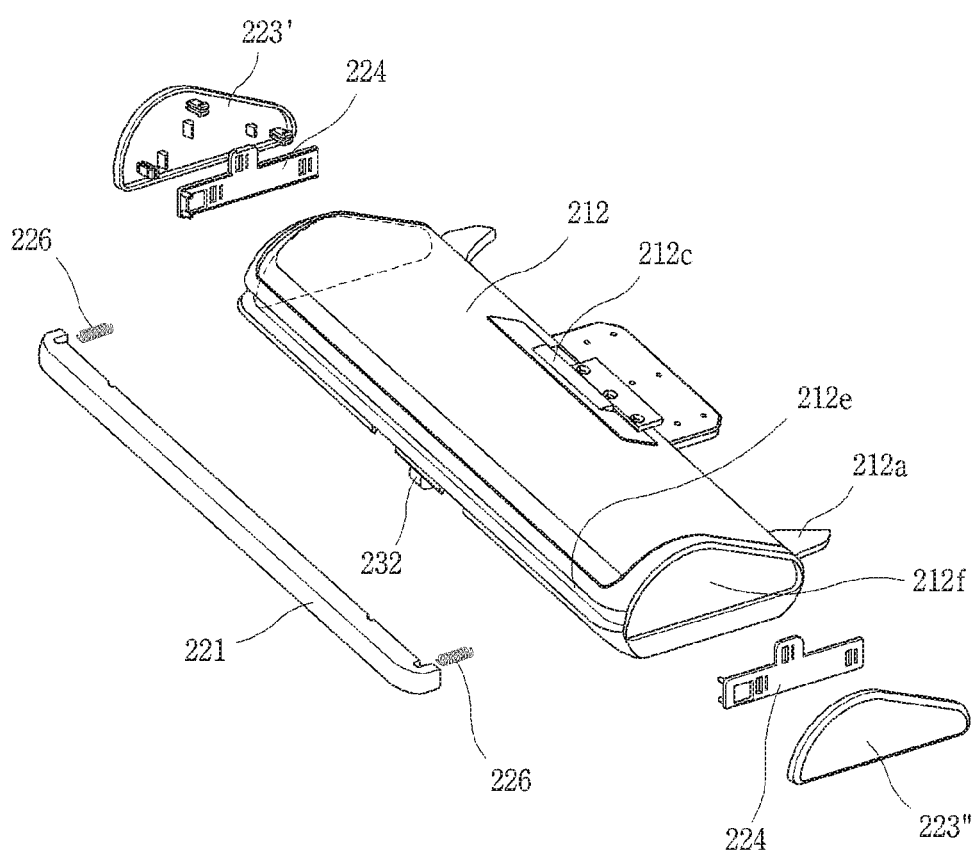
FIG. 39 is an exploded perspective view of a collision sensing part shown in FIG. 38.
Figure 40:
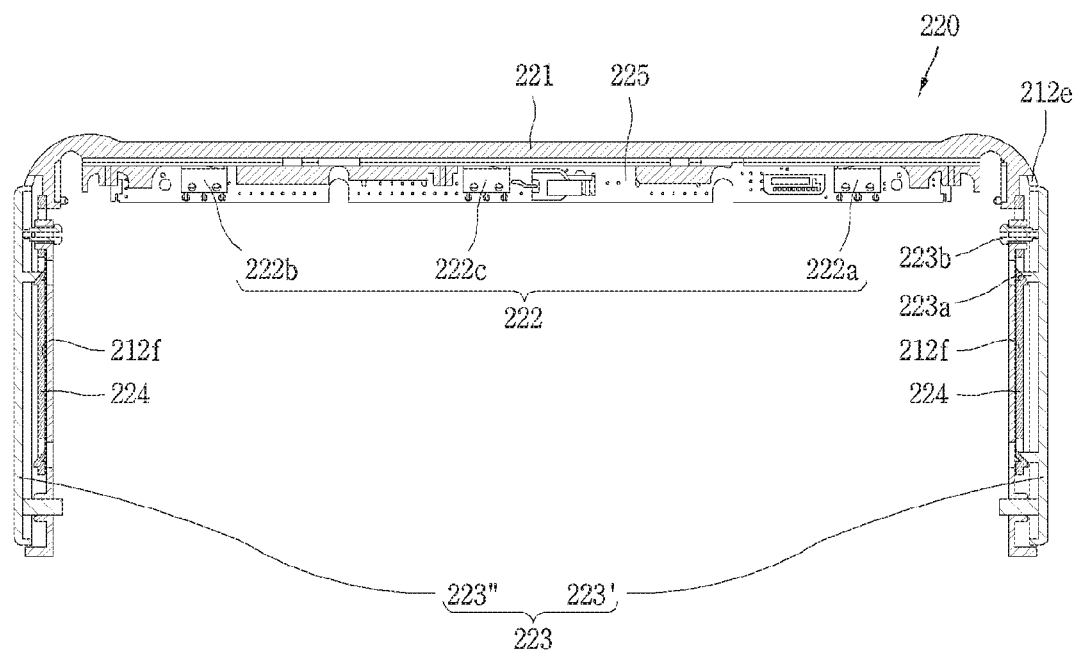
FIG. 40 illustrates a connection structure of the collision sensing part shown in FIG. 38.
Figure 41:
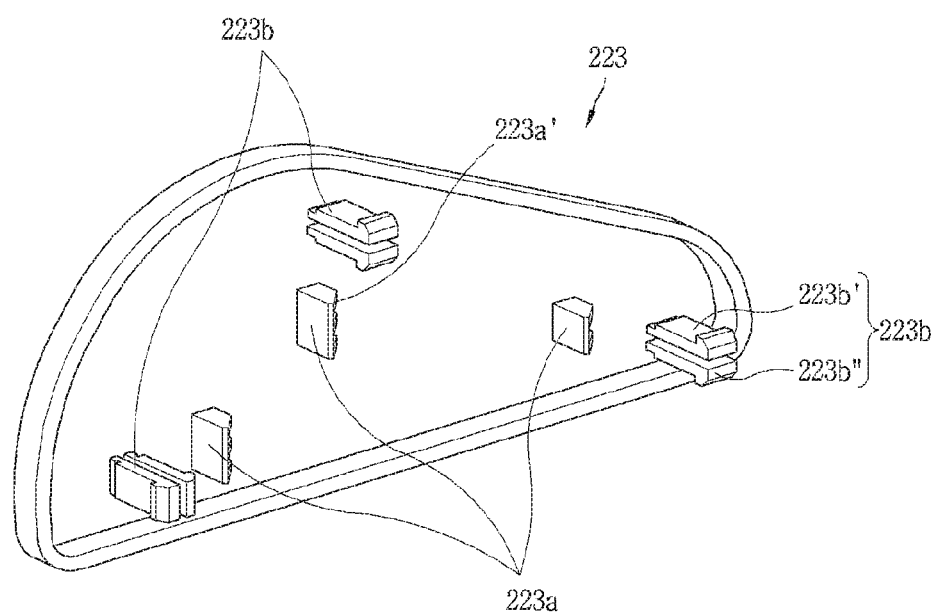
FIG. 41 is a perspective view illustrating an inside of a side bumper shown in FIG. 39.
Figure 42:
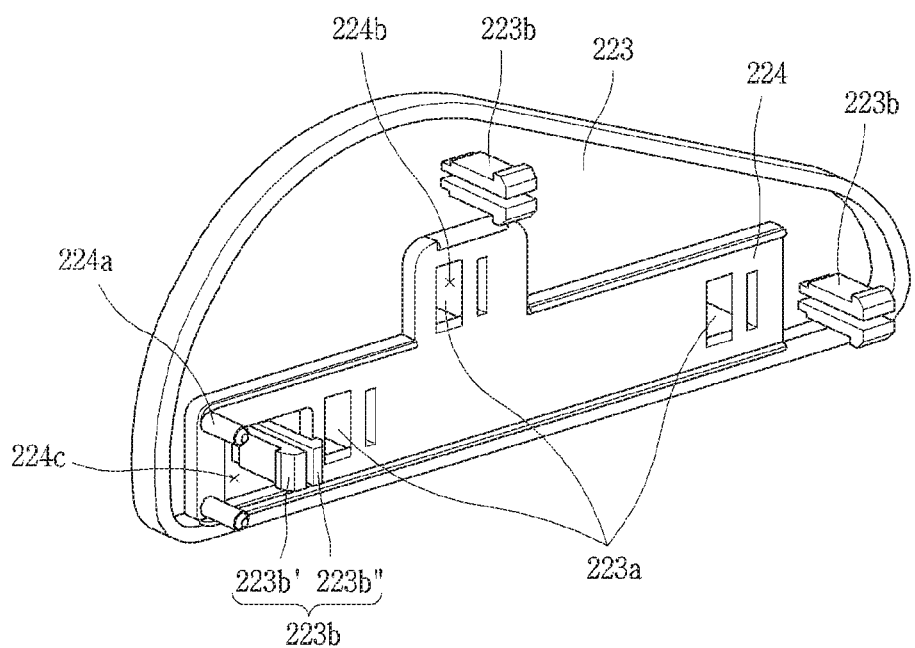
FIG. 42 illustrates a state in which a link member is coupled to the inside of the side bumper shown in FIG. 39.

FIG. 38 is a perspective view illustrating another example 200 of the robot cleaner according to an embodiment. The robot cleaner 200 performs a function of cleaning a floor while traveling autonomously in a certain area. The cleaning of the floor includes sucking dust and foreign substances on the floor or mopping the floor. The robot cleaner 200 includes a cleaner body 210, a collision sensing part or assembly 220, and a drive wheel 231. The cleaner body 210 forms an appearance of the robot cleaner 200. Various parts including a controller for controlling the robot cleaner 200 are equipped or mounted in the cleaner body 210.

As illustrated, the cleaner body 210 includes a first housing 211 and a second housing 212 provided at one side of the first housing 211. The one side may be a side at which the cleaner body 210 travels in a forward direction F, e.g., a front side of the first housing 211.

A circuit board constituting the controller is provided in the first housing 211, and various modules (e.g., a brush module 230 or a mop module) are detachably coupled to the second housing 212. The first housing 211 and the second housing 212 may be respectively named as a main housing and a module mounting housing (or cleaner head housing) in terms of their functions.

When the second housing 212 is provided at one side of the first housing 211, a front surface and both left and right surfaces of the second housing 212 form a front circumference of the cleaner body 210. When the cleaner body 210 collides with an obstacle during traveling, the collision is mainly occurs at the front surface and both the left and right surfaces of the second housing 212.

The collision sensing part 220 that senses a collision with an obstacle is installed in the second housing 212. The collision sensing part 220 is configured to sense a collision with an obstacle, which is performed on the front surface and both the left and right surfaces of the second housing 212.

The drive wheel 231 that is rotated by receiving a driving force transmitted from a driving motor is provided to the cleaner body 210. Driving of the drive motor may be controlled by the controller. The drive wheel 231 may be provided at both left and right sides of the first housing 211. The cleaner body 210 may be moved to the front, rear, left, and right or be rotated by the driving wheels 231.

An auxiliary wheel 232 may be additionally provided to the cleaner body 210. The auxiliary wheel 232 is distinguished from the drive wheel 231 in that the auxiliary wheel 232 has only a rolling function with respect to a floor. The auxiliary wheel 232 is configured to support the cleaner body 210 together with the drive wheel 231 and to assist traveling of the cleaner body 210 through the drive wheel 231. When the second housing 212 is provided at one side of the first housing 211, the auxiliary wheel 232 may be provided to the second housing 212 in addition to or alternatively to the cleaner body 210.

A sensing unit 240 is provided at the first housing 211. The sensing unit 240 may be provided at one side of the first housing 211, at which the second housing 212 is located, i.e., a front side of the first housing 211. The sensing unit 240 may be provided to overlap with the second housing 212 in the top-bottom (vertical) direction of the first housing 211. The sensing unit 240 is provided at an upper portion of the second housing 212 to sense an obstacle or geographic feature at the front thereof such that the second housing 212 located at the front most side of the robot cleaner 200 does not collide with the obstacle or geographic feature.

When the robot cleaner 200 is configured to perform a vacuum cleaning function, air containing dust and foreign substances is sucked through an opening formed at a bottom portion of the second housing 212, and the brush module 230 that sweeps dust and foreign substances on a floor may be mounted in the opening.

If the brush module 230 is detached from the second housing 212, the mop module may be detachably coupled to the second housing 212 in replacement of the detached brush module 230. The mop module may be detachable coupled to the opening in replacement of the separated brush module 230. A user can selectively mount the bush module 230 or the mop module in the opening according to a cleaning desired. The controller may recognize a module mounted in the opening and perform an operation corresponding to the module.

For example, when the brush module 230 is mounted in the opening, the controller may generate a suction force for sucking air on a floor by driving a motor and a fan. In addition, the controller may drive a rotation driving part such that the bush module 230 connected to the rotation driving part sweeps dust and foreign substances on the floor.

When the mop module is mounted in the opening, the controller may drive the rotation driving part. The mop module connected to the rotation driving part wipes the floor while rotating as the rotation driving part is driven. As described above, the controller may be configured to disable the diving of the motor and the fan in the state in which the mop module is mounted in the opening.

Dust and foreign substances in air sucked through the brush module 230 is filtered to be collected in a dust container 250, and the air separated from the dust and foreign substances is discharged to the outside of the first housing 211. An intake flow path that guides air introduced through the opening to the dust container 250 and an exhaust flow path that guides the flow of air from the dust container 250 to the outside of the first housing 211 may be formed in the first housing 211.

When the second housing 212 is provided at one side of the first housing 211, there is a likelihood that the robot cleaner 200 will collide with an obstacle. The sensing unit 240 provided to the first housing 211 may sense an obstacle at the front of the second housing 212. However, when an obstacle exists in a blind spot that the sensing unit 240 does not sense, when an obstacle suddenly appears, or an erroneous analysis of an obstacle occurs, a physical collision between the robot cleaner 200 and the obstacle may occur. When the physical collision occurs, the robot cleaner 200, the robot cleaner 200 moves rearward or changes a direction thereof. To this end, it is first required to sense a physical collision of the robot cleaner 200 with an obstacle.

The collision sensing part 220 that performs sensing on a physical collision of the robot cleaner 200 with an obstacle will be described in more detail. Referring to FIGS. 39 to 42, the collision sensing part 220 that senses a physical collision with an obstacle is provided to the second housing 212. The collision sensing part 220 is configured to sense not only a physical collision that occurs on a front surface of the second housing 212 but also a physical collision that occurs on a side surface of the second housing 212.

The collision sensing part 220 includes a front bumper 221, a sensing means 222 (e.g., sensor), side bumpers 223' and 223", and the link member 224. The front bumper 221 is provided at a front portion of the second housing 212. The front bumper 221 is formed to extend long along the left-right direction of the second housing 212. A first bumper mounting part 212e that accommodates the front bumper 221 therein may be formed in the second housing 212. The first bumper mounting part 212e may have a shape corresponding to the front bumper 221.

The front bumper 221 is mounted at the front portion of the second housing 212 to protrude forward from the second housing 212. The front bumper 221 is pressurized in a collision with an obstacle to be movable to the inside of the second housing 212 (e.g., the rear of the second housing 212). The front bumper 221 may include an elastic material to absorb impact in the collision with the obstacle. If the front bumper 221 is spaced apart from the obstacle, the front bumper 221 is moved to the outside of the second housing 212 (e.g., the front of the second housing 212) to return to the original position, i.e., the position at which a portion of the front bumper 221 protrudes forward from the second housing 212.

In order for the front bumper 221 to be moved to the inside/outside of the second housing 212, an elastic member 226 (elastic spring) may be provided between the front bumper 221 and the first bumper mounting part 212e. The elastic member 226 is supported by each of the front bumper 221 and the first bumper mounting part 212e to elastically pressurize the front bumper 221 to the outside of the second housing 212. The elastic member 226 may be provided in plurality to be spaced apart from each other at a preset distance along the extending direction of the front bumper 221.

The sensing means 222 that senses a movement of the front bumper 221 to the inside of the second housing 212 is provided at the inside of the front bumper 221. The sensing means 222 is electrically connected to the controller to transmit a sensing signal to the controller when the sensing means 222 senses a movement of the front bumper 221 to the inside of the second housing 212.

Figure 43:
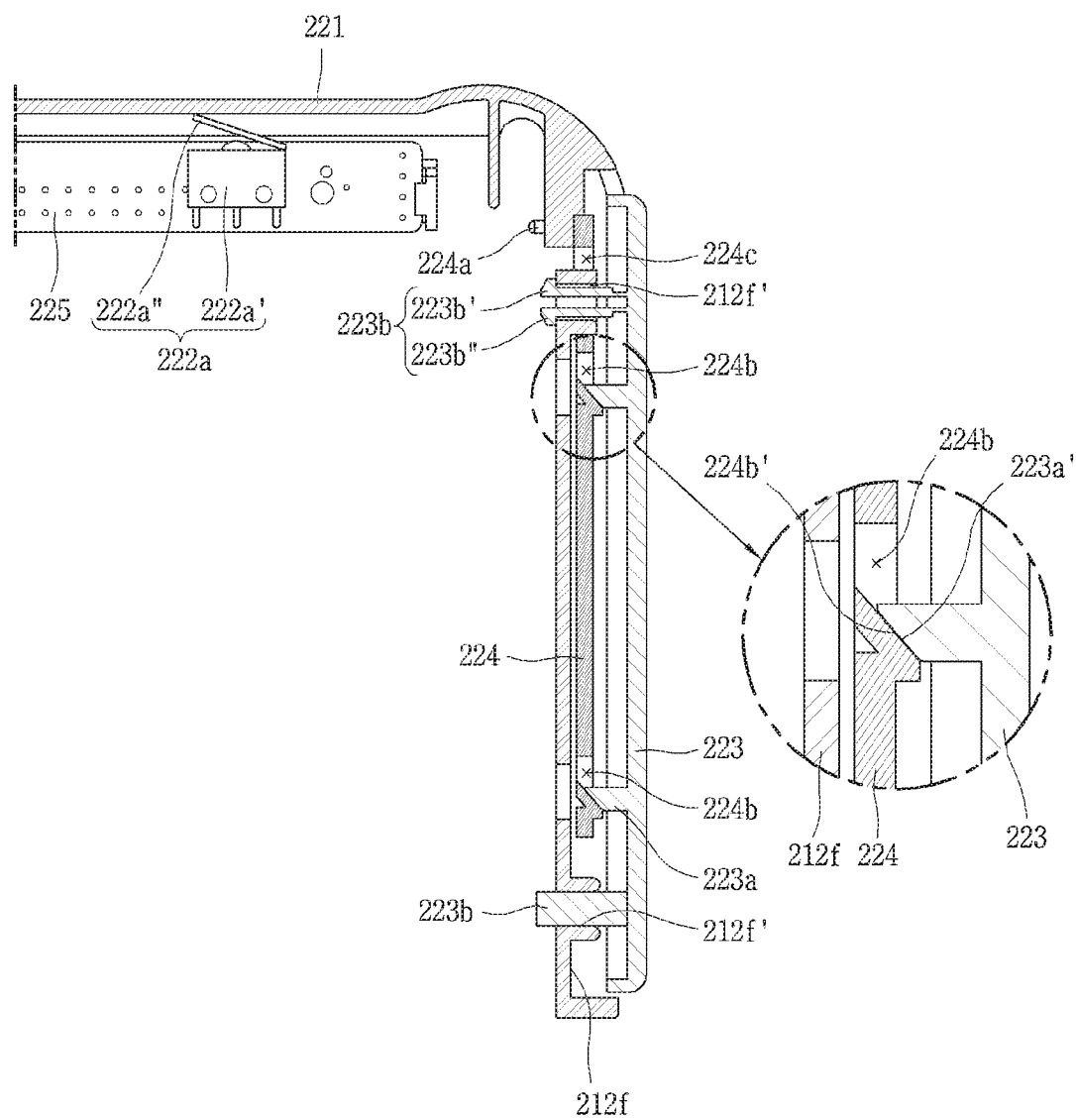
FIG. 43 illustrates an interlock mechanism between a front bumper and the side bumper, shown in FIG. 40.

A micro switch 222a, 222b, or 222c configured to be pressurized as the front bumper 221 is moved inwards due to a collision with an obstacle is illustrated as an example of the sensing means 222. Referring to FIG. 43, the micro switch 222a, 222b, or 222c may include a switch body 222a' having a switch part and a lever 222a" rotatably provided to the switch body 222a'. The lever 222a" may be in contact with or spaced part from the switch part by rotation thereof, to turn on/off the micro switch 222a, 222b, or 222c.

In addition to the above-described lever type, the micro switch 222a, 222b, or 222c may be configured in various types such as a button type. In addition, various sensors such as an optical sensor may be used as the sensing means 222, in addition to the above-described micro switch.

The sensing means 222 may be provided in plurality to be spaced apart from each other at a preset distance along the extending direction of the front bumper 221. A first micro switch 222a may be located adjacent to a right end portion of the front bumper 221, a second micro switch 222b is located adjacent to a left end portion of the front bumper 221, and a third micro switch 222c is located between the first micro switch 222a and the second micro switch 222b. The third micro switch 222c may be located at a central portion of the front bumper 221.

When the front bumper 221 collides head-on with an obstacle at the front thereof, the front bumper 221 may be entirely uniformly (i.e., a degree to which the right and left end portions of the front bumper 221 are equally moved) moved to the inside of the second housing 212. All of the first to third micro switches 222a, 222b, and 222c located at the inside of the front bumper 221 are pressurized as the front bumper 221 is entirely uniformly moved inward.

When one end portion of the front bumper 221 collides with an obstacle, the one end portion of the front bumper 221 may be moved to the inside of the second housing 212 in a state in which the one end portion of the front bumper 221 is tilted with respect to the other end portion of the front bumper 221. For example, when the right end portion of the front bumper 221 collides with an obstacle, the right end portion of the front bumper 221 is moved to the inside of the second housing 212, and accordingly, the first micro switch 222a located at the inside of the right end portion of the front bumper 221 is pressurized. However, in this case, the left end portion of the front bumper 221 is not moved to the inside of the second housing 212 or is minutely moved to a degree where the second micro switch 222b located at the inside of the left end portion of the front bumper 221 is not pressurized. The third micro switch 222c may be differently pressurized depending on a position of the front bumper 221 that collides with the obstacle.

The sensing means 222 may be mounted on a sub-circuit board 225. The sub-circuit board 225 is electrically connected to a main circuit board provided in the first housing 211. The main circuit board may include the controller. The sub-circuit board 225 may be formed to extend along the extending direction of the front bumper 221, and the plurality of sensing means 222 may be spaced apart from each other at a preset distance along the extending direction of the sub-circuit board 225. The first micro switch 222a may be provided adjacent to a right end portion of the sub-circuit board 225, a second micro switch 222b is located adjacent to a left end portion of the sub-circuit board 225, and the third micro switch 222c is provided at a central portion of the sub-circuit board 225. The sensing means 222 may be provided in addition to or alternatively at the first bumper mounting part 212e or a supporting part formed at the inside of the first bumper mounting part 212e.

The side bumpers 223' and 223" are provided at left and right surface portions of the second housing 212, respectively. A second bumper mounting part 212f (plate or sidewall of the second housing) that accommodates the side bumper 223' or 223" therein may be formed in the second housing 212. The second bumper mounting part 212f may have a shape corresponding to the side bumper 223' or 223".

The side bumpers 223' and 223" are provided at the left and right surface portions of the second housing 212, respectively, so that a portion of each of the side bumpers 223' and 223" is provided to protrude in a lateral direction of the second housing 212. The side bumpers 223' and 223" may be provided to protrude further than virtual extension lines in contact with both sides of the first housing 211, respectively. When an obstacle is located on a side surface of the robot cleaner 200, the side bumper 223' or 223" may collide with the obstacle earlier than the first housing 211, thereby effectively sensing the obstacle.

A fixing hook 223b for locking to the second housing 212 may be formed to protrude from an inner surface of the side bumper 223' or 223". The fixing hook 223b may be inserted in a through-hole 212f' formed in the second bumper mounting part 212f. The fixing hook 223b may be configured such that an end portion of the fixing hook 223b is locked to the through-hole 212f' not to come off from the through-hole 212f'.

The fixing hook 223b may be formed to extend sufficiently such that the side bumper 223' or 223" is movable inwards/outwards with respect to the second mounting part 212f. The inward/outward movement of the side bumper 223' or 223" may be guided by the fixing hook 223b passing through the through-hole 212f'.

The fixing hook 223b may be provided in plurality to be spaced apart from each other such that the side bumper 223' or 223" can be stably fixed to the second bumper mounting part 212f. The fixing hooks 223b are provided at both sides of the side bumper 223' or 223" and a position spaced apart upwards from a point between both the sides, respectively.

At least one of the plurality of fixing hooks 223b may be fixed to the second bumper mounting part 212f by passing through a hole 224c of the link member 224. The hole 224c through which the fixing hook 223 passes may have a long hole extending long in a lateral direction by considering a relative movement of the link member 224 in the lateral direction with respect to the side bumper 223' or 223".

The fixing hook 223b may be configured with cantilever type hook bars 223b' and 223b" that are provided adjacent to each other and elastically deformable in a direction which the hook bars 223b' and 223b" are close to or distant from each other. The hook bars 223b' and 223b" constituting any one fixing hook 223b may be provided in a direction different from that of the hook bars 223b' and 223b" constituting another fixing hook 223b. As shown in these figures, while the hook bars 223b' and 223b" constituting any one fixing hook 223b are provided to be spaced apart from each other in the left-right direction, the hook bars 223b' and 223b" constituting another fixing hook 223b may be provided to be spaced apart from each other in the top-bottom direction.

An actuator 223a is formed to protrude from an inner surface of the side bumper 223' or 223". The actuator 223a may be provided in plurality to be spaced apart from each other. The actuator 223a may be provided adjacent to the fixing hook 223b.

The side bumper 223' or 223" is pressurized in a collision with an obstacle to be movable to the inside of the second housing 212 (i.e., the opposite side of the second housing 212. The side bumper 223' or 223" may include an elastic material to absorb impact in the collision with the obstacle.

If the side bumper 223' or 223" is spaced apart from the obstacle, the side bumper 223' or 223" is moved to the outside of the second housing 212 (i.e., a side of the second housing 212) to return to the original position, i.e., the position at which a portion of the side bumper 223' or 223" protrudes laterally from the second housing 212.

The inward/outward movement of the side bumper 223' or 223" may be performed by the link member 224 connected to the front bumper 221 that is elastically pressurized forward by the elastic member 226. That is, the inward/outward movement of the side bumper 223' or 223" may be performed without any separate elastic member.

The link member 224 is provided at the inside of the side bumper 223' or 223". The link member 224 allows the side bumper 223' or 223" and the front bumper 221 to interlock with each other such that, when the side bumper 223' or 223" is moved inwards, at least one portion of the front bumper 221 is moved inwards together with the side bumper 223' or 223" to pressurize the sensing means 222.

Referring to FIG. 43, the link member 224 is formed in the shape of a flat plate extending long along one direction. The link member 224 is provided to be spaced apart from the inner surface of the side bumper 223' or 223" at a certain distance. The link member 224 may be supported by an inner wall of the second bumper mounting part 212f. The link member 224 is provided perpendicular to the front bumper 221.

The link member 224 includes a coupling part 224a (e.g., pegs) coupled to the front bumper 221 and an accommodation part 224b (holes) that accommodates the actuator 223a of the side bumper 223' or 223" therein. The coupling part 224a is coupled to the one end portion (or the other end portion) of the front bumper 221. The one end portion of the front bumper 221 and the link member 224 are moved together.

For example, if the one end portion of the front bumper 221 is moved in one direction (i.e., the rear or front of the second housing 212), the link member 224 coupled to the front bumper 221 is also moved in the one direction. In addition, if the link member 224 is moved in one direction (i.e., the rear or front of the second housing 212), the one end portion of the front bumper 221 coupled to the link member 224 is also moved in the one direction.

The coupling part 224a may be formed at one end portion of the link member 224. In FIG. 43, it is illustrated that the coupling part 224a formed at a front end portion of the link member 224 is coupled to the right end portion of the front bumper 221. The coupling part 224a may be formed to protrude from a major surface of the link member 224, and be inserted and fixed into a fastening hole formed in the front bumper 221.

The accommodation part 224b is formed in the link member 224. The accommodation part 224b accommodates the actuator 223a of the side bumper 223' or 223". When the side bumper 223' or 223" is moved inwards, the accommodation part 224b is pressurized by the actuator 223a to be pushed rearward. Specifically, when the side bumper 223' or 223" is moved inwards, the actuator 223a pressurizes an inner surface 224b' of the accommodation part 224b to push the link member 224 to the rear of the second housing 212.

When the side bumper 223' or 223" is moved inwards, the link member 224 is slidingly moved rearward of the side bumper 223' or 223". The moving direction of the link member 224 is perpendicular to the direction in which the side bumper 223' or 223" is moved inwards.

The actuator 223a is formed inclined such that a degree to which the actuator 223a gradually protrudes toward the rear of the second housing 212 is decreased. An inclined surface 223a' formed accordingly is configured to pressurize the inner surface 224b' of the accommodation part 224b when the side bumper 223' or 223" is moved inwards. The inclined surface 223a' may be formed to face the rear of the second housing 212.

The inner surface 224b' of the accommodation part 224b may be formed inclined corresponding to the inclined surface 223a' to be in sliding contact with the inclined surface 223a'. The inner surface 224b' of the accommodation part 224b may be formed to face the front of the second housing 212.

The inclined surface 223a' of the actuator 223a may be in contact with the inner surface 224b' of the accommodation part 224b even in a state in which the side bumper 223' or 223" is not moved inwards, i.e., a state in which the side bumper 223' or 223" does not collide with an obstacle.

Figure 44:
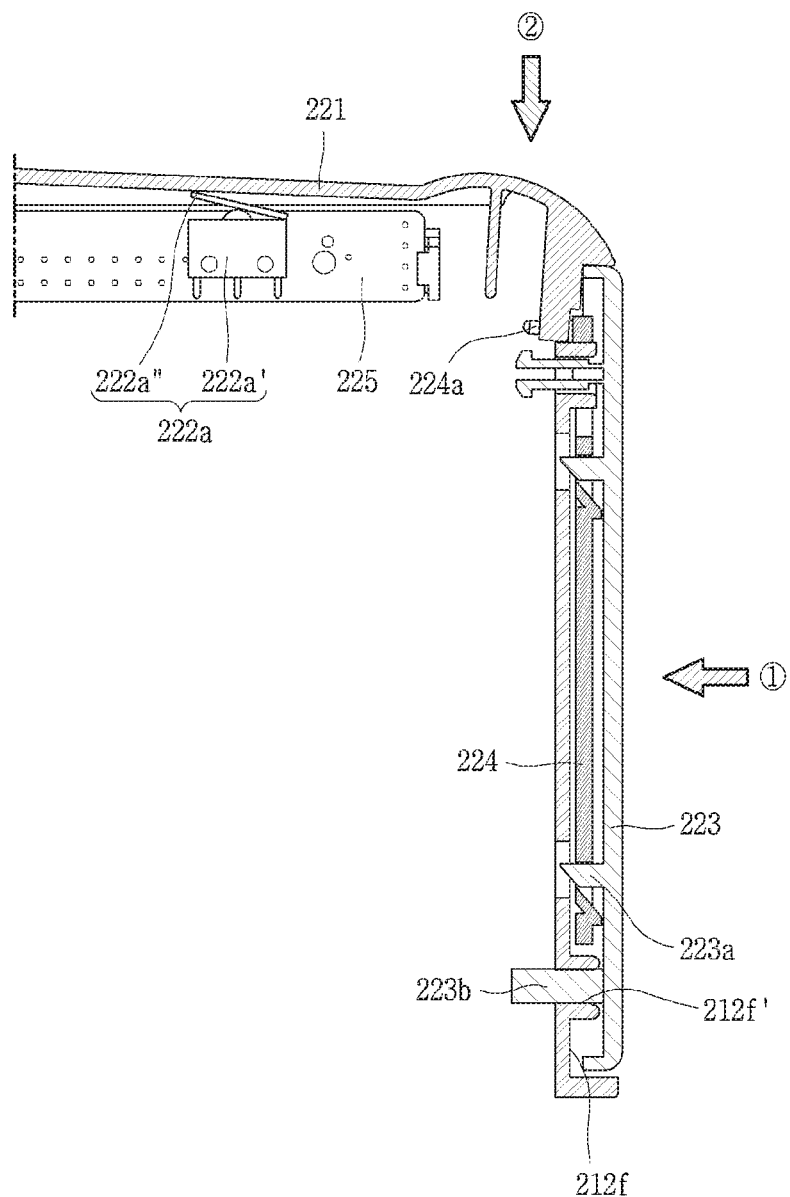
FIG. 44 illustrates a state in which the side bumper is moved inwards from the original position shown in FIG. 43.

An interlock mechanism between the side bumper 223' or 223" and the front bumper 221 through the link member 224 will be described. Referring to FIG. 44 in comparison with FIG. 43, if the side bumper 223 collides with an obstacle, the side bumper 223 is moved to the inside of the second housing 212. As the side bumper 223 is moved, a larger portion of the side bumper 223 is accommodated in the second bumper mounting part 212f, and the distance between the side bumper 223 and the link member 224 gradually decreases.

The movement of the side bumper 223 may be guided by the second bumper mounting part 212f surrounding the circumference thereof. In addition, the movement of the side bumper 223 may also be guided by the fixing hook 223b is more deeply inserted into the through-hole 212f'.

If the side bumper 223 is moved inwards, the actuator 223a formed to protrude from the inner surface of the side bumper 223 pressurizes the inner surface 224b' of the accommodation part 224b of the link member 224. As the inclined surface 223a' of the actuator 223a pressurizes the inclined inner surface 224b' of the accommodation part 224b, the link member 224 is pushed to the rear of the second housing 212. At this time, the inclined inner wall 224b' of the accommodation part 224b is slidingly moved rearward along the inclined surface 223a' of the actuator 223a.

The link member 224 may be slidingly moved to the rear of the second housing 212 in a state in which the link member 224 is supported by the inner wall of the second bumper mounting part 212f. As the link member 224 is moved to the rear of the second housing 212, the one end portion of the front bumper 221 coupled to the link member 224 is moved together with the link member 224 to the rear of the second housing 212. In addition, as the one end portion of the front bumper 221 is moved to the rear of the second housing 212, the first micro switch 222a located adjacent to the one end portion of the front bumper 221 is pressurized.

The controller may sense that the cleaner body 210 has collided with an obstacle through a pressurization signal generated by the pressurization of the first micro switch 222a. If the pressurization signal is received, the controller may control driving of the drive wheel 231 such that the cleaner body 210 can come off from the obstacle.

If the cleaner body 210 is separated from the obstacle, the front bumper 221 is moved to the outside (front) of the second housing 212 by the elastic member 226. Thus, the pressurization of the first micro switch 222a is released.

If the second housing 212 is moved forward, the link member 224 connected to the front bumper 221 is also moved to the front of the second housing 212. As the link member 224 is moved to the front of the second housing 212, the inner surface 224b' of the accommodation part 224b of the link member 224 pressurizes the actuator 223a of the side bumper 223. As the inclined inner surface of the accommodation part 224 pressurizes the inclined surface 223a of the actuator 223a, the side bumper 223 is pushed to the outside of the second housing 212. At this time, the inclined surface 223a' of the actuator 223a is slidingly moved to the outside of the second housing 212 along the inclined inner surface 224b' of the accommodation part 224b. The link member 224 may be slidingly moved to the front of the second housing 212 in the state in which the link member 224 is supported by the inner wall of the second bumper mounting part 212f.

Figure 45:
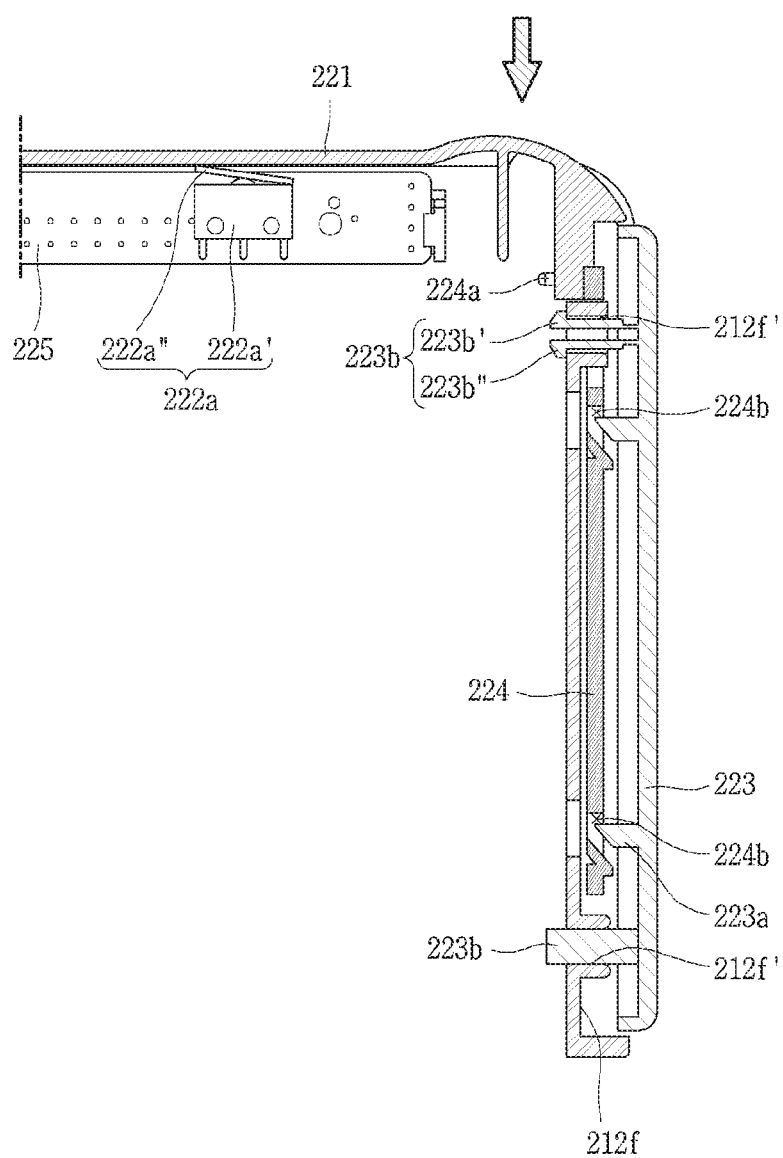
FIG. 45 illustrates a state in which the front bumper is moved inwards from the original position shown in FIG. 43.

Referring to FIG. 45 in comparison with FIG. 43, if the front bumper 221 collides with an obstacle, the front bumper 221 is moved to the inside of the second housing 212 (i.e., the rear of the second housing 212). As the front bumper 221 is moved, a larger portion of the front bumper 221 is accommodated in the first bumper mounting part 212e.

The movement of the front bumper 221 may be guided by the first bumper mounting part 212e surrounding the circumference thereof. The front bumper 221 may be mounted to the second housing 212 as the inner surface 224b' of the accommodation part 224b of the link member 224 coupled to the front bumper 221 is in contact with and supported by the actuator 223a of the side bumper 223. The front bumper 221 is not separated from the second housing 212 without any separate fixing structure. It will be apparent that, like the side bumper 223, the fixing hook 223b may be provided to the front bumper 221.

If the front bumper 221 is moved to the rear of the second housing 212, the link member 224 coupled to the front bumper 221 is also moved to the rear of the second housing 212. The link member 224 may be slidingly moved to the front of the second housing 212 in the state in which the link member 224 is supported by the inner wall of the second bumper mounting part 212f.

The inner surface 224b' of the accommodation part 224b of the link member 224 is distant from the actuator 223a. As shown in this figure, if the front bumper 221 is moved to the rear of the second housing 212 in a state in which the inclined inner surface 224b' of the accommodation part 224b and the inclined surface 223a' of the actuator 223a are in contact with each other, the inclined surface 224b' of the accommodation part 224b is pushed to the rear of the second housing 212 with respect to the inclined surface 223a' of the actuator 223a, so that the inclined inner surface 224b' of the accommodation part 224b and the inclined surface 223a' of the actuator 223a are distant from each other.

Unlike the case of FIG. 44, in which the side bumper 223 pushes the link member 224 to the rear of the second housing 212, the link member 224 has no influence on the side bumper 223 while being distant from the side bumper 223. The side bumper 223 maintains the initial position as it is.

The controller may sense that the cleaner body 210 has collided with an obstacle through a pressurization signal generated by the pressurization of the first micro switch 222a. If the pressurization signal is received, the controller may control driving of the drive wheel 231 such that the cleaner body 210 can come off from the obstacle.

When the cleaner body 210 is separated from the obstacle, the front bumper 221 is moved to the outside (front) of the second housing 212 by the elastic member 226. Thus, the pressurization of the first micro switch 222a is released.

If the second housing 212 is moved forward, the link member 224 connected to the front bumper 221 is also moved to the front of the second housing 212. As the link member 224 is moved to the front of the second housing 212, the inner surface 224b' of the accommodation part 224b of the link member 224 is gradually close to the actuator 223a of the side bumper 223. As shown in FIG. 43, the inclined inner surface 224b' of the accommodation part 224b may be in a state in which it is in contact with the inclined surface 223a' of the actuator 223a.

Figure 46:
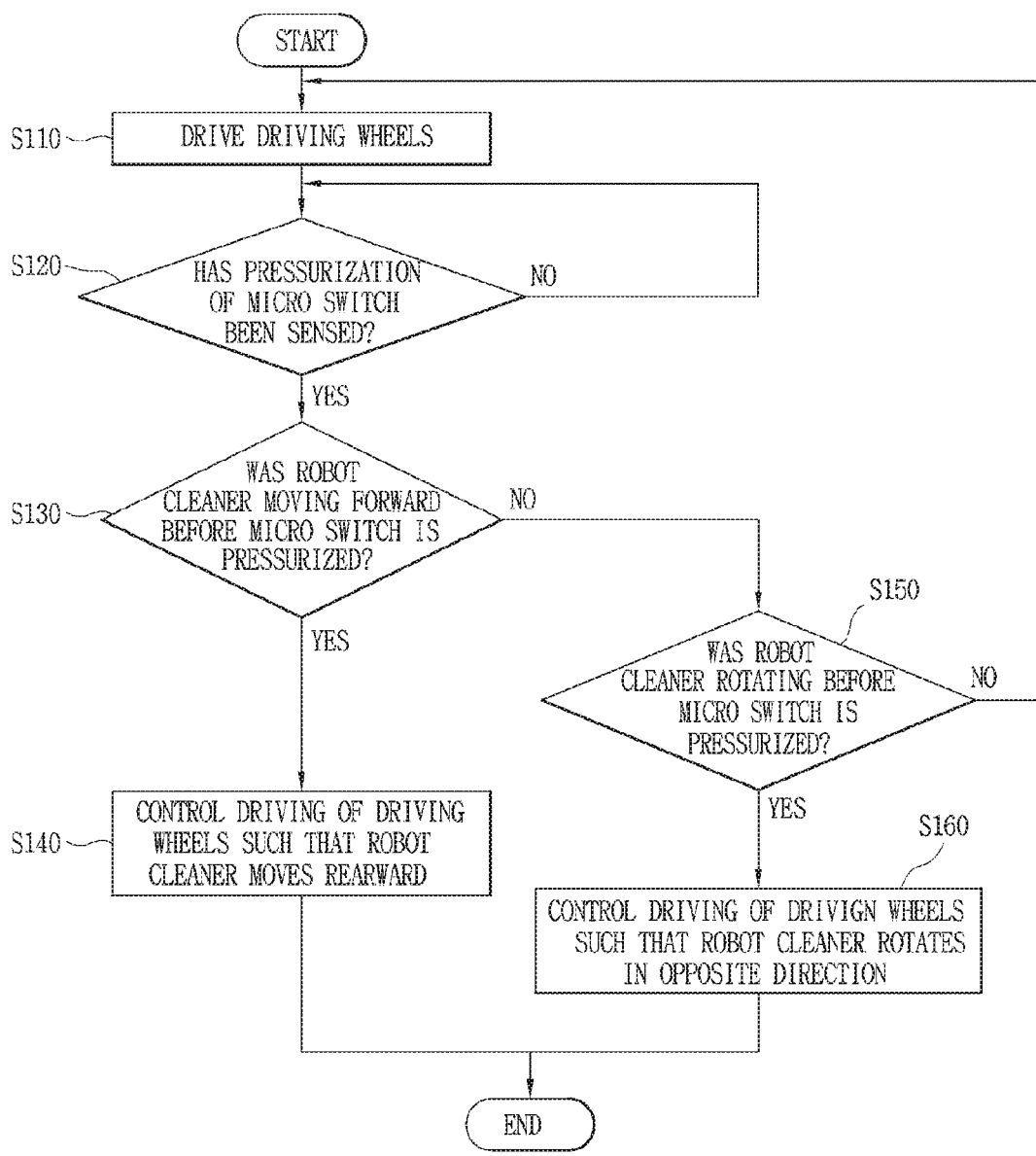
FIG. 46 is a flowchart illustrating a control method of the controller that differently recognizes a case where one end portion of the front bumper collides with an obstacle and a case where the side bumper collides with an obstacle, and allows the robot cleaner to come off from the colliding obstacle.

FIG. 46 is a flowchart illustrating a control method of the controller that differently recognizes a case where the one end portion of the front bumper 221 collides with an obstacle and a case where the side bumper 223 collides with an obstacle, and allows the robot cleaner 200 to come off from the colliding obstacle.

If the driving wheels 231 are driven, the cleaner body 210 travels on a floor (S110). The cleaner body 210 may move forward, move rearward, or rotate according to whether the driving wheels respectively provided both the left and right sides of the cleaner body 210 are rotated, the rotational direction of the driving wheels 231, etc.

A case where one end portion of the front bumper 221 collides with an obstacle during the traveling of the cleaner body 210, the first micro switch 222a located at the inside of the one end portion of the front bumper 221 is pressurized. Alternatively, a case where the side bumper 223 collides with an obstacle, the first micro switch 222a located adjacent to the side bumper 223 is pressurized.

As described above, in both the cases, the first micro switch 222a is pressurized (S120). The controller is configured to perform different controls by distinguishing the two cases from each other. When the first micro switch 222a is pressurized, the controller may be configured to control the driving of the driving wheels 231, based on the traveling direction before the pressurization.

As an example, when the one end portion of the front bumper 221 collides with an obstacle while the cleaner body 210 is moving forward, the cleaner body 210 may move rearward as one moving method for allowing the cleaner body 210 to be spaced apart from the obstacle. When the first micro switch 222a is pressurized, the controller may control the driving of the driving wheels 231 such that the cleaner body 210 moves rearward in a case where the cleaner body 210 was moving forward before the pressurization. For example, the controller may apply a driving force in the opposite direction to the driving wheels 231 such that the robot cleaner 200 moves rearward (S130 and S140).

As another example, when the side bumper 223 corresponding to a rotational direction of the cleaner body 210 collides with an obstacle while the cleaner body 210 is rotating, the cleaner body 210 may rotate in the opposite direction as one moving method for allow the cleaner body 210 to be spaced apart from the obstacle. When the first micro switch 222a is pressurized, the controller may control the driving of the driving wheels 231 such that the cleaner body 210 rotates in the opposite direction in a case where the cleaner body 210 was rotating before the pressurization. For example, the controller may apply a driving force to only any one of the driving wheels 231 or apply driving forces in different directions to both the driving wheels 231 such that the robot cleaner 200 rotates (S150 and S160).

As described above, the controller may determine which one of the front bumper 221 and the side bumper 223 has collided with an obstacle and perform control corresponding thereto using the control method, while the side bumper 223 is sharing the sensing means 222 of the front bumper 221 using the interlock mechanism with the front bumper 221 through the link member 224. Thus, it is unnecessary to install the sensing means 222 at the inside of the side bumper 223, and accordingly, production cost can be reduced.

Meanwhile, an opening through which air containing dust and foreign substances is sucked may be formed long to both left and right sides thereof in a bottom surface of the second housing 212, and projection parts protruding forward of a major surface of the front bumper 221 may be formed at both left and right sides of the front bumper 221. If the projection parts are in contact with an external object, a suction flow path communicating with the opening may be formed between the major surface of the front bumper 221 and the external object. A structure related to the projection parts will be described later.

In addition, a lighting part or light sources that lights an area photographed by the sensing unit 240 may be further provided in the second housing 212. The lighting part may operate as a recognizing means for generating mapping information of the robot cleaner 200 in a remote control device that remotely controls the robot cleaner 200. A structure related to the lighting part will be described later.

Figure 47:
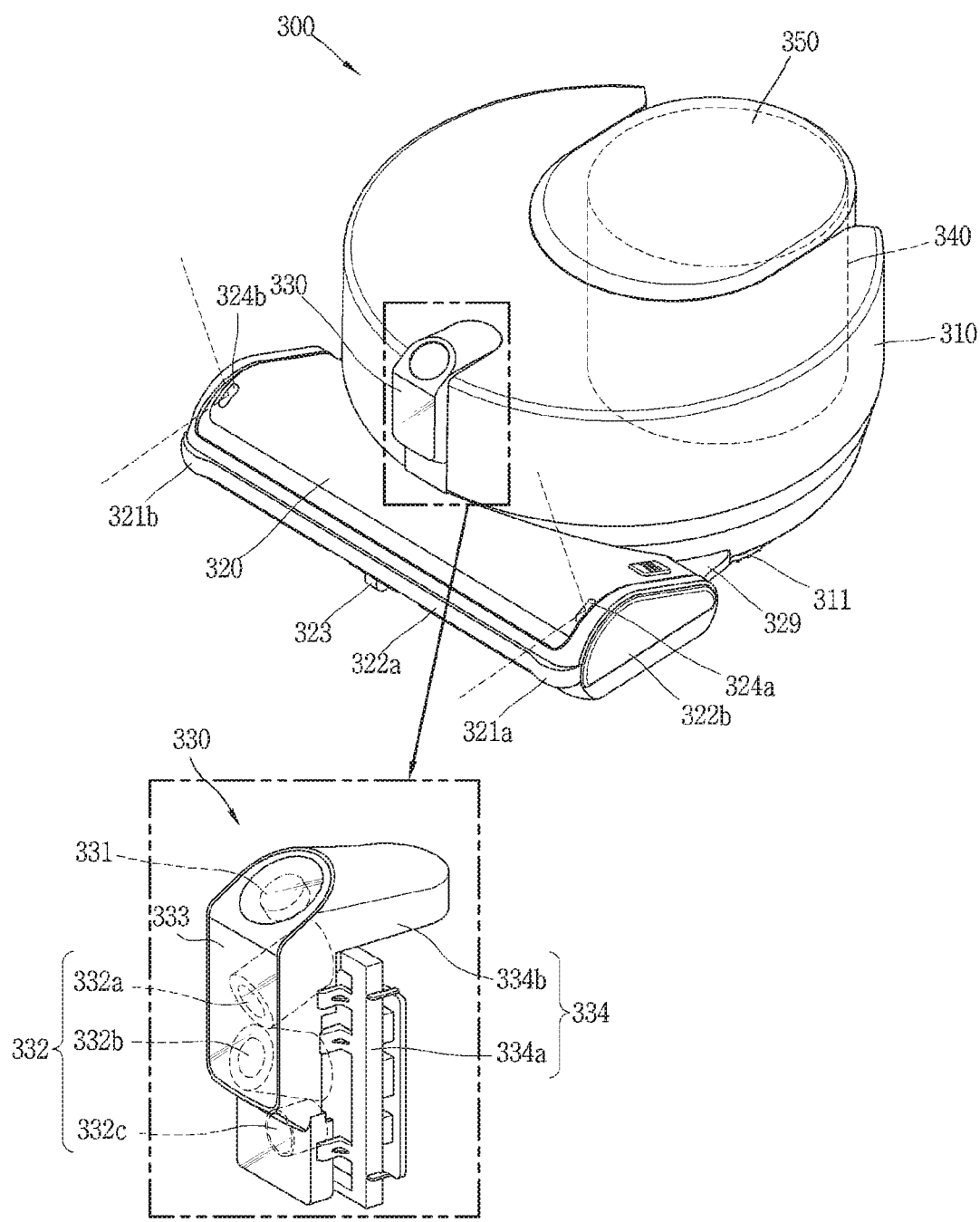
FIG. 47 is a perspective view illustrating still another example of the robot cleaner according to an embodiment.
Figure 48:
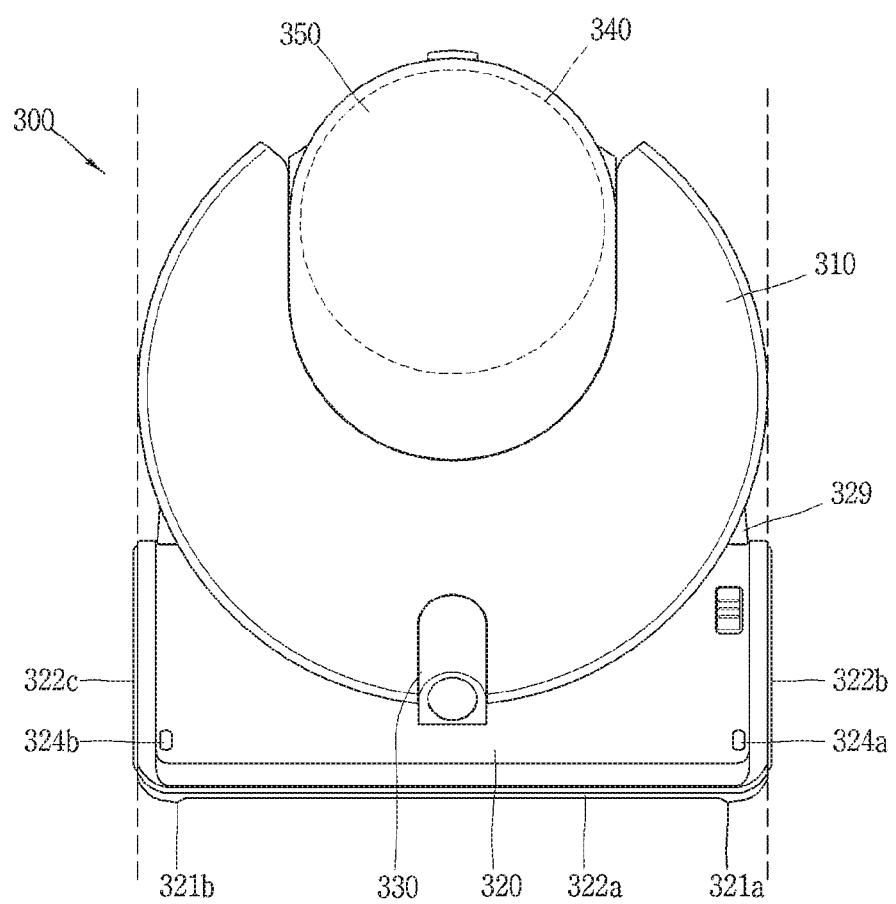
FIG. 48 is a plan view of the robot cleaner shown in FIG. 47.
Figure 49:
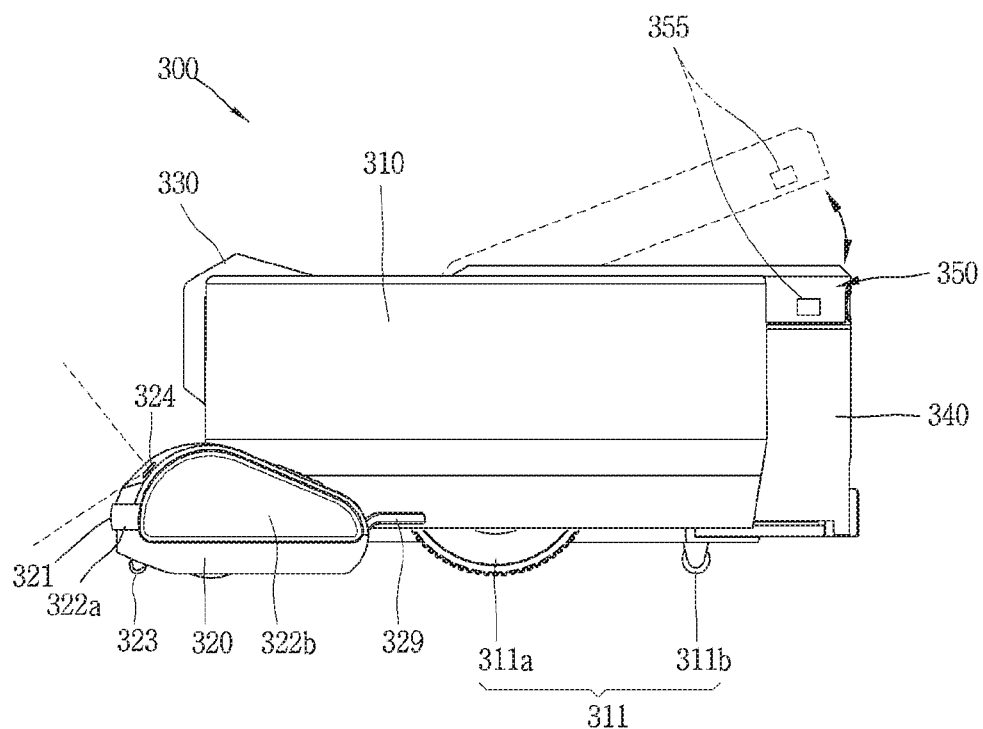
FIG. 49 is a side view of the robot cleaner shown in FIG. 47.

FIG. 47 is a perspective view illustrating still another example 300 of the robot cleaner according to the exemplary embodiment. FIG. 48 is a plan view of the robot cleaner shown in FIG. 47. FIG. 49 is a side view of the robot cleaner shown in FIG. 47.

Referring to FIGS. 43 to 45, a suction unit 320 is configured to suck dust and air through a suction port at a lower surface thereof. Therefore, in order for the suction unit 320 to have sufficient suction performance, air is to be sufficiently supplied between the suction unit 320 and a floor. Since air is supplied from front, left, and right sides of the suction unit 320, the front, left, and right sides of the suction unit 320 correspond to suction flow paths, respectively. Hereinafter, the suction flow paths are referred to as front, left, and left suction flow paths so as to distinguish the suction flow paths from one another.

However, if the suction unit 320 is adhered closely to an external object such as a wall while the robot cleaner 300 is autonomously traveling, it is difficult to allow air to be sufficiently supplied to the suction unit 320. This is because a flow path between the suction unit 320 and the external object is blocked.

In particular, a case where the front most portion of the suction unit 320 is formed as a flat surface extending in the left-right direction of the suction unit 320 is most serious. If the front most portion of the suction unit 320 is adhered closely to a flat surface of the external object, the front suction flow path is completely blocked.

Figure 50:
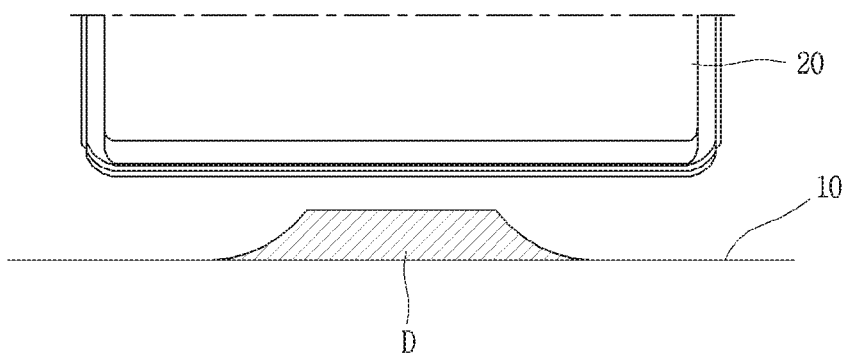
FIG. 50 is a view illustrating a problem of the conventional art.

FIG. 50 is a view illustrating such a problem. FIG. 50 illustrates a state in which a suction unit 20 having a flat front surface is adhered closely to a wall 10 and then spaced apart from the wall 10 after cleaning is completed by sucking dust and air. Left and right sides of the suction unit 20 are opened. Thus, left and right suction flow paths of the suction unit 20 are not blocked. However, a front suction flow path of the suction unit 20 is blocked as the suction unit 20 is adhered closely to the wall 10. As a result, air is not supplied to a bottom surface of the suction unit 20 through a space between the suction unit 20 and the wall 10.

If a robot cleaner moves rearward after suction is completed in the state in which the suction unit 20 is adhered closely to the wall 10, the suction unit 20 is spaced apart from the wall 10. However, since the front suction flow path was blocked, dust remains as it is on a floor adjacent to the wall 10 as shown in FIG. 50.

In FIG. 50, the shape of dust D remaining on the floor will be described. It can be seen that dust along with air supplied from the left and right suction flow paths has been sucked into the suction unit 20. On the other hand, it can be seen that dust has remained as it is because air is not supplied to the bottom surface of the suction unit 20 through the front suction flow path.

In order to solve such a problem, a projection part 321a or 321b is formed at the suction unit 320 of the present disclosure. Referring back to FIGS. 47 to 49, the projection part 321a or 321b protrudes from an outer surface of the suction unit 320 to prevent the suction unit 320 from being adhered closely to an external object while a cleaner body 310 is traveling.

Referring to FIGS. 43 to 45, the projection part 321a or 321b is formed at a front portion of the suction unit 320. In this case, the projection part 321a or 321b protrudes to the front of the suction unit 320. However, the position of the projection part 321a or 321b is not necessarily limited to the front portion of the suction unit 320, and may be formed at left and right portions of the suction unit 320. Projection parts formed at the left and right portions of the suction unit 320 protrude to left and right sides of the suction unit 320, respectively.

As shown in FIGS. 43 to 45, the front most portion of the suction unit 320 may be formed as a flat surface extending in the left-right direction of the suction unit 320. In this case, the projection part 321a or 321b protrudes toward the front of the suction unit 320 from the flat surface.

In addition, the projection part 321a or 321b may be provided in plurality. In this case, the plurality of projection parts 321a and 321b may be provided to be spaced apart from each other. For example, referring to FIGS. 43 and 44, it can be seen that two projection parts 321*a* and 321*b* are respectively provided at left and right sides of the front most portion of the suction unit 320 to be spaced apart from each other.

The suction unit 320 may include a bumper switch 322 that senses a physical collision. In this case, the projection part 321*a* or 321*b* may be formed at an outer surface of the bumper switch 322. If a bumper switch 322*a* is provided at a front surface of the suction unit 320, the projection part 321*a* or 321*b* is formed at the front surface. Similarly, if bumper switches 322*b* and 322*c* are provided at left and right side surfaces of the suction unit 320, projection parts may protrude toward left and right sides from the bumper switches 322*b* and 322*c* at the left and right side surfaces.

If the projection part 321*a* or 321*b* is formed at the suction unit 320 as described above, the suction unit 320 is not adhered closely to an external object even when the robot cleaner approaches the external object. This is because the projection part 321*a* or 321*b* is first adhered closely to the external object before the suction unit 320 is adhered closely to the external object, to allow the suction unit 320 to be spaced apart from the external object. Accordingly, if the projection part 321*a* or 321*b* is adhered closely to an external object, the suction unit 320 and the projection part 321*a* or 321*b* form a front suction flow path in a space between the front surface of the suction unit 320 and the external object.

A lighting part or light source 324*a* or 324*b* may be installed in the suction unit 320. There is an example in which a lighting part is installed in a cleaner to light dust on a floor. The lighting part 324*a* or 324*b* of the present disclosure assists an operation of a sensing unit 330 which will be described later and operates as a recognizing means for a remote control device.

The sensing unit 330 which will be described later may include a camera, and hence light is to be sufficiently provided to a space in which the robot cleaner 300 performs cleaning such that an SLAM (simultaneous localization and mapping) function is sufficiently exhibited. This is because it is difficult to perform an operation of recognizing an object using the camera in a dark environment.

In order to permit autonomous traveling of the robot cleaner 300 using the camera, the lighting part 324*a* or 324*b* is configured to provide light required by the sensing unit 330. Therefore, the light emitting direction of the lighting part 324*a* or 324*b* is to be set to a direction in which the lighting part 324*a* or 324*b* can assist the sensing unit 330. Hereinafter, the sensing unit 330 will be first described, and then the lighting part 324*a* or 324*b* will be again described.

As described above, a camera constituting a first sensing part 331 is configured to photograph front and upper parts of the cleaner body 310, and a cameral 332*c* of a second sensing part 332 is configured to photograph a front part of the cleaner body 310. Therefore, the above-described lighting part 324*a* or 324*b* is also provided to provide light in a direction in which the lighting part 324*a* or 324*b* can assist photographing of the cameras.

Referring back to FIGS. 43 and 44, the lighting part 324*a* or 324*b* is formed to emit light toward a direction between the front and upper parts of the cleaner body 310. For example, the suction unit 320 may have an inclined surface or curved surface formed to face the direction between the front and upper parts of the cleaner body 310, and the lighting part 324*a* or 324*b* may be installed to be exposed through the inclined surface or curved surface.

The lighting part 324*a* or 324*b* may be provided in plurality. The plurality of lighting parts 324*a* and 324*b* may be provided to be spaced apart from each other as shown in FIGS. 43 and 44. The suction unit 320 may have a curved surface formed to face the direction between the front and upper parts of the cleaner body 310. In this case, the lighting part 324*a* or 324*b* may be installed to be exposed through the curved surface. The lighting part 324*a* or 324*b* faces a direction upwardly inclined with respect to a bottom surface of the suction unit 320.

Accordingly, light emitted from the lighting part 324*a* or 324*b* faces the direction between the front and upper parts of the cleaner body 320. However, the light emitted from the lighting part 324*a* or 324*b* may spread in all directions. As shown in FIG. 49, the light may face a part lower than the front part of the cleaner body 310.

Although the robot cleaner 300 autonomously travels in a dark environment, light required by the cameras of the sensing unit 320 may be provided by the lighting part 324*a* or 324*b*. Thus, the SLAM function of the robot cleaner can be sufficiently implemented even in a low-illumination environment.

Further, the lighting part 324*a* or 324*b* may operate as a recognizing means for a remote control device that remotely control the robot cleaner. Hereinafter, a configuration of the robot cleaner for remote control and a configuration of the remote control device will be described. Subsequently, a function of the lighting part 324*a* or 324*b* as a recognizing means will be described.

Figure 51:
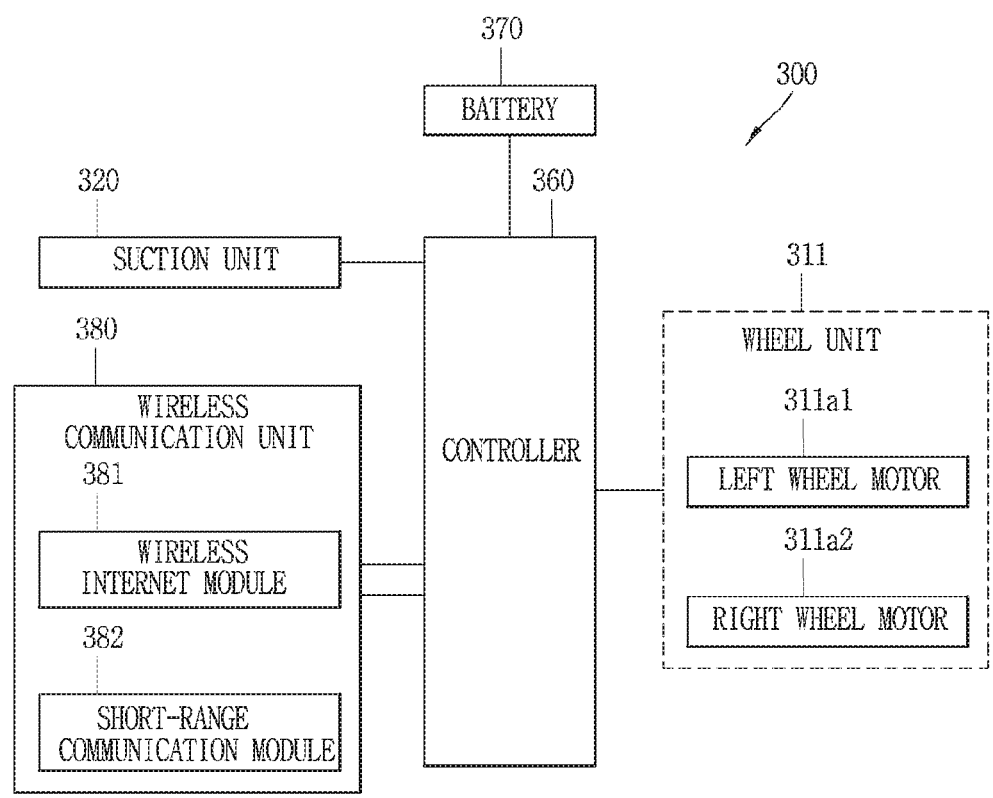
FIG. 51 is a block configuration view of a robot cleaner constituting a robot cleaner system according to an embodiment.

FIG. 51 is a block configuration view of the robot cleaner 300 constituting a robot cleaner system according to an exemplary embodiment. The robot cleaner system is a concept including the robot cleaner 300 and the remote control device. Other components except components shown in FIG. 51 may be added to the robot cleaner 300. However, only components for remotely controlling the robot cleaner 300 are illustrated in FIG. 51. A wheel unit 311, the suction unit 320, a battery 370, and a wireless communication unit 380 are electrically connected to a controller 360 to be controlled by the controller 360.

The wheel unit 311 is used to move the robot cleaner 300, and movement of the robot cleaner is controlled by the controller 360. A left wheel motor 311*a*1 is provided in a left main wheel assembly, and a right wheel motor 311*a*2 is provided in a right main wheel assembly. A wheel of each main wheel assembly is rotated by a driving force provided from each motor. Thus, by driving of the left wheel motor 311*a*1 and the right wheel motor 311*a*2, the robot cleaner 200 can clean an indoor floor while changing a direction by itself. The driving of the left wheel motor 311*a*1 and the driving of the right wheel motor 311*a*2 are controlled by the controller 360.

A brush module or a mop module may be selectively coupled to the suction unit 320. The brush module or the mop module may be connected to the suction unit 320 to be relatively rotatable. In addition, the brush module or the mop module is rotated by receiving a driving force transmitted from a motor installed in the suction unit 320. In this case, the motor that provides the driving force to the brush module or the mop module may be controlled by the controller 360.

A remaining capacity of the battery 370 is managed by the controller 360. When the remaining capacity of the battery 370 is smaller than a preset reference, an algorithm for allowing the robot cleaner 300 to return to a charging station may be executed. The algorithm may be executed by the controller 360.

The wireless communication unit 380 is configured to transmit/receive a remote control signal. For example, the wireless communication unit 380 may receive a remote control signal transmitted from the remote control device. The wireless communication unit 380 may include a wireless Internet module 381 and a short-range communication module 382. The remote control signal received by the wireless communication unit 380 is transmitted to the controller 360. The controller 360 controls a movement, a cleaning mode, and the like of the robot cleaner 300, based on the remote control signal transmitted from the wireless communication unit 380.

Figure 52:
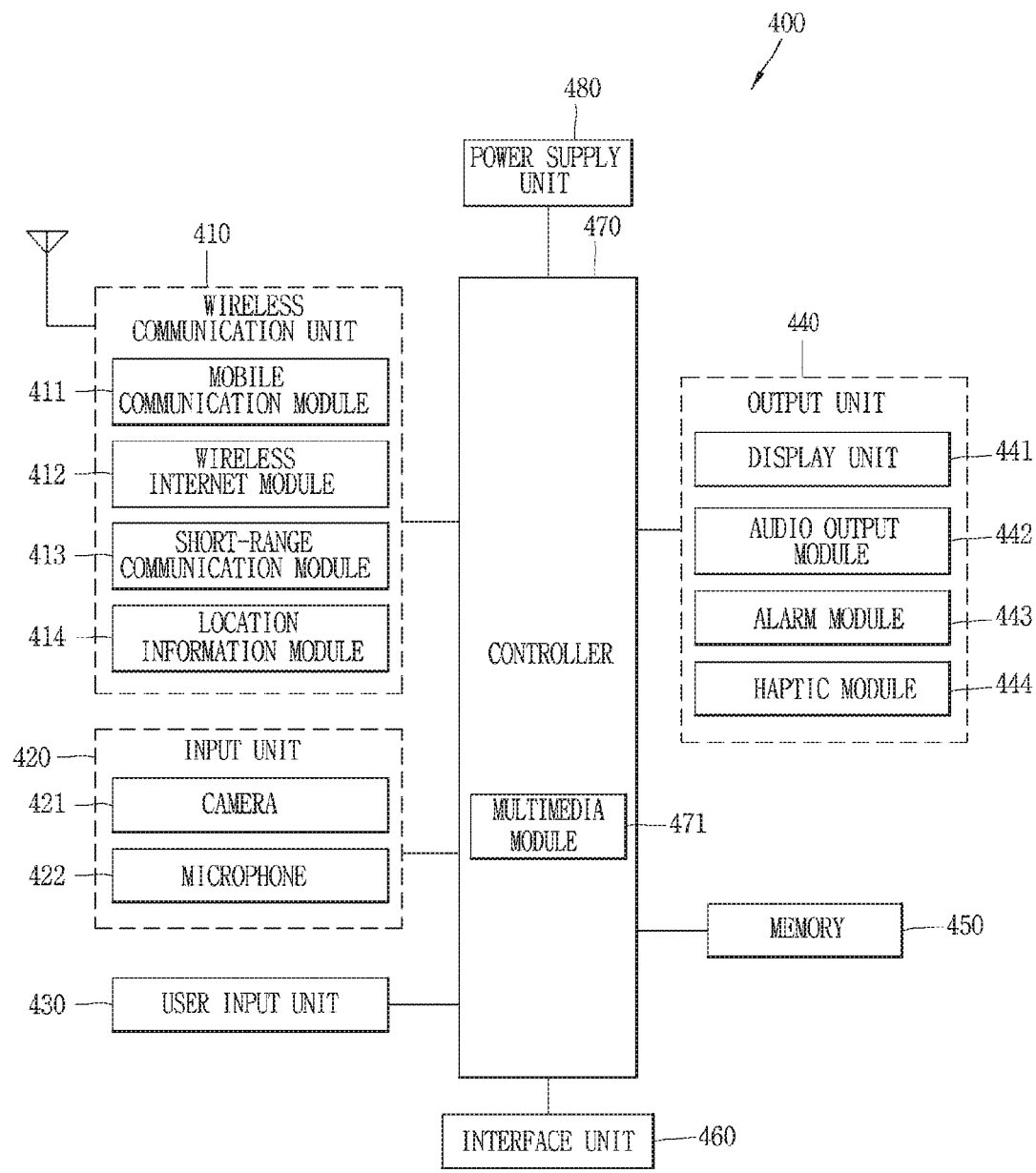
FIG. 52 is a block configuration view of a remote control device constituting the robot cleaner system according to an embodiment.

Next, the remote control device will be described with reference to FIGS. 48 to 50. FIG. 52 is a block configuration view of a remote control device constituting the robot cleaner system according to the exemplary embodiment.

In the present disclosure, the remote control device 400 is a device remotely connected to the robot cleaner 300 to control driving of the robot cleaner 300. For example, a cellular phone, a smart phone, a personal digital assistant (PDA), a portable multimedia player (PMP), etc. may be used as the remote control device 400. For convenience of description, a case where a smart phone is used as the remote control device 400 of the robot cleaner 300 will be mainly described.

The remote control device 400 may include a wireless communication unit 410, an audio/video (A/V) input unit 420, a user input unit 430, an output unit 440, a memory 450, an interface unit 460, a controller 470, a power supply unit 480, and the like. The components shown in FIG. 52 are not essential, and therefore, the remote control device 400 having a larger or smaller number of components than that of the components shown in FIG. 52 may be implemented.

The wireless communication unit 410 may include one or more modules that enables wireless communication between the remote control device 400 and a wireless communication system or between the remote control device 400 and a network in which the remote control device 400 is located. For example, the wireless communication unit 410 may include a mobile communication module 411, a wireless Internet module 412, a short-range communication module 413, and the like.

The mobile communication module 411 transmits/receives a wireless signal to/from at least one of a base station, an external terminal, and a server on a mobile communication network. The wireless signal may include various types of data according to the transmission/reception of a voice call signal, a video call signal, or a character/multi-media message.

The wireless Internet module 412 refers to a module for access to wireless Internet, and may be installed at an inside or outside of the remote control device 400. Wireless Internet techniques may include a wireless LAN (WLAN)/Wi-Fi, a wireless broadband (Wibro), a world interoperability for microwave access (Wimax), a high speed downlink packet access (HSDPA), and the like.

The short-range communication module 413 refers to a module for short-range communication. The short-range communication techniques may include Bluetooth, a radio frequency identification (RFID), infrared data association (IrDA), an ultra wideband (UWB), ZigBee, and the like.

Referring to FIG. 52, the A/V input unit 420 is used to input an audio signal or a video signal. The A/V input unit 420 may include a camera 421, a microphone 422, and the like. The camera 421 processes picture frames of a still image or a video acquired from an image sensor in a video call mode or photographing mode. The processed picture frames may be displayed on a display unit 441. The picture frames processed by the camera 421 may be stored in the memory 450 or be transmitted to the outside through the wireless communication unit 410. Two or more cameras 421 may be provided according to a use environment.

The microphone 422 receives an external sound signal in a call mode, recording mode, or voice recognition mode and converts the received sound signal to electrical voice data. In the call mode, the processed voice data may be converted into a form transmittable to a mobile communication base station through the mobile communication module 411 to be output. Various noise cancellation algorithms may be implemented for the microphone 422 to cancel noise generated during reception of an external sound signal.

The user input unit 430 generates input data for a user to control operations of the remote control device 400. The user input unit 430 may include a keypad, a dome switch, a touch pad (resistive/capacitive), a jog wheel, a jog switch, etc. The output unit 440 is used to generate visual, audible, or haptic outputs. The output unit 440 may include the display unit 441, an audio output module 442, an alarm module 443, and a haptic module 444.

The display unit 441 displays (outputs) information processed in the remote control device 400. For example, when the remote control device is in the call mode, the display unit 441 displays a user interface (UI) or graphic user interface (GUI) related to a call. When the remote control device 400 is in the video call mode or photographing mode, the display unit 441 displays a photographed and/or received image, a UI, or a GUI.

The display unit 441 may include at least one of a liquid crystal display (LCD), a thin film transistor-liquid crystal display (TFT-LCD), an organic light-emitting diode (OLED) display, a flexible display, and a three-dimensional (3D) display. Two or more display units 441 may exist according to an implementation form of the remote control device 400. For example, in the remote control device 400, a plurality of display units 441 may be spaced apart from each other or integrally provided on one surface, or may be provided on different surfaces.

When the display unit 441 and a sensor for sensing a touch operation (hereinafter, referred to as a 'touch sensor') form a mutual layer structure (hereinafter, referred to as a 'touch screen'), the display unit 441 may be used as not only an output device but also an input device. The touch sensor may have the form of, for example, a touch film, a touch sheet, a touch pad, etc. The touch sensor may be configured to convert a variation in pressure applied to or in capacitance generated from a specific position of the display unit 441 into an electrical input signal. The touch sensor may be configured to detect a touched pressure as well as a touched position and area.

When there exists a touch input to the touch sensor, the touch sensor outputs a signal or signals corresponding to the touch input to a touch controller. The touch controller processes the touch signal or signals and transmits the processed signal or signals to the controller 470. Accordingly, the controller 470 can identify which area of the display unit 441 has been touched, etc.

The audio output module 442 may output audio data received from the wireless communication unit 410 or stored in the memory 450 in a call signaling mode, call mode, recording mode, voice recognition mode, or broadcast reception mode. The audio output module 442 also outputs a sound signal related to a function (e.g. an incoming call ringtone, an incoming message ringtone, etc.) performed by the remote control device 400. The audio output module 442 may include a receiver, a speaker, a buzzer, etc.

The alarm module 443 outputs a signal notifying occurrence of an event in the remote control device 400. Examples of the event occurring in the remote control device 400 are call signal reception, message reception, key signal input, touch input, etc. The alarm module 443 may output a signal for notifying occurrence of an event by another form other than a video or audio signal, for example, vibration. The video or audio signal may be output through the display unit 441 or the audio output module 442, and therefore, the display unit 441 and the audio output module 442 may be regarded as a part of the alarm module 443.

The haptic module 444 creates various haptic effects to the user. A major example of the haptic effects is vibration. The strength and pattern of vibrations generated from the haptic module 444 can be controlled. For example, different kinds of vibrations may be combined or sequentially output.

The memory 450 may store programs for operations of the controller 470 and temporarily store input/output data (e.g. a phonebook, a message, a still image, a video, etc.). The memory 450 may store data on vibrations of various patterns and sounds that are output when the touch screen is touched.

The memory 450 may include at least one type of storage medium including a flash memory type, a hard disk type, a card-type memory (e.g., SD or XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The remote control device 400 may operate in relation to web storage that performs a storage function of the memory 450 on the Internet.

The interface unit 460 serves as an interface with all external devices connected with the remote control device 400. The interface unit 460 is used to receive data transmitted from an external device, to transfer supplied power to each component in the remote control device 400, or to transmit data in the remote control device 400 to an external device. For example, the interface unit 460 may include a wired/wireless headset port, an external power charger port, a wired/wireless data port, a memory card port, a port for connecting a device equipped with an identity module, an audio input/output (I/O) port, a video I/O port, an earphone port, and the like.

The identity module is a chip for storing various information for certifying user authority of the remote control device 400, and may include a user identity module (UIM), a subscriber identity module (SIM), a universal subscriber identity module (USIM), and the like. The device equipped with the identity module (hereinafter, referred to as an 'identity device') may be manufactured in a smart card form. Therefore, the identity device may be connected to the remote control device 400 through a port.

The controller 470 generally controls overall operations of the remote control device 400. For example, the controller 470 performs control and process operations related to a voice call, data communication, a video call, etc. The controller 470 may include a multimedia module 471 for replaying multimedia. The multimedia module 471 may be implemented in the controller 470 or be implemented separately from the controller 470. The controller 470 may perform a pattern recognition process capable of recognizing handwriting input or picture-drawing input applied to the touch screen as characters or images.

The power supply unit 480 may receive external power and internal power and provide power required for operations of the components of the remote control device 400 under control of the controller 470.

The exemplary embodiments of the present disclosure may be implemented in a recording medium readable by a computer or a computer-like device by various means, for example, hardware, firmware, software, or a combination thereof.

In a hardware configuration, the exemplary embodiments described herein may be implemented using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and other electrical units for performing functions. In some cases, the embodiments of the present disclosure may be implemented by the controller 470.

In a software configuration, procedures and functions according to the exemplary embodiments of the present disclosure may be implemented in the form of software modules that perform one or more functions and operations described herein. Software code may be realized by a software application written in an appropriate programming language. The software code may be stored in the memory 450, and be executed by the controller 470.

Figure 53:
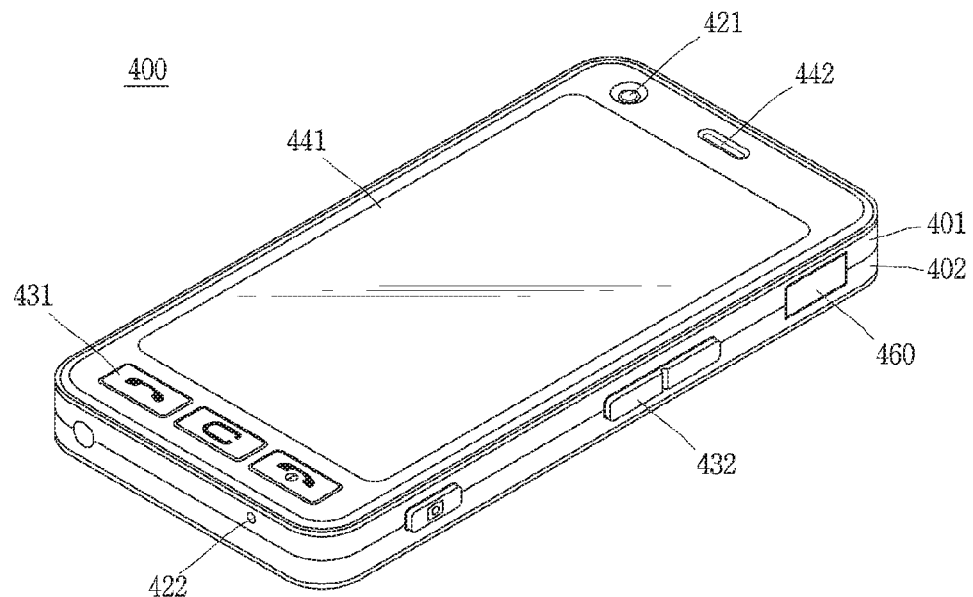
FIG. 53 is a perspective view of the remote control device constituting the robot cleaner system, which is viewed from the front, according to an embodiment.

FIG. 53 is a perspective view of the remote control device constituting the robot cleaner system, which is viewed from the front, according to the exemplary embodiment. The remote control device 400 has a bar type body. However, the present disclosure is not limited thereto, and can be applied to various types, such as a slide type, a folder type, a swing type, and a swivel type, each having four or more bodies coupled to each other to be relatively movable.

The body includes a case (casing, housing, cover, etc.) constituting an appearance thereof. In this exemplary embodiment, the case may be divided into a front case 401 and a rear case 402. Various electronic components are installed in a space formed between the front case 401 and the rear case 402. At least one intermediate case may be additionally provided between the front case 401 and the rear case 402. The cases may be formed of a synthetic resin in a manner of injection, or be formed of a metallic material such as stainless steel (STS) or titanium (Ti).

The display unit 441, the audio output module 442, the camera 421, the user input unit 430 (431 and 432), the microphone 422, the interface unit 460, and the like may be provided at the body, e.g., the front case 401 of the remote control device 400. The display unit 441 occupies a majority of a major surface of the front case 401. The audio output module 442 and the camera 421 are provided in an area adjacent to one of both end portions of the display unit 441, and an input unit 431 and the microphone 422 are provided in an area adjacent to the other of both end portions of the display unit 441. An input unit 432, the interface unit 460, and the like may be provided at side surfaces of the front case 401 and the rear case 402.

The user input unit 430 is manipulated to receive commands for controlling the operation of the remote control device 400, and may include a plurality of manipulating units 431 and 432. The manipulating units 431 and 432 may be referred to as manipulating portions and employ any tactile manner in which a user manipulates the manipulating units 431 and 432 while having tactile feeling.

Contents input by the first and second manipulating units 431 and 432 may be variously set. For example, the first manipulating unit 431 may receive commands such as start, end, and scroll, and the second manipulating unit 432 may receive commands such as control the sound volume output from the audio output module 442 or conversion of the display unit 441 into a touch recognition mode.

Figure 54:
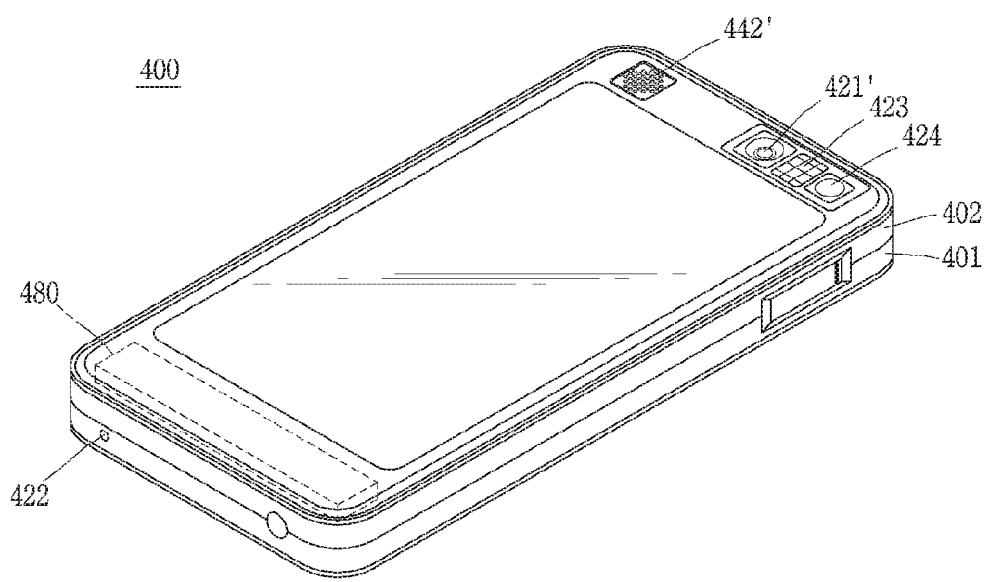
FIG. 54 is a perspective view of the remote control device constituting the robot cleaner system, which is viewed from the rear, according to an embodiment.

FIG. 54 is a perspective view of the remote control device constituting the robot cleaner system, which is viewed from the rear, according to the exemplary embodiment. A camera 421' may be additionally mounted to a rear surface of the body of the remote control device 400, i.e., the rear case 402. The camera 421' has a photographing direction substantially opposite to that of the front camera 421 (see FIG. 53), and may be a camera having pixels different from those of the front camera 421.

For example, it is desirable that the camera 421 has low pixels such that it can photograph an image of the face of a user and transmit the image to a receiving part in the case of video telephony, while the camera 421' has high pixels because it photographs an image of a general object and does not immediately transmit the image in many cases. The cameras 421 and 421' may be installed at the body of the remote control device 400 such that they can be rotated or pop-up.

A flash bulb 423 and a mirror 424 are additionally provided adjacent to the camera 421'. The flash bulb 423 lights a subject when the camera 421' photographs the subject. The mirror 424 is used for the user to look at his/her face in the mirror when the user desires to self-photograph himself/herself using the camera 421'.

An audio output unit 442' may be additionally provided at the rear surface of the body of the remote control device 400. The audio output unit 442' may achieve a stereo function with the audio output unit 442 (see FIG. 54) and be used for a speaker phone mode when the terminal is used for a telephone call.

The power supply unit 480 for providing power to the remote control device 400 is mounted in the body of the remote control device 400. The power supply unit 480 may be mounted in the body of the remote control device 400 or be detachably attached to the body of the remote control device 400.

Figure 55:
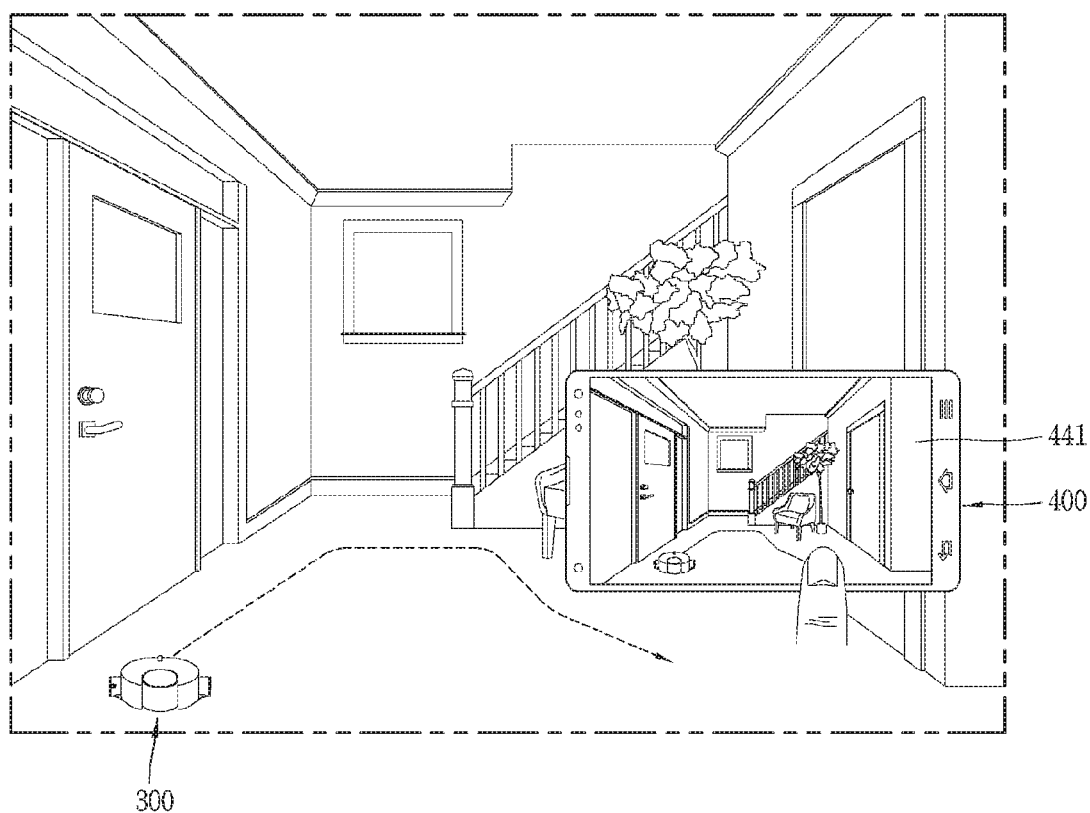
FIG. 55 is a view illustrating a concept in which the remote control device remotely controls the robot cleaner, using a lighting part as a recognizing means, in the robot cleaner system according to an embodiment.

FIG. 55 illustrates the remote control device remotely controlling the robot cleaner, using the lighting part 324a and 324b as a recognizing means, in the robot cleaner system according to the exemplary embodiment. The robot cleaner system includes the remote control device 400 for remotely controlling the driving of the robot cleaner 300. However, accurate position information of the robot cleaner 300 is required such that the remote control device 400 controls the driving of the robot cleaner 300. Specifically, mapping between an actual area and a virtual area is required.

The actual area refers to an area including the robot cleaner system and a peripheral area thereof. In addition, the virtual area refers to an area that is photographed by the camera of the remote control device to be output on the display unit 441. The mapping means that the actual area and the virtual area correspond to each other.

In order to perform the mapping, the robot cleaner system may generate position information of the robot cleaner 300 by sensing the robot cleaner 300, based on image information generated using the camera 421' of the remote control device 400.

As shown in FIG. 55, the camera 421' mounted to the rear surface of the remote control device 400 generates image information by photographing the robot cleaner 300 and a peripheral area thereof. The image information of the robot cleaner 300 generated as described above is transmitted to the controller 470. Next, based on the image information, the remote control device 400 maps an actual area in which the robot cleaner 300 is located to a virtual area represented by the image information.

As described above, the lighting parts 324a and 324b provided to the suction unit 320 of the robot cleaner 300 are operate as a recognizing means that enables the remote control device to sense the robot cleaner 300.

Information on the lighting parts 324a and 324b is stored in the memory 450 of the remote control device 400. The information on the lighting parts 324a and 324b includes the distance between the two lighting parts 324a and 324b, the angle of beams emitted from the lighting parts 324a and 324b when the robot cleaner 300 is placed on a flat floor, the brightness of beams emitted from the lighting parts 324a and 324b, and the like.

The controller 470 may sense the robot cleaner 300 using a method of extracting the lighting parts 324a and 324b that emit beams from an image of image information, photographed through the camera, and determining whether the extracted lighting parts 324a and 324b are valid. In order to extract the lighting parts 324a and 324b from the image of the image information, the controller 470 may check the distance between the two lighting parts 324a and 324b spaced apart from each other, the direction of two beams emitted in parallel to each other from the two lighting parts 324a and 324b spaced apart from each other, or the like.

Meanwhile, the controller 470 may improve the image quality of the image of the image information before the lighting parts 324a and 324b are extracted from the image of the image information. For example, in order to improve the image quality of the image of the image information, the controller 470 may adjust the brightness of the image, remove noise, correct the color of the image, and the like.

Next, the remote control device 400 may generate position information of the robot cleaner 300 by comparing information on the lighting parts 324a and 324b, stored in the memory 450, with information detected by the image information. That is, the mapping between the actual area and the virtual area may be performed.

If the mapping between the actual area and the virtual area is completed in the remote control device, the robot cleaner may be controlled by the remote control device. If the display unit 441 is configured to enable a touch input to be applied thereto, the user may transmit a control signal to the robot cleaner by touching an image of the robot cleaner, output through the display unit 441 of the remote control device.

For example, if the user touches an image of the robot cleaner, output through the display unit 441, and drags the image of the robot cleaner to be moved to another area, a control signal from the remote control device is transmitted to the robot cleaner. The robot cleaner receives the control signal transmitted through the wireless communication unit, and is moved in the actual area along a route that the user inputs on the display unit 441.

Figure 56:
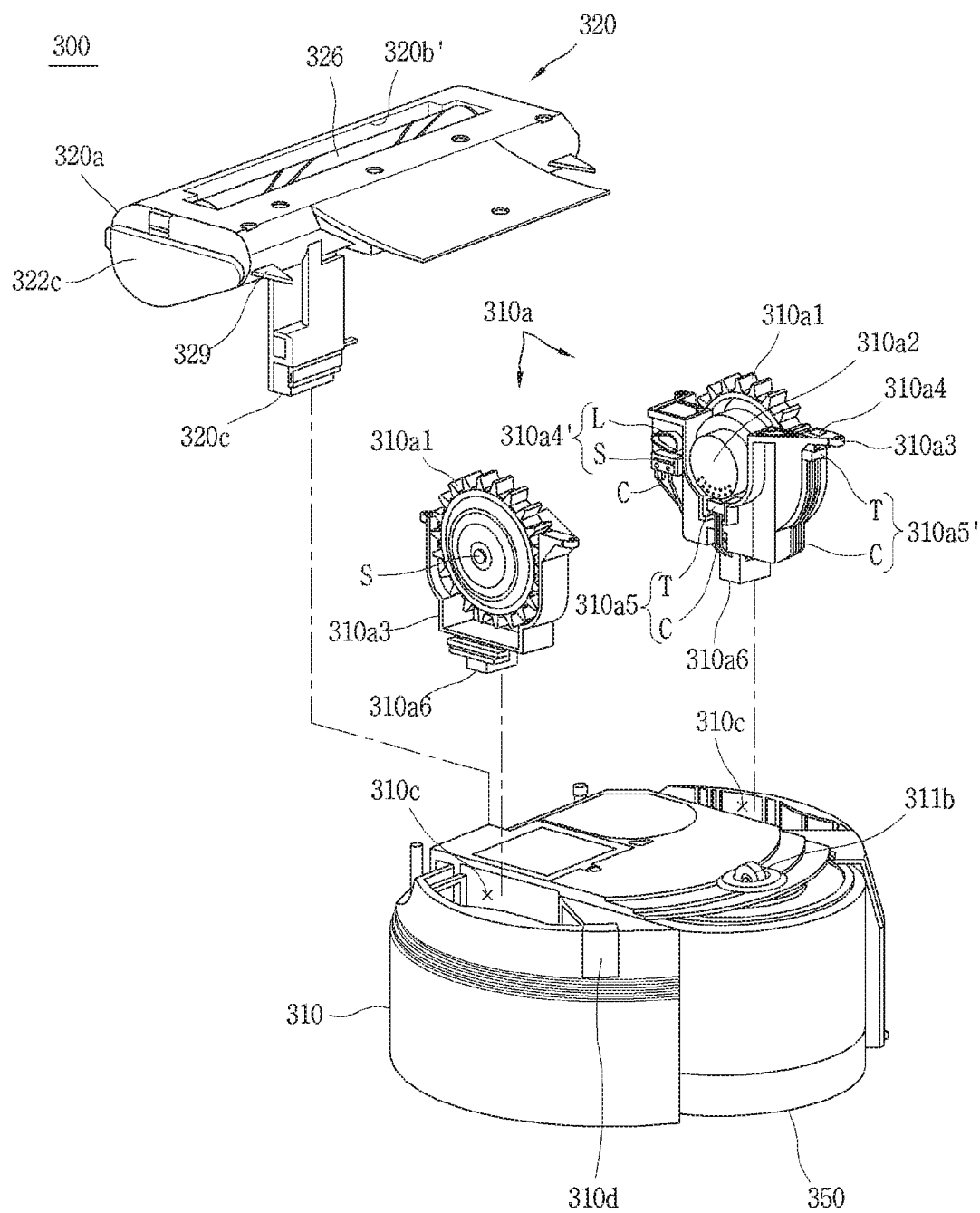
FIG. 56 is a perspective view illustrating a cleaner body, a main wheel assembly, and a suction unit, which are separated from one another.
Figure 57:
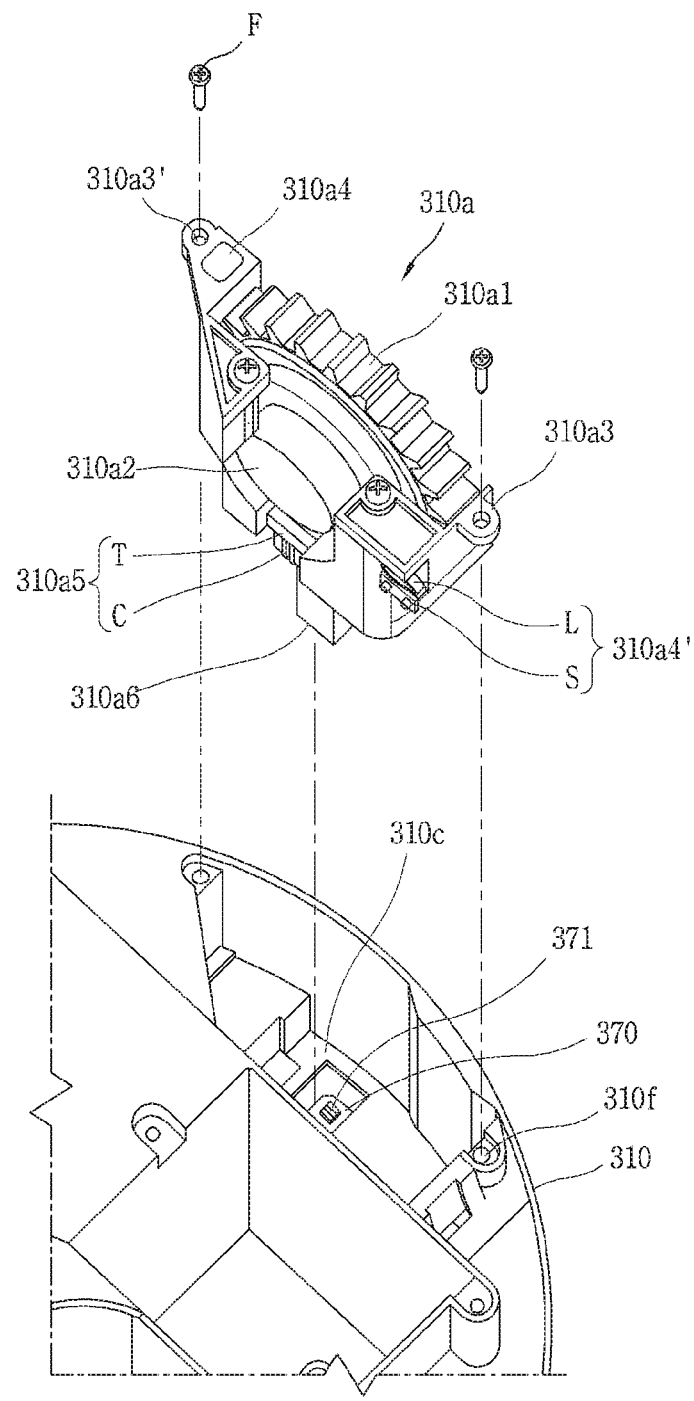
FIG. 57 illustrates a physical and electrical coupling structure of the cleaner body and the main wheel assembly.
Figure 58:
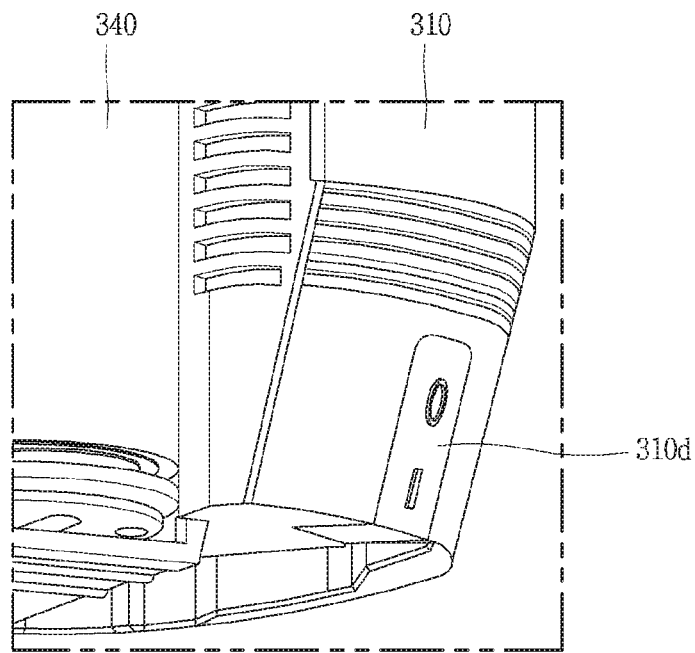
FIGS. 58 and 59 partially illustrates an appearance of the cleaner body, at which a switch cover is exposed.

Next, a structure in which the wheel unit 311, the suction unit 320, and the like are physically and electrically coupled to the cleaner body 310 will be described. FIG. 56 is a perspective view illustrating the cleaner body 310, a main wheel assembly 310a, and the suction unit 320, which are separated from one another. FIG. 57 is a conceptual view illustrating a physical and electrical coupling structure of the cleaner body 310 and the main wheel assembly 310a.

The main wheel assembly 310a and the suction unit 320 are configured as modules that can be coupled to or separated from the cleaner body 310. Here, the module means an assembly of parts as units constituting a machine, a system, or the like, and refers to an independent apparatus assembled with several electronic parts or mechanical parts to have a specific function.

The main wheel assembly 310a as one module includes a main wheel 310a1, a motor 310a2, a wheel cover 310a3, various sensors 310a4 and 310a4', sub-connectors 310a5 and 310a5', and a main connector 310a6. Unevenness for improving a frictional force with respect to a floor is formed at the outer circumferential surface of the main wheel 310a1. If the frictional force between the main wheel 310a1 and the floor is not sufficient, there may occur a case where the robot cleaner slides on an inclined surface or a case where the robot cleaner does not move or rotate in an intended direction. Therefore, a sufficient frictional force is to be formed between the main wheel 310a1 and the floor.

The frictional force may not be relevant to a contact area, and is changed depending on the roughness of a contact surface and the weight of an object. Thus, if the unevenness is formed at the outer circumferential surface of the main wheel 310a1, the roughness of the contact surface is increased, so that a sufficient frictional force can be secured.

The motor 310a2 is coupled to an inner surface of the main wheel 310a1. A rotating shaft S provided to the motor 310a2 extends toward the main wheel 310a1 to be connected to the center of the main wheel 310a1. The motor 310a2 may be provided to left and right main wheel assemblies 310a. Accordingly, the left and right main wheel assemblies 310a can be independently driven.

The wheel cover 310a3 is used to protect the main wheel 310a1, support the motor 310a2 and the sub-connectors 310a5 and 310a5', and mount the main wheel assembly 310a. The wheel cover 310a3 is formed to surround at least a portion of the main wheel 310a1. Referring to FIG. 56, the wheel cover 310a3 surrounds the outer circumferential surface and the inner surface of the main wheel 310a1. It can be seen that an outer surface of the main wheel 310a1 is not surrounded by the wheel cover 310a3 but surrounded by the cleaner body 310. However, the inner circumferential surface of the wheel cover 310a3 is spaced apart from the main wheel 310a1 so as not to interfere with rotation of the main wheel 310a1. In addition, when the main wheel assembly 310a is mounted to the cleaner body 310, the wheel cover 310a3 is spaced part from the floor.

The wheel cover 310a3 is configured to support the motor 310a2. A space for mounting the motor 310a2 therein is provided in the wheel cover 310a3, and the motor 310a2 coupled to the main wheel 310a1 is inserted into the space.

Referring to FIG. 57, a boss part 310a3' may be formed in the wheel cover 310a3. In addition, a fastening member insertion hole 310f corresponding to the boss part 310a3' is formed at a bottom portion of the cleaner body 310. The main wheel assembly 310 is inserted into a space 310c provided at a bottom portion of the cleaner body 310. If a fastening member F is coupled to the boss part 310a3' and the fastening member insertion hole 310f, the main wheel assembly 310a is mounted to the cleaner body 310.

The various sensors 310a4 and 310a4' may be selectively installed at the main wheel assembly 310a. In FIG. 56, it is illustrated that a cliff sensor 310a4 and a wheel drop sensor 310a4' are installed at the wheel cover 310a3. The cliff sensor 310a4 has already been described above. However, the position of the cliff sensor 310a4 may be changed depending on a design. For example, as shown in FIG. 56, the cliff sensor 310a4 may be installed at a lower portion of the wheel cover 310a3.

The wheel drop sensor 310a4' may also be installed at the wheel cover 310a3. The wheel drop sensor 310a4' is configured with a link L and a switch S to sensing sagging of the main wheel 310a1. If the main wheel 310a1 is moved in the lower direction from the original position thereof, the link L connected to the main wheel 310a1 is rotated to pressurize the switch S. Then, the switch S transfers a pressurization signal to the controller of the robot cleaner. The switch S can be electrically connected to the main connector 310a6 through the electric cable C.

The wheel drop sensor 310a4' may be used to control the driving of the main wheel 310a1 and control the main wheel 310a1 to avoid an obstacle. For example, when a user lifts the robot cleaner, both the main wheels 310a1 are naturally moved in the lower direction from the original positions thereof. The controller may stop the driving of both the main wheels 310a1, based on the pressurization signal transferred from the switch S.

In addition, if the pressurization signal is transferred from the switch S of any one of the left and right main wheels 310a1, the controller may rotate the main wheel 310a1 in the opposite direction. This corresponds to control for avoiding an obstacle when one main wheel 310a1 is spinning with no traction as the cleaner body 310 is blocked by the obstacle. The various sensors 310a4 and 310a4' are electrically connected to the main connector 310a6 by the sub-connectors 310a5 and 310a5'. The sub-connectors 310a5 and 310a5' are configured to electrically connect various electronic parts provided in the main wheel assembly 310a to the main connector 310a6. Each of the sub-connectors 310a5 and 310a5' may be configured with an electric cable C and a connection terminal T. The electric cable C protrudes from the main connector 310a6, and the connection terminal T is installed at an end of the electric cable C. The wheel cover 310a3 may form a disposition area of the electric wire C, and have a cable holder that fixes the electric cable C.

In FIG. 56, it is illustrated that the sub-connectors 310a5 and 310a5' are exposed to the outer surface of the wheel cover 310a3. However, the sub-connectors 310a5 and 310a5' may be provided to be covered by the wheel cover 310a3.

A connection socket for electrical connection may be provided to the motor 310a2 or the sensors 310a4 and 310a4', coupled to the wheel cover 310a3. If the connection terminal T of each of the sub-connectors 310a5 and 310a5' is inserted into the connection socket, the motor 310a2 is electrically connected to the main connector 310a6, and the sensors 310a4 and 310a4' are electrically connected to the main connector 310a6. If the components provided in the main wheel assembly 310a are physically and electrically connected to one another, the main wheel assembly 310a may be configured as one module.

The main connector 301a6 may protrude toward the inside of the cleaner body 310 from the wheel cover 310a3. The direction in which the main connector 310a6 protrudes from the wheel cover 310a3 is identical to that in which the main wheel assembly 310a is inserted into the cleaner body 310. The space 310c for mounting the main wheel assembly 310a is provided in the cleaner body 310, and the main wheel assembly 310a is inserted into the space 310c. A main printed circuit board 370 is mounted in the inside of the cleaner body 310, and one surface of the main printed circuit board 390 is exposed through the space 310c for mounting the main wheel assembly 310a.

A connection terminal 371 is provided at the one surface of the main printed circuit board 370. The connection terminal 371 is provided at a position corresponding to the main connector 310a6. In addition, the main connector 310a6 is formed in the shape of a connection socket corresponding to the connection terminal 371 of the main printed circuit board 370.

If the main wheel assembly 310a is inserted into the cleaner body 310, the connection terminal 371 of the main printed circuit board 370 is naturally inserted into the connection socket of the main connector 310a6. Accordingly, the main wheel assembly 310a is electrically connected to the main printed circuit board 370. The positions of the connection terminal 371 and the connection socket may be changed from each other. Additionally, the fastening member F may be configured to allow the wheel cover 310a3 and the cleaner body 310 to be fastened to each other.

The above-described physical and electrical connection structure can be identically applied to connection between the suction unit 320 and the cleaner body 310. In FIG. 56, it is illustrated that a main connector 320c similar to the main connector 310a6 of the main wheel assembly 310a is also provided to the suction unit 320.

Also, the main connector 320 of the suction unit 320 is electrically connected to various electrical parts provided in the suction unit 320 through a sub-connector. If the suction unit 320 is mounted to the cleaner body 310, the main connector 320c of the suction unit 320 is naturally coupled to a connection terminal of the main printed circuit board 370. In particular, a direction in which the main connector 320c protrudes from the suction unit 320 is identical to that in which the suction unit 320 is inserted into the cleaner body 310.

According to the physical and electrical connection structure of the present disclosure, as the main wheel assembly 310a or the suction unit 320 is physically coupled to the cleaner body 310, the electrical connection between the main wheel assembly 310a or the suction unit 320 and the cleaner body 310 is naturally performed. Accordingly, the assembly between each module and the cleaner body 310 can be easily performed. Further, other modules or parts are not influenced even when each module is separated from the cleaner body 310, thereby preventing occurrence of a secondary failure.

Unlike the present disclosure, if various modules are physically coupled to the cleaner body 310 and then electrically connected to the cleaner body 310, it is difficult to perform assembly between the modules and the cleaner body 310, and therefore, a failure occurs. Since the physical and electrically connection is performed through two processes, the number of assembling processes is increased. In addition, when the robot cleaner is disassembled due to a primary failure, other modules or parts are influenced, and therefore, a secondary failure may occur.

In particular, the physical and electrical connection structure of the present disclosure is advantageous in mass production through automation. A modernized production process of robot cleaners is accurately performed by mechanically operating robots, and inaccurate interventions of persons have been excluded in the production process.

In the present disclosure, if the physical and electrical connection structure is applied to the robot cleaner, the attachment between the cleaner body 310 and each module can be completed through three automation processes. The attachment may mean that physical connection is not merely performed, but electrical connection is performed together with the physical connection. Since the protrusion direction of the main connector 310a6 is identical to the insertion direction of the main wheel assembly 310a, it may be understood that a direction in which modules are physically coupled to each other is identical to that in which the modules are electrically connected to each other. Thus, the structure of the present disclosure is remarkably advantageous in an automation process in which there is no intervention of persons.

The reference numerals not described in FIGS. 52 and 53 are replaced with the aforementioned descriptions. However, reference numeral 310d designates a switch cover. Hereinafter, a power switch structure of the robot cleaner will be described.

Figure 60:
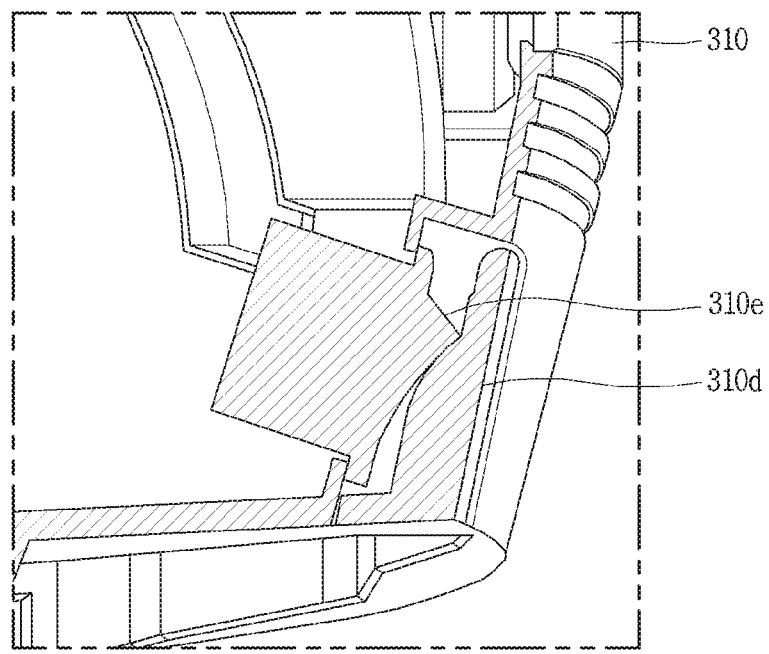
FIG. 60 is a sectional view illustrating an internal structure of a power switch and the switch cover.

FIGS. 54 and 55 partially illustrate an appearance of the cleaner body, at which the switch cover 310 is exposed. FIG. 60 is a sectional view illustrating an internal structure of a power switch 310e and the switch cover 310d. The power switch 310e is used to turn on/off the power of the robot cleaner. Referring to FIG. 60, the power switch 310e is configured as a toggle switch. In addition, referring to FIGS. 54 and 55, the switch cover 310d is installed at the outside of the power switch 310e. The switch cover 310d is provided to be exposed to the appearance of the cleaner body 310. The switch cover 310d is configured to cover the power switch 310e.

Since the robot cleaner autonomously perform cleaning while traveling in a certain area according to a predetermined algorithm, it is undesirable that a specific part protrudes from the cleaner body 310. For example, if the switch cover 310d protrudes from the cleaner body 310, the switch cover 310d may be held by an object such as a wall or a door while the robot cleaner is traveling.

In addition, it is desirable that the switch cover 310d does not protrude from the cleaner body 310 so as to achieve a beautiful appearance of the robot cleaner. In particular, the switch cover 310d is not to protrude from the cleaner body 310 when the power switch 310e is turned on.

The switch cover 310d of the present disclosure is configured to form a curved surface having a certain curvature together with the outer surface of the cleaner body 310 or form a flat surface with the outer surface of the cleaner body 310. Referring to FIGS. 54 and 55, it can be seen that the switch cover 310d forms a curved surface having a certain curvature together with the outer surface of the cleaner body 310 when the power switch 310e is turned on (when portion 'I' is pressed).

Figure 59:
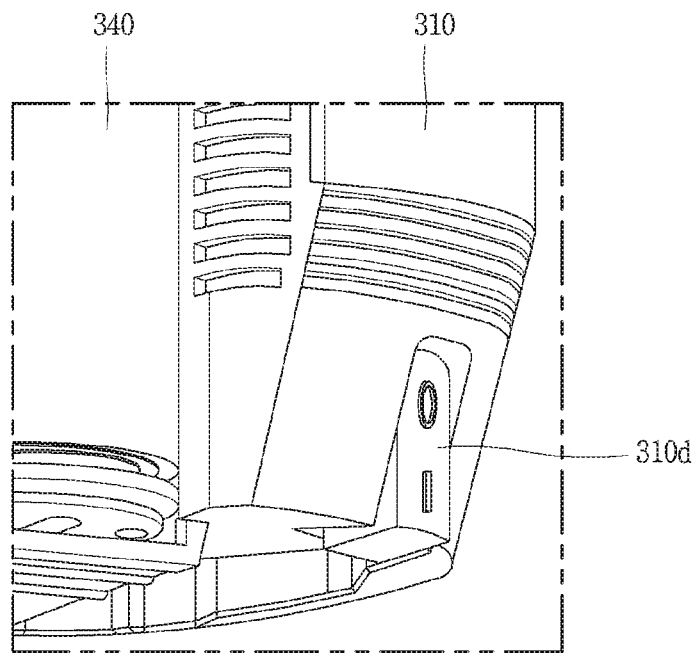

On the other hand, referring to FIG. 59, it can be seen that the portion 'I' of the switch cover 310d protrudes from the outer surface of the cleaner body 310 when the power switch 310e is turned off (when portion '0' is pressed). If the power switch 310e is configured as a push button switch, and an elastic member is coupled to the switch cover 310d, it is possible to implement a structure in which the switch cover 310d does not protrude from the cleaner body 310, regardless of the on/off of the power switch 310e.

The robot cleaner and the robot cleaner system, which are described above, are not limited to the configurations and methods of the above-described exemplary embodiments, and all or some of the exemplary embodiments may be selectively combined to achieve various modifications.

Therefore, an aspect of the detailed description is to provide a new sensing unit capable of minimizing a sensing part, implementing a front monitoring/photographing function, a simultaneously localization and mapping function, and an obstacle sensing function, and improving obstacle sensing performance.

Another aspect of the detailed description is to provide a suction unit capable of more directly sensing a collision with an obstacle by complementing the sensing unit, and sensing in advance a step or cliff that is rapidly lowered when the step or cliff exist at the front thereof.

Still another aspect of the detailed description is to provide a structure in which a dust container can be firmly fixed to a dust container accommodation part, and assembly convenience of a cleaner body, a dust container, and a dust container cover can be improved.

Still another aspect of the detailed description is to provide a new flow structure in a dust container, which can increase the capacity of the dust container while considering a limitation of the height of a cleaner body.

Still another aspect of the detailed description is to provide a structure in which a filter for filtering fine dust can be easily replaced.

Still another aspect of the detailed description is to provide a structure capable of sensing physical collisions at not only a front surface but also a side surface of a cleaner body through a front bumper provided at the front surface of the cleaner body and a side bumper provided at the side surface of the cleaner body and decreasing the number of installation places of a sensing means for sensing the physical collisions.

Still another aspect of the detailed description is to provide a method in which a controller differently recognizes a case where a physical collision occurs at a front surface of a cleaner body and a case where a physical collision occurs at a side surface of the cleaner body, and allows the cleaner body to escape from an obstacle that becomes a cause of the physical collision.

Still another aspect of the detailed description is to provide a robot cleaner having improved performance of cleaning a partially closed area such as a floor adjacent to a wall.

Still another aspect of the detailed description is to provide a robot cleaner capable of overcoming an environmental condition in which it is difficult to sufficiently perform a simultaneous localization and mapping (SLAM) function.

An autonomous cleaner in accordance with the present disclosure may comprise: a first housing forming a cleaner body, the cleaner body including a controller; a plurality of wheels to move the cleaner body in a prescribed direction of travel, the driving of at least one wheel being controlled by the controller; a second housing forming a cleaner head and provided at one side of the first housing, the second housing having a brush module or mop module mounted thereto; a front bumper provided at a front of the second housing, the front bumper configured to be movable toward second housing when the front bumper collides with an obstacle; at least one sensor provided behind the front bumper to sense a movement of the front bumper toward the second housing; left and right bumpers respectively provided at the sides of the second housing, the left bumper or the right bumper being configured to move toward the second housing when the left bumper or the right bumper collides with an obstacle; and left and right linkages provided at the inside of the left and right bumpers, respectively, to interlock with front bumper such that when one of the left bumper and the right bumper moves toward the second housing, at least one portion of the front bumper is moved together with one of the left bumper and the right bumper toward of the second housing.

Each of the left and right linkages includes: a coupler to couple to the front bumper; and a groove, where an actuator formed to protrude from an inner surface of the left and right bumpers into the groove, wherein when the left or right bumper moves toward the second housing, the actuator is configured to push the left or right linkage to the rear of the second housing. A movement direction of the left and right linkages is perpendicular to the movement direction of left and right bumpers. The actuator includes an inclined side, and upon collision of with an obstacle, the inclined side pushes against an inner surface of the groove.

The inner surface of the groove has a reverse angle of inclination to the inclined side such that a slidable contact is provided between the inner surface of the groove and inclined side of the actuator. The slidable contact is maintained prior to the first or the second bumper collides with an obstacle. The left and right couplers couple the left and right linkages to opposite ends of the front bumper.

The sensor comprises: a first micro switch located adjacent to a left end of the front bumper; a second micro switch located adjacent to a right end of the front bumper; and a third micro switch located between the first micro switch and the second micro switch, wherein the first or second micro switch adjacent to the side bumper is pressurized when the left or right bumper collides with an obstacle. When the first or second micro switch are tripped, the controller controls the driving of at least one of the wheels based on a traveling direction before tripping of the first or second micro switch. The prescribed direction of travel is changed to an opposite direction of travel when the first or second micro switch is tripped.

An intake port for air suction through the cleaner head is formed at a bottom surface of the second housing, and a pair of projections is formed by a front surface at left and right ends of the front bumper extending further in a forward direction than the front surface between the left and right ends. When both of the projections simultaneously contact a wall, air flow is allowed by an opening form between the pair of projections.

The robot cleaner may further comprise an image sensor provided at a side of the first housing to photograph an image; and a light source provided at the second housing to light an area to be photographed by the image sensor. The robot cleaner may further comprise a flap provided to fill a gap between the first housing and the second housing or the second housing, the wedge prevent an obstacle from being stuck in the gap.

The present disclosure may have various advantages as follows.

First, the first sensing part is provided inclined with respect to one surface of the cleaner body to simultaneously photograph front and upper parts, and the controller divides a photographed image into front and upper images according to objects different from each other. Thus, the first sensing part can be more efficiently used, and the existing sensing parts provided for every object can be integrated as one.

Also, the second sensing part of the sensing unit includes the first and second pattern irradiating parts that respectively irradiate beams having first and second patterns toward a front lower side and a front upper side, and the image acquisition part that photographs the beams having the first and second patterns, so that a front geographic feature and an upper obstacle can be sensed together. As a result, the obstacle avoidance performance of the robot cleaner can be improved.

In addition, the first sensing part and the second sensing part are integrated to constitute one module called as the sensing unit, so that it is possible to provide a robot cleaner having a new form factor.

Second, the bumper switch that mechanically operates is provided in the suction unit provided to protrude from one side of the cleaner body, so that, when the suction unit collides with an obstacle, the collision can be directly sensed. In addition, side bumper switches respectively provided at both sides of the suction unit are provided to protrude in a lateral direction instead of both sides of the cleaner body, so that the collision with an obstacle in the lateral direction can be effectively sensed.

If the bumper switches are combined with the sensing unit, more improved obstacle sensing and a direction changing function corresponding thereto can be realized.

In addition, the cliff sensor is mounted at the inclined part of the suction unit, so that when a step or cliff that is rapidly lowered exists at the front, a proper avoidance operation can be performed by sensing the step or cliff in advance.

Also, the cover case part of the suction unit is configured to open/close the opening of the main case part, so that the brush roller built in the main case part can be withdrawn to the outside. Thus, the brush roller can be more easily cleaned.

Third, the dust container is restricted from being moved rearward by the locking structure between the dust container and the dust container accommodation part in a state in which the dust container is mounted in the dust container accommodation part, and is restricted from being moved upward in a state in which the dust container cover is fastened to the dust container. Thus, the dust container can be firmly fixed to the dust container accommodation part, and assembly convenience of the cleaner body, the dust container, and the dust container cover can be improved.

In addition, the accommodation part that is provided to cover an upper portion of each of the infrared receiving units and has an opened front to receive infrared light is provided in the middle frame of the dust container cover, so that it is possible to prevent a malfunction of the infrared receiving unit, caused by a three-wavelength lamp provided on a ceiling or sunlight. In addition, the side surface of the dust container cover is provided to protrude further than the top surface of the cleaner body, so that the receiving performance of the infrared receiving unit can be improved.

Fourth, the exit of the dust container is formed at the same height as the entrance of the dust container, so that the capacity of the dust container can be increased without increasing the height of the cleaner body. In addition, as the exit of the dust container is formed immediately next to the entrance of the dust container, the downward inclination angle of the guide part that separates the flow of air introduced into the entrance from the flow of air discharged toward the exit to be respectively guided to lower and upper portions thereof is decreased. Thus, air introduced through the entrance can form a sufficient rotational flow, and dust collected on the bottom of the dust container can be prevented from being scattered.

Fifth, the filter case is hinge-coupled to the cleaner body to open/close the opening formed in the inner wall of the dust container accommodation part. Thus, the filter case is provided in the dust container accommodation part in a state in which the filter case is rotated to open the opening, and the filter accommodation part is exposed to the outside, so that the filter can be easily replaced.

Sixth, when the front bumper collides with an obstacle, the sensing means located at the inside of the front bumper senses a movement of the front bumper to the side of the second housing. When the side bumper collides with an obstacle, at least one portion of the front bumper is moved together with the side bumper to the inside of the second housing by the link member such that the sensing means senses the movement of the front bumper to the inside of the second housing. That is, the sensing means at the inside of the front bumper can be used to sense a collision of the side bumper through the link member. Thus, it is unnecessary to install a separate sensing means at the inside of the side bumper, and accordingly, production cost can be reduced.

Seventh, the controller can distinguish a case where a collision occurs in the front bumper from a case where a collision occurs in the side bumper, based on a traveling direction of the cleaner body before pressurization of the sensing means. In addition, the controller differently controls the driving of the driving wheel in the case where the collision occurs in the front bumper and the driving of the driving wheel in the case where the collision occurs in the side bumper, so that an operation of allowing the cleaner body to properly escape from an obstacle can be performed to fit each case.

Eighth, the projection part is configured to be first in contact with an external object such as a wall before the suction unit is adhered closely to the external object. Thus, the suction unit can be prevented from being adhered closely to the external object.

In order for the suction unit to completely clean a floor, suction flows are to be formed from front and left/right sides of the suction unit. However, if the suction unit is adhered closely to an external object, the suction flow cannot be formed from the front side of the suction unit. In the present disclosure, the projection part allows the suction unit to be spaced apart from the external object, so that a suction flow path can be formed even in a space between the suction unit and the external object, which corresponds to the front side of the suction unit.

Ninth, since the robot cleaner of the present disclosure includes a lighting part, the lighting part can provide the amount of light required in the sensing unit. Thus, although the robot cleaner operates in a dark environment, the robot cleaner can exhibit sufficient autonomous traveling performance.

Further, the lighting part can be used as a recognizing means required to control the robot cleaner in a remote control device.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

This application relates to U.S. application Ser. No. 15/599,780, U.S. application Ser. No. 15/599,783, U.S. application Ser. No. 15/599,786, U.S. application Ser. No. 15/599,800, U.S. application Ser. No. 15/599,804, U.S.

application Ser. No. 15/599,862, U.S. application Ser. No. 15/599,863, U.S. application Ser. No. 15/599,870, and U.S. application Ser. No. 15/599,894, all filed on May 19, 2017, which are hereby incorporated by reference in their entirety. Further, one of ordinary skill in the art will recognize that features disclosed in these above-noted applications may be combined in any combination with features disclosed herein.

What is claimed is:

1. An autonomous cleaner comprising:
a first housing forming a cleaner body, the cleaner body including a controller;
a plurality of wheels to move the cleaner body in a prescribed direction of travel, the driving of at least one wheel being controlled by the controller;
a second housing forming a cleaner head and provided at one side of the first housing, the second housing having a brush module or mop module mounted thereto;
a front bumper provided at a front of the second housing, the front bumper configured to be movable toward second housing when the front bumper collides with an obstacle;
at least one sensor provided behind the front bumper to sense a movement of the front bumper toward the second housing;
left and right bumpers respectively provided at the sides of the second housing, the left bumper or the right bumper being configured to move toward the second housing when the left bumper or the right bumper collides with an obstacle; and
left and right linkages are provided at an inside of the left and right bumpers, respectively, in a connected state with the front bumper, such that when the left or right linkage is pressed by one of the left bumper or the right bumper to move toward the second housing, and the front bumper cooperatively moves toward the second housing when the one of the left bumper or the right bumper moves into the second housing.

2. The robot cleaner of claim 1, wherein each of the left and right linkages includes:
a coupler to couple to the front bumper; and
a groove, where an actuator is formed to protrude from an inner surface of the left or right bumper into the groove, wherein when the left or right bumper moves to an inside of the second housing, the actuator presses the inner surface of the groove, such that the left or right linkage moves to the rear of the second housing.

3. The robot cleaner of claim 2, wherein the inner surface of the groove is formed to be inclined, such that the left or the right linkage move in a direction that is perpendicular to the movement direction of the left or right bumper when the actuator presses the inner surface of the groove.

4. The robot cleaner of claim 2, wherein the actuator includes an inclined side, and upon collision of with an obstacle, the inclined side pushes against an inner surface of the groove.

5. The robot cleaner of claim 4, wherein the inner surface of the groove has a reverse angle of inclination to the inclined side such that a slidable contact is provided between the inner surface of the groove and inclined side of the actuator.

6. The robot cleaner of claim 4, wherein the slidable contact is maintained prior to the first or the second bumper collides with an obstacle.

7. The robot cleaner of claim 2, wherein left and right couplers couple the left and right linkages to opposite ends of the front bumper.

8. The robot cleaner of claim 7, wherein the sensor comprises:
a first micro switch located adjacent to a left end of the front bumper;
a second micro switch located adjacent to a right end of the front bumper; and
a third micro switch located between the first micro switch and the second micro switch,
wherein the first or second micro switch adjacent to the left or right bumper is pressurized when the left or right bumper collides with an obstacle.

9. The robot cleaner of claim 8, wherein, when the first or second micro switch is tripped, the controller controls the driving of at least one of the wheels based on a traveling direction before tripping of the first or second micro switch.

10. The robot cleaner of claim 9, wherein the prescribed direction of travel is changed to an opposite direction of travel when the first or second micro switch is tripped.

11. The robot cleaner of claim 1, wherein an intake port for air suction through the cleaner head is formed at a bottom surface of the second housing, and a pair of projections is formed by a front surface at left and right ends of the front bumper extending further in a forward direction than the front surface between the left and right ends.

12. The robot cleaner of claim 11, wherein when both of the projections simultaneously contact a wall, air flow is allowed by an opening form between the pair of projections.

13. The robot cleaner of claim 1, further comprising:
an image sensor provided at a side of the first housing to photograph an image; and
a lighting part provided at the second housing to light an area to be photographed by the image sensor.

14. The robot cleaner of claim 13, wherein the lighting part operates as a recognizing means for generating mapping information of the robot cleaner in a remote control device that remotely controls the robot cleaner.

15. The robot cleaner of claim 1, further comprising a flap provided to fill a gap between the first housing and the second housing, the flap being configured prevent an obstacle from being stuck in the gap.

* * * * *